United States Patent
Chen et al.

(10) Patent No.: US 11,080,918 B2
(45) Date of Patent: Aug. 3, 2021

(54) METHOD AND SYSTEM FOR PREDICTING GARMENT ATTRIBUTES USING DEEP LEARNING

(71) Applicant: METAIL LIMITED, London (GB)

(72) Inventors: Yu Chen, London (GB); Sukrit Shankar, London (GB); Jim Downing, London (GB); Joe Townsend, London (GB); Duncan Robertson, London (GB); Tom Adeyoola, London (GB)

(73) Assignee: METAIL LIMITED, London (GB)

( * ) Notice: Subject to any disclaimer, the term of this patent is extended or adjusted under 35 U.S.C. 154(b) by 149 days.

(21) Appl. No.: 16/304,380

(22) PCT Filed: May 25, 2017

(86) PCT No.: PCT/GB2017/051481
§ 371 (c)(1),
(2) Date: Nov. 26, 2018

(87) PCT Pub. No.: WO2017/203262
PCT Pub. Date: Nov. 30, 2017

(65) Prior Publication Data
US 2020/0320769 A1    Oct. 8, 2020

(30) Foreign Application Priority Data

May 25, 2016   (GB) .................................... 1609245
Dec. 5, 2016   (GB) .................................... 1620670
Feb. 23, 2017  (GB) .................................... 1702930

(51) Int. Cl.
*G06T 15/00*    (2011.01)
*G06F 16/583*   (2019.01)
(Continued)

(52) U.S. Cl.
CPC .......... *G06T 15/005* (2013.01); *G06F 16/535* (2019.01); *G06F 16/538* (2019.01);
(Continued)

(58) Field of Classification Search
CPC ... G06T 15/005; G06T 15/04; G06F 16/5838; G06F 16/538; G06F 16/5862;
(Continued)

(56) References Cited

U.S. PATENT DOCUMENTS

| | | | |
|---|---|---|---|
| 7,027,054 B1* | 4/2006 | Cheiky | G06T 13/40 345/473 |
| 2006/0020482 A1* | 1/2006 | Coulter | G06Q 30/02 705/26.1 |

(Continued)

FOREIGN PATENT DOCUMENTS

EP    2 532 075 A    5/2016

OTHER PUBLICATIONS

Kiapour et al., Where to Buy It: Matching Street Clothing Photos in Online Shops, 2015 IEEE International Conference on Computer Vision, pp. 3343-3351, 2015 (Year: 2015).*

(Continued)

*Primary Examiner* — Haixia Du
(74) *Attorney, Agent, or Firm* — Saul Ewing Arnstein & Lehr LLP

(57) ABSTRACT

There is provided a computer implemented method for predicting garment or accessory attributes using deep learning techniques, comprising the steps of: (i) receiving and storing one or more digital image datasets including images of garments or accessories; (ii) training a deep model for garment or accessory attribute identification, using the stored one or more digital image datasets, by configuring a deep neural network model to predict (a) multiple-class discrete attributes; (b) binary discrete attributes, and (c)

(Continued)

continuous attributes, (iii) receiving one or more digital images of a garment or an accessory, and (iv) extracting attributes of the garment or the accessory from the one or more received digital images using the trained deep model for garment or accessory attribute identification. A related system is also provided.

44 Claims, 33 Drawing Sheets

(51) Int. Cl.

| | | |
|---|---|---|
| G06F 16/538 | (2019.01) | |
| G06F 16/535 | (2019.01) | |
| G06F 40/20 | (2020.01) | |
| G06K 9/62 | (2006.01) | |
| G06N 3/08 | (2006.01) | |
| G06T 15/04 | (2011.01) | |

(52) U.S. Cl.
CPC ...... *G06F 16/5838* (2019.01); *G06F 16/5862* (2019.01); *G06F 40/20* (2020.01); *G06K 9/6256* (2013.01); *G06K 9/6267* (2013.01); *G06N 3/08* (2013.01); *G06T 15/04* (2013.01)

(58) Field of Classification Search
CPC ..... G06F 16/535; G06F 40/20; G06K 9/6256; G06K 9/6267; G06N 3/08
See application file for complete search history.

(56) References Cited

U.S. PATENT DOCUMENTS

| | | | | |
|---|---|---|---|---|
| 2008/0262944 A1* | 10/2008 | Wu | ............ | G06Q 30/0643 705/27.2 |
| 2014/0195348 A1* | 7/2014 | Sun | ............ | G06Q 30/0256 705/14.54 |
| 2016/0042253 A1* | 2/2016 | Sawhney | ............ | G06K 9/6218 382/190 |
| 2017/0372467 A1* | 12/2017 | Carmel | ............ | G06T 7/0002 |
| 2018/0114084 A1* | 4/2018 | Meng | ............ | G06K 9/3233 |

OTHER PUBLICATIONS

International Search Report, dated Jan. 12, 2017, and Written Opinion issued in International Application No. PCT/GB2017/051481.

Lao et al., "Convolutional Neural Networks for Fashion Classification and Object Detection," CS231n Course Project Report (Winter Quarter 2015), Stanford University, (Mar. 25, 2015) retrieved from the Internet: URL: http://cs231n.stanford,edu/reports/BLA0_KJAG_CS231N_FinalPaperFashionClassification.pdf [retrieved on Nov. 9. 2016] XP055317660.

Chen et al., "Visual-based Deep Learning for Clothing from Large Database," pp. 1-10 (Oct. 7, 2015) XP058075677.

Gupta et al., "Apparel Classifier and Recommender using Deep Learningme/projects/tag-that-apparel," (Feb. 25, 2016); retrieved from the Internet: URL: https://pdfs.semanticscholar.org/68ec/d5468644a0cdcffea0915e839667c500d4f5.pdf [retrieved on Sep. 22, 2017] XP055490113.

Chen et al., "Describing Clothing by Semantic Attributes," Computer Vision ECCV 2012, Springer Berlin Heidelberg, Berlin ppl 609-623 (Oct. 7, 2012) XP047018990.

Liu et al., "Fashion Parsing with Weak Color-Category Labels," IEEE Transactions on Multimedia, IEEE Service Center, vol. 16, No. 1, pp. 253-265 (Dec. 12, 2013); retrieved on Dec. 12, 2013 XP011533887.

Bossard et al., "Apparel Classification with Style," Computer vision ACCV 2012, pp. 321-335 (Nov. 5, 2012) XP047027192.

Girshick et al., "Rich Feature Hierarchies for Accurate Object Detection and Semantic Segmentation," 2014 IEEE Conference on Computer vision and Pattern Recognition, pp. 580-587 (Jun. 23, 2014) XP032649284.

Loni et al., "Fashion 10000: an enriched social image dataset for fashion and clothing," Proc. of the 5th ACM Multimedia Systems Conf on, MMSYS '14, pp. 41-46 (Mar. 19, 2014) XP055408044.

Loni et al., "Fashion-focused creative commons social dataset," pp. 72-77 (Feb. 28, 2013) XP058018767.

Hara et al., "Fashion apparel detection: The role of deep convolutional neural network and pose-dependent priors," 2016 IEEE Winter Conference on Applications of Computer Vision (WACV), pp. 1-9 (Mar. 7, 2016) XP032904300.

* cited by examiner

| Label Type | Circumference Fit | Vertical Drop | | | |
|---|---|---|---|---|---|
| | | Hem Height (single aperture skirts, dresses, and t-shirts) | Leg Hem (for trousers, shorts, jumpsuit swimwear, etc) | Cuff (Sleeve length) | Waist Drop (i.e. where does the waist of the garment fall) |
| Fit Point Definitions | Shoulder Bust; Underbust; Waist; Hip; Thigh | | | | |
| Label Classes | N/A: The garment does not cover the fit point. E.g. trousers and skirts do not cover the bust area, so it will be N/A for bust and chest. | No hem | No leg hem (i.e. not cover buttocks) | No sleeves | Not cover waist |
| | Baggy: significant amounts of extra material cut in, drapes in the material as a result. | Chest | Hot pants | Shoulder | No obvious waist line |
| | | Waist | Short shorts | Upper arm | High |
| | Comfy: > 2 inches of slack around the specified area, but no draping. | Hip | Mid thigh | Above elbow | Natural (i.e. standard waist drop, usually on the navel |
| | | Low hip | Above knee | On elbow | |
| | Fitted: 1-2 inch of slack around the specified area. | High thigh | On knee | Below elbow | Low |
| | | Mid thigh | Below knee | Forearm | Hip |
| | Stretch fit: Skin tight fit allowed by some elastane in the fabric. (e.g. skinny jeans) The fabric material is only slightly elastic. Mostly following the silhouette of the mannequin around the specified area. | Above knee | Calf | Wrist | |
| | | On knee | Ankle | Overlength | |
| | | Below knee | Floor | | |
| | | Calf | Overlength | | |
| | Tight-Stretchy: Skin tight with thin material of predominantly high stretch fabric. (e.g. Spandex leggings). Tightly following the silhouette of the mannequin around the specified area. | Ankle | | | |
| | | Floor (e.g. maxi dress) | | | |
| | | Overlength (e.g. wedding dress) | | | |

FIGURE 18

Algorithm 1 Learning algorithms of the predictive logics size advice engine.

Ensure: $\mathcal{X} \times \mathcal{S}, \mathcal{X}_v \times \mathcal{S}$ ▷ Training Set, Validation Set

Require: $\theta_1^c = \{0, 1, 2, 3\}$ ▷ Consideration set - $\theta_1$
Require: $\theta_2^c = \{2, 3, 4, 5, 6, 7\}$ ▷ Consideration set - $\theta_2$
Require: $\theta_3^c = \{6, 7, 8, 9, 10, 11, 12, 13\}$ ▷ Consideration set - $\theta_3$
Require: $M_b^c = \{81, 87, 92, 98, 103, 108\}$ ▷ Range set - Bust
Require: $M_w^c = \{62, 68, 73, 78, 83, 88\}$ ▷ Range set - Waist
Require: $M_h^c = \{87, 92, 98, 103, 108, 113\}$ ▷ Range set - Hips
Require: $f^p = \{0, 1, -1, 2, -2, 3, -3\}$ ▷ Fitting Preferences 1: for $\theta$ in $\theta_1^c \times \theta_2^c \times \theta_3^c$ do ▷ Sweeping for $\theta$
2:    for $x^n$ in $\mathcal{X}$ do
3:       $i_b = \arg\min_{j \in [0, |M_b^c|]} (u_b - M_b^c(j))$
4:       $i_w = \arg\min_{j \in [0, |M_w^c|]} (u_w - M_w^c(j))$
5:       $i_h = \arg\min_{j \in [0, |M_h^c|]} (u_h - M_h^c(j))$
6:       $m_r = (i_b + 1)(i_w + 1)(i_h + 1) - 1$ ▷ Row Index in $M$
7:       Using $\{s_b^n, u_b\}$, get $fitting_b$ from (25)
8:       Using $\{s_w^n, u_w\}$, get $fitting_w$ from (25)
9:       Using $\{s_h^n, u_h\}$, get $fitting_h$ from (25)
10:      $m_c = \sum_{j \in [0, |f^p|]} j \; \mathbf{1}_{fitting_b = f^p(j)}$ ▷ Col Index - Bust
11:      $M(m_r, m_c) = M(m_r, m_c) + 1$
12:      $m_c = \sum_{j \in [0, |f^p|]} j \; \mathbf{1}_{fitting_w = f^p(j)} + |f^p|$ ▷ Col Index - Waist
13:      $M(m_r, m_c) = M(m_r, m_c) + 1$
14:      $m_c = \sum_{j \in [0, |f^p|]} j \; \mathbf{1}_{fitting_h = f^p(j)} + 2|f^p|$ ▷ Col Index - Hips ▷ Record $M$ using the training set

FIGURE 26A

15:         $M(m_r, m_c) = M(m_r, m_c) + 1$
16:    end for

17:    for $m$ in $[M(:,0)]$ do        ▷ For all rows in $M$
18:         $M(m,:) = M(m,:)/max(M(m,:))$    ▷ Normalize
19:    end for 20:    for $x_v^n$ in $\mathcal{X}_v$ do        ▷ Inference on the validation set
21:       Find $i_b, i_w, i_h, m_r$ as in Steps (3, 4, 5, 6)
22:       for $s$ in $S$ do        ▷ All available sizes
23:          using $\{s_b, u_b\}$, get $fitting_b$ from (25)
24:          using $\{s_w, u_w\}$, get $fitting_w$ from (25)
25:          using $\{s_h, u_h\}$, get $fitting_h$ from (25)

26:          $m_c = \sum_{j \in [0,|\mathcal{F}^p|]} \mathbb{1}_{fitting_b = f^p(j)}$
27:          $temp = M(m_r, m_c)$
28:          $m_c = \sum_{j \in [0,|\mathcal{F}^p|]} \mathbb{1}_{fitting_w = f^p(j)} + |\mathcal{F}^p|$
29:          $temp = temp + M(m_r, m_c)$
30:          $m_c = \sum_{j \in [0,|\mathcal{F}^p|]} \mathbb{1}_{fitting_h = f^p(j)} + 2|\mathcal{F}^p|$
31:          $temp = temp + M(m_r, m_c)$ 32:          $score(s) = temp/3$
33:       end for
34:       Sort $score(s)$ in descending order to get $r^{n,k}$
35:    end for 36:    Use (23) to get $E(\Theta)$ on $\mathcal{X}_v$        ▷ Get the error
37: end for
38: Select $\Theta^*$ that minimizes $E(\Theta)$ ((24))

FIGURE 26B

Algorithm 2 Inference procedures of the predictive logics size advice engine.

Ensure: $M, \theta = \{\theta_1, \theta_2, \theta_3\}$ ▷ Learnt Parameters
Ensure: $\mathcal{X}_t \times \mathcal{S}$ ▷ Test Set Require: $M_b^s = \{81, 87, 92, 98, 103, 108\}$ ▷ Range set - Bust
Require: $M_w^s = \{62, 68, 73, 78, 83, 88\}$ ▷ Range set - Waist
Require: $M_h^s = \{87, 92, 98, 103, 108, 113\}$ ▷ Range set - Hips
Require: $f^p = \{0, 1, -1, 2, -2, 3, -3\}$ ▷ Fitting Preferences 1: for $x^n$ in $\mathcal{X}_t$ do ▷ For all examples in the test set
2:     $i_b = \arg\min_{j \in [0,|M_b^s|]} (u_b - M_b^s(j))$
3:     $i_w = \arg\min_{j \in [0,|M_w^s|]} (u_w - M_w^s(j))$
4:     $i_h = \arg\min_{j \in [0,|M_h^s|]} (u_h - M_h^s(j))$
5:     $m_r = (i_b + 1)(i_w + 1)(i_h + 1) - 1$ ▷ Row Index in $M$
6:     for $s$ in $\mathcal{S}$ do ▷ All available sizes
7:        With $\{s_b, u_b\}$ & (25), get $fitting_b$ ▷ Uses $\theta$
8:        With $\{s_w, u_w\}$ & (25), get $fitting_w$ ▷ Uses $\theta$
9:        With $\{s_h, u_h\}$ & (25), get $fitting_h$ ▷ Uses $\theta$
10:       $m_c = \sum_{j \in [0,|f^p|]} \mathbb{1}_{fitting_b = f^p(j)}$
11:       $temp = M(m_r, m_c)$
12:       $m_c = \sum_{j \in [0,|f^p|]} \mathbb{1}_{fitting_w = f^p(j)} + |f^p|$
13:       $temp = temp + M(m_r, m_c)$
14:       $m_c = \sum_{j \in [0,|f^p|]} \mathbb{1}_{fitting_h = f^p(j)} + 2|f^p|$
15:       $temp = temp + M(m_r, m_c)$
16:       $score(s) = temp/3$
17:     end for
18:     Sort $score(s)$ in descending order to get $r^{n,k}$
19: end for

FIGURE 27

METHOD AND SYSTEM FOR PREDICTING GARMENT ATTRIBUTES USING DEEP LEARNING

CROSS REFERENCE TO RELATED APPLICATIONS

This application claims the priority of PCT/GB2017/051481, filed on May 25, 2017, which claims priority to GB Applications Nos. GB1609245.4, filed May 25, 2016; GB1620670.8, filed Dec. 5, 2016; and GB1702930.7, filed Feb. 23, 2017, the entire contents of each of which being fully incorporated herein by reference.

BACKGROUND OF THE INVENTION

1. Field of the Invention

The field of the invention relates to a computer implemented method and system for predicting garment attributes using deep learning techniques, and their extended applications in online fashion.

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

2. Technical Background

In online retail, sample images convey as much amount of information as the text description about the quality and the nature of the products being sold and affect customers' decisions to purchase. Being able to build an automatic system that can understand the visual contents and extract properties and attributes of the subject from those images can not only help customers quickly find the items they want in their online shopping process, but also boost the sales for retailers and reduce the returns of unwanted items. This will result in a significant positive impact on the online retailer.

Deep Neural Networks

In general the image-based attribute prediction problem is defined as a two-step process in computer vision. The first step is to extract sparse and invariant visual features from the images, normally by using pre-defined descriptors. Commonly-used image descriptors in computer vision include histograms of oriented gradient (HoG) (N. Dalal and B. Triggs, Histograms of oriented gradients for human detection, In *Computer Vision and Pattern Recognition, 2005. CVPR 2005. IEEE Computer Society Conference on*, volume 1, pages 886-893, IEEE, 2005), scale-invariant feature transform (SIFT) (D. Lowe, Distinctive image features from scale-invariant keypoints, *International Journal of Computer Vision*, 2(60):91-110, 2004), shape context (S. Belongie, J. Malik, and J. Puzicha, Shape matching and object recognition using shape contexts, *IEEE Trans. Pattern Analysis and Machine Intelligence (PAMI)*, 24(24):509-522, 2002), which model different aspects of an image e.g. edges, corners, colour, texture, shape of silhouettes.

Once the feature extraction is exercised the rest of the problem (i.e. step 2) can be generally formulated as a supervised learning problem in the feature space, in which the machine learning models to solve the problem are trained on a number of labeled data (i.e. in the form of input features and output labels pairs). Depending on the nature of the attributes to be predicted this supervised learning problem can be either a classification problem or a regression problem.

Recent research has shown that deep convolutional neural networks (CNN) (Y. LeCun, L. Bottou, Y. Bengio, and P. Haffner, Gradient-based learning applied to document recognition, *Proceedings of the IEEE*, 86(11):2278-2324, November 1998) are very effective for solving classical supervised learning problems in computer vision, e.g. image classification and object recognition. The approach is fully data-driven, and it combines both steps of visual feature extraction and supervised learning (i.e. classification or regression) into a unified framework. State-of-the-art deep learning research in computer vision is focused on investigation into different network architectures, for example represented by AlexNet (A. Krizhevsky, I. Sutskever, and G. E. Hinton, Imagenet classification with deep convolutional neural networks, *NIPS*, 1(2):4, 2012), VGGNet (K. Simonyan and A. Zisserman, Very deep convolutional networks for large-scale image recognition, *arXiv preprint arXiv:1409.1556*, 2014), GoogLeNet (C. Szegedy, W. Liu, Y. Jia, P. Sermanet, S. Reed, D. Anguelov, D. Erhan, V. Vanhoucke, and A. Rabinovich, Going deeper with convolutions, In *Proceedings of the IEEE Conference on Computer Vision and Pattern Recognition*, pages 1-9, 2015), ResNet (K. He, X. Zhang, S. Ren, and J. Sun, Deep residual learning for image recognition, *arXiv preprint arXiv:1512.03385*, 2015), Inception-ResNet-V2 (C. Szegedy, S. loffe, and V. Vanhoucke, Inception-v4, inception-resnet and the impact of residual connections on learning, *CoRR*, abs/1602.07261, 2016), to improve the capability and generality of visual feature extraction and hence enhance the accuracy of classification or regression.

The present invention addresses the above vulnerabilities and also other problems not described above.

Internet Fashion Images

For enhanced visual search of garment or accessories, there has been a need for a comprehensive dataset covering garment categories, sub-categories, and attributes (e.g. patterns, color, texture, fabric characteristics). While the recently released DeepFashion dataset (Z. Liu, P. Luo, S. Qiu, X. Wang, and X. Tang, Deepfashion: Powering robust clothes recognition and retrieval with rich annotations, In *Proceedings of the IEEE Conference on Computer Vision and Pattern Recognition*, pages 1096-1104, 2016) has 1000 classes for fashion attributes, their categories are limited.

SUMMARY OF THE INVENTION

According to a first aspect of the invention, there is provided a computer implemented method for predicting garment or accessory attributes using deep learning techniques, comprising the steps of:

(i) receiving and storing one or more digital image datasets including images of garments or accessories;

(ii) training a deep model for garment or accessory attribute identification, using the stored one or more digital image datasets, by configuring a deep neural network model to predict
 (a) multiple-class discrete attributes;
 (b) binary discrete attributes, and
 (c) continuous attributes, (iii) receiving one or more digital images of a garment or an accessory, and (iv) extracting attributes of the garment or the accessory from the one or more received digital images using the trained deep model for garment or accessory attribute identification.

An advantage is that users are helped to quickly find the items they want in their online shopping process; further advantages are boosting the sales for retailers and reducing the returns of unwanted items. A further advantage is improved accuracy provided in the search for garments or accessories present in one or more digital images. A further advantage is improved speed provided in the search for garments or accessories present in one or more digital images.

The method may further include the step of:

(v) storing the extracted attributes of the garment or accessory in a memory.

The method may be one wherein the extracted attributes include one or more of: style, shape, texture, colour, fabric properties.

The method may be one wherein the one or more digital image datasets include a digital image dataset based on garment images.

The method may be one including the step of: generating annotations for the digital image dataset based on garment images using natural language processing, and storing the generated annotations in the digital image dataset based on garment images. An advantage is improved data quality. A further advantage is allowing to quickly gather a large amount of image data with weak semantic labels (i.e.the labels are somewhat noisy), and build up a structured and labeled dataset suitable for deep learning.

The method may be one wherein the digital image dataset based on garment images is a digital image dataset based on internet garment images.

The method may be one wherein the one or more digital image datasets includes a digital image dataset based on sets of garment mannequin photos which includes metadata and multiple semantic labels associated with sets of garment mannequin photos. An advantage is that this provides a well-organized, richly-structured digital image dataset.

The method may be one wherein the digital image dataset based on sets of garment mannequin photos includes digital images of garments taken on the mannequin in a controlled lighting environment, in a standard camera pose.

The method may be one wherein the digital image dataset based on sets of garment mannequin photos includes high-resolution unsegmented original photos of the garment samples and segmented garment texture sprites, both in 8 distinct camera views.

The method may be one wherein the metadata and multiple semantic labels associated with sets of garment mannequin photos include one or more of: Garment name and description; Garment category and subcategory; Colour; Pattern and texture; Fit styles; Vertical drops; Fabric and material composition; Washing method; Price or price range.

The method may be one wherein regarding the digital image dataset based on sets of garment mannequin photos, keyword extraction or natural language processing (NLP) is used to extract style-related attributes and semantic labels from the garment name and garment description text.

The method may be one wherein regarding the digital image dataset based on sets of garment mannequin photos, metadata and/or semantic labels are structured 1) by associating groups of different keywords of similar meanings, and/or 2) assigning label weights with values in a range.

The method may be one wherein the digital image datasets include one or more of: unsegmented mannequin photos of a garment, either in a single frontal view, or in multiple distinct camera views; segmented garment texture sprites from mannequin photos; sample photos of a garment on a retailer's website; and synthetic garment images obtained by rendering a simulated garment model using computer graphic techniques.

The method may be one wherein in the step of training the deep model for garment or accessory attribute identification, the training image dataset is augmented by creating new samples by processing the base images with one or more of: some slight random image transforms; random cropping inside the input image; and/or synthetically encoding lighting variations using image processing approaches. An advantage is improved data quality.

The method may be one wherein to predict a multiple-class discrete attribute, a Softmax activation is applied on the last fully-connected (FC) layer. An advantage is converting the multi-dimensional decimal outputs from the FC layer into a sum-to-one probabilistic vector in which each dimension i models the likelihood that the attribute is of the i-th class.

The method may be one wherein the step of training the deep model for garment or accessory attribute identification is an optimisation process, in which model parameters of a neural network are optimised to minimise an objective function, which is a loss function.

The method may be one wherein a loss function for a binary discrete attribute is defined based on a symmetric cross-entropy metric.

The method may be one wherein to train a deep neural network that can model multiple attributes, the optimisation problem is then to minimize the overall loss, which is defined as a weighted sum of the loss function, on each attribute. An advanatge is that different weights can be applied on each attribute so that the optimisation can be made biased towards certain attributes if needed.

The method may be one wherein to predict a continuous attribute, the deep network is re-architected into a regression model.

The method may be one wherein a linear FC layer is directly used as the last output layer of the network for regressing over the continuous target values or vectors.

The method may be one wherein the step of training the deep model for garment or accessory attribute identification is such that a combination of multiple discrete and continuous attributes are modelled simultaneously.

The method may be one wherein a trunk convolutional layer is used at the input side for common image feature extraction for all the attributes, while at the output side separate FC layer branches are used to connect to a common convolutional layer.

The method may be one wherein each FC layer branch models an attribute individually and applies different activation strategies based on a type of the target attribute being modeled.

The method may be one wherein when multiple photos in distinct camera views are available for a single target garment or fashion item, all the multiple photos are used as the input for attribute prediction. An advantage is improved accuracy in a search for the single target garment or fashion item.

The method may be one wherein to support multiple image input in the deep learning framework, a network architecture is adopted, in which a weight sharing over all the convolutional and pooling layers is applied to extract visual features from each of the input garment photos from different camera views. An advantage is improved accuracy in a search for the single target garment or fashion item.

The method may be one wherein the visual features extracted from all input images are vectorized and concatenated, and then passed to the subsequent fully-connected (FC) layers for attribute classification or regression. An advantage is improved speed in a search for the single target garment or fashion item.

The method may be one wherein the network architecture for multiple images input is further combined with that for multiple attribute prediction, which supports multiple images of the garment in distinct camera views as the input for multiple attribute prediction.

The method may be one wherein when only a relatively small labeled image dataset is available for attribute model training, a transfer-learning-based approach is used to improve the learning performance.

The method may be one wherein in a further step, which is the transfer learning step, the parameters of the last few (e.g. two) fully-connected (FC) layers are re-trained while refining the parameters of the high convolutional layers of the pre-trained deep network at a much lower learning rate.

The method may be one wherein the transfer learning step adapts the visual features of the pre-trained network to a new training data and/or a new problem.

The method may be one including the further step of using Support Vector Machines (SVMs) over the last convolutional layer features of the deep network to replace the original FC layers in the network architecture, and training a binary classifier separately for each class of the label. An advantage is improving the prediction precision.

The method may be one including the step of mapping the stored extracted attributes of the garment to physical fabric properties of the garment, and/or to model parameters for garment physics simulation. An advatange is improved rendering of a photo-realistic garment-clad virtual avatar image.

The method may be one wherein the garment attribute predictor is used to initialize model parameters of the garment physics simulator from the predicted physics attributes or material parameters so that a more accurate draping simulation can be achieved. An advatange is improved rendering of a photo-realistic garment-clad virtual avatar image.

The method may be one including a computer-implemented method of digitising a garment, and estimating the physics parameters of the garment fabric material, using a garment digitization apparatus, the apparatus including a mannequin, a mannequin rotation system, a computer system and a camera system, the method including the steps of:
(i) imaging a mannequin wearing a garment using the camera system;
(ii) rotating the mannequin wearing the garment through at least 360° using the mannequin rotation system;
(iii) capturing at least three images of the garment using the camera system during the mannequin rotation,
(iv) generating fast and jerky left-right-left rotations at a series of configured rotational accelerations and velocities to disturb the garment on the mannequin with patterned motion, and
(v) capturing the garment appearance under motion and estimating the physics parameters of the garment fabric material. An advatange is improved rendering of a photo-realistic garment-clad virtual avatar image.

The method may be one wherein multiple images of the target garment are photographed at scheduled times during the course of the vibration sequence to capture the appearance of the garment under different stages of the motion, wherein the images include (a) at least one image capturing the static status of the target garment, and (b) one or more images capturing the target garment under motion.

The method may be one including analyzing captured garment images in different phases of garment motion and predicting the garment fabric properties and/or model parameters for garment physics simulation.

The method may be one including the step of storing the predicted physics parameters into a garment database. An advatange is ease of data access for improved rendering of a photo-realistic garment-clad virtual avatar image.

The method may be one including the step of using a mannequin with a pressure sensor array embedded on or under the surface of the mannequin, which captures the stress/strain of the garment when the garment is dressed on the mannequin.

The method may be one including the steps of capturing the garment appearance under motion, measuring the strain and stretch of the garment when dressed on the mannequin, and estimating the physical parameters of the garment fabric material, and using the estimated physical parameters of the garment fabric material for photo-realistic and dynamic garment simulation and rendering in the application of virtual fitting.

The method may be one further including a computer-implemented method to improve the photo-realism of a rendered body image or a virtual avatar image.

The method may be one further including a computer-implemented method to perform automated quality control and detect digital garment models which yield pathological or ill-looking renders.

The method may be one further including a computer-implemented method to compare the rendering quality of two generated body images.

The method may be one further including a computer-implemented method to evaluate the level of photo-realism of synthetic renders of body images against real photos.

The method may be one which includes the steps of:
i) collecting one or more real photos and one or more synthetic rendered images as positive and negative samples,
ii) training a machine learning model to generate a difference image,
iii) using the machine learning model to generate a difference image,
iv) superposing the difference images onto the input synthetic rendered image to generate a more photo-realistic synthetic image.

The method may be one wherein the machine learning model is a deep neural network.

The method may be one wherein training and using the machine learning model includes the step of using two adversarial submodules: the first submodule distinguishes the synthetic virtual avatar renders from real photos of models wearing garments, and the second submodule makes modifications to the initial render output and aims to improve the photo-realism of synthetic renders of body image.

The method may be one in which the one or more digital photos of a garment or an accessory are received in a query, with the goal of finding similar items to the queried item.

The method may be one in which the one or more digital photos of a garment or an accessory are received in a query, with the goal of identifying the item provided in the query.

The method may be one wherein the one or more digital photos are of items which are one or more of: currently dressed on user's virtual avatar; recently browsed by the user; in an arbitrary photo on the internet.

The method may be one in which an attribute-based search is provided, in which an input is a set of keywords describing the query item.

The method may be one in which an approach for image-based search and image retrieval is: (a) obtaining the extracted attributes of the garment or accessory, (b) computing the feature distances between a query image and each image in the digital image datasets using a distance metric based on the extracted attributes of the garment or accessory; (c) presenting the search or retrieval results by ranking, using the computed distance metrics.

The method may be one in which an effective similarity embedding is used to fine-tune the deep model for garment or accessory attribute identification, and retrain the fully connected layers against a triplet-loss objective function.

The method may be one in which the triplet-loss objective function is a cost function of an optimisation problem that can enforce distance constraints among positive and negative sample pairs.

The method may be one in which to train the deep neural network model for learning a triplet similarity metric, a three-way Siamese architecture is adopted to handle the 3-way parallel image inputs, in which the model weights are initialized with those of a pre-trained attributed classification model, and weight sharing is applied for all the convolutional layers, and the last fully-connected layer is retrained while fine-tuning the earlier convolutional layers at a lower learning rate for the similarity learning.

The method may be one in which at the input side of the image-based garment search and retrieval system an ROI Detection Module is included, which detects the region-of-interest (ROI) of the garment in the form of bounding boxes on both the input query image and all the gallery images as a pre-processsing step.

The method may be one in which multiple bounding boxes each surrounding an individual garment or accessory item are provided as a pre-processsing step.

The method may be one in which an alternative user interface (UI) for garment or accessory retrieval or search is provided, based on direct attribute inputs, in which a user is presented with a number of attribute keyword filters or drop-down lists, so that the user can reduce the search results list and find the desired item by providing a few keywords that best describe the item they are looking for.

The method may be one including a step of performing a visual search from text descriptions of a garment or accessories, from an online fashion magazine, a fashion-related social network page, or on a retailer website.

The method may be one in which after the initial search results are provided, if the desired item is not in the search results list, the user is then allowed to further refine the search results by clicking and selecting a few items from the initial search results which they think are visually similar to the item they are looking for.

The method may be one including a method of multi-task learning for size regression or classification, in which one single deep model is trained on multiple data flows simultaneously to perform attribute-classification, similarity-metric-learning, and size-regression or classification together, based on a mechanism of weight-sharing over all the convolutional layers and the first FC layer, and performing re-training over all the branching FC layers for each task.

The method may be one further based on a mechanism of feature-enhancement.

The method may be one including, in a size advice and fit analysis, receiving user information, including one or more of, user's body shape parameters, user's location, age, and ethnicity;

receiving garment sizing and measurement information, including one or more of: garment sizes, size-charts of the garment, garment measurements on the QC sheets; receiving garment images and fit-style labels, including one or more of: the circumferential fits over different body parts and vertical drops, and including a step of re-architecting and fine-tuning the pre-trained deep model.

The method may be one in which the re-architected model maintains all the convolutional-layers of the pre-trained model but completely rebuilds the original fully-connected (FC) layers.

The method may be one in which the input to the new model includes both a garment mannequin photo and the user features, and the output of the model are 3D size-chart feature vectors.

The method may be one wherein in the fine-tuning process, different layers of the model are re-trained with different learning rates; the weights of the new FC layers are trained at a learning rate 10-times higher than those applied to the weights of the existing convolutional layers, in which the fine-tuning scheme adapts the pre-trained features to the new training data for the size recommendation problem.

The method may be one including a preprocessing step to map all the size labels in the training data into the size-chart feature vectors.

The method may be one wherein multi-image input is provided, in which multiple photos in distinct camera views are available for the target garment.

The method may be one including a size regression algorithm step which is to look up the size feature on the target size-chart and recommend the most similar size.

The method may be one wherein the output of the deep model is simply the size label, which is a multi-class discrete label instead of a continuous label, and a "softmax" activation is applied after the final FC layer to convert the network output into a sum-to-one probability vector.

The method may be one further comprising a method of garment size and fit recommendation, which includes the steps of i) predicting multiple fit-style labels and associated probabilities of a garment from one or more input photos, including one or more of circumferential fits over different body parts and vertical drops;

ii) selecting a subset of most relevant fit points by thresholding the associated probabilities obtained in i);

iii) predicting the optimal garment size and performing a fit analysis by analysing user measurements and garment measurements over the selected fit points obtained in ii);

iv) providing a fit recommendation.

According to a second aspect of the invention, there is provided a system for predicting garment or accessory attributes using deep learning techniques, the system including a processor configured to:

(i) receive and store one or more digital image datasets including images of garments or accessories;

(ii) train a deep model for garment or accessory attribute identification, using the stored one or more digital image datasets, by configuring a deep neural network model to predict (a) multiple-class discrete attributes;

(b) binary discrete attributes, and (c) continuous attributes, (iii) receive one or more digital images of a garment or an accessory, and (iv) extract attributes of the garment or the accessory from the one or more received digital images using the trained deep model for garment or accessory attribute identification.

The system may be further configured to:

(v) store the extracted attributes of the garment or accessory in a memory.

The system may be further configured to perform a method of any aspect of the first aspect of the invention.

According to a third aspect of the invention, there is provided a computer-implemented method of garment size and fit recommendation, which includes the steps of:

i) predicting multiple fit-style labels and associated probabilities of a garment from one or more input photos, including one or more of circumferential fits over different body parts and vertical drops;

ii) selecting a subset of most relevant fit points by thresholding the associated probabilities obtained in i);

iii) predicting the optimal garment size and performing a fit analysis by analysing user measurements and garment measurements over the selected fit points obtained in ii);

iv) providing a fit recommendation.

According to a fourth aspect of the invention, there is provided a computer-implemented method to recommend a garment or accessory for outfit completion, which includes i) using a voice recognition module, converting a user's voice message into a sequence of text messages;

ii) using a module of NLP or sentiment analysis, parsing the type of garment being queried, desired attributes of the query garment, outfitting constraints, and filtering constraints;

iii) converting the query type and attributes into a vectorized query feature by analysing the output probability of a machine learning model for attribute classification, iv) comparing the vectorized query feature in iii) with gallery image features pre-computed and stored in a memory device, to produce a set of candidate garment items;

v) for each candidate garment item, predicting a recommendation score based on a feature comparison score and outfitting histories, and vi) ranking the candidate garment items based on their predicted recommendation scores.

According to a fifth aspect of the invention, there is provided a computer-implemented method of digitising a garment, and estimating the physics parameters of the garment fabric material, the method using a garment digitization apparatus, the apparatus including a mannequin, a mannequin rotation system, a computer system and a camera system, the method including the steps of:

(i) imaging a mannequin wearing a garment using the camera system;

(ii) rotating the mannequin wearing the garment through at least 360° using the mannequin rotation system;

(iii) capturing at least three images of the garment using the camera system during the mannequin rotation, (iv) generating fast and jerky left-right-left rotations at a series of configured rotational accelerations and velocities to disturb the garment on the mannequin with patterned motion, and (v) capturing the garment appearance under motion and estimating the physics parameters of the garment fabric material. An advatange is improved rendering of a photo-realistic garment-clad virtual avatar image.

The method may be one wherein multiple images of the target garment are photographed at scheduled times during the course of the vibration sequence to capture the appearance of the garment under different stages of the motion, wherein the images include (a) at least one image capturing the static status of the target garment, and (b) one or more images capturing the target garment under motion.

The method may be one including analyzing captured garment images in different phases of garment motion and predicting the garment fabric properties and/or model parameters for garment physics simulation.

The method may be one including the step of storing the predicted physics parameters into a garment database.

The method may be one including the step of using a mannequin with a pressure sensor array embedded on or under the surface of the mannequin, which captures the stress/strain of the garment when the garment is dressed on the mannequin.

The method may be one including the steps of capturing the garment appearance under motion, measuring the strain and stretch of the garment when dressed on the mannequin, and estimating the physical parameters of the garment fabric material, and using the estimated physical parameters of the garment fabric material for photo-realistic and dynamic garment simulation and rendering in the application of virtual fitting.

According to a sixth aspect of the invention, there is provided a system for digitising a garment, and estimating the physics parameters of the garment fabric material, the system including a garment digitization apparatus, the apparatus including a mannequin, a mannequin rotation system, a computer system and a camera system, the system arranged to:

(i) image a mannequin wearing a garment using the camera system;

(ii) rotate the mannequin wearing the garment through at least 360° using the mannequin rotation system;

(iii) capture at least three images of the garment using the camera system during the mannequin rotation, (iv) generate fast and jerky left-right-left rotations at a series of configured rotational accelerations and velocities to disturb the garment on the mannequin with patterned motion, and (v) capture the garment appearance under motion and estimate the physics parameters of the garment fabric material.

The system may be arranged to perform a method of any aspect of the fifth aspect of the invention.

Aspects of the invention may be combined.

BRIEF DESCRIPTION OF THE FIGURES

Aspects of the invention will now be described, by way of example(s), with reference to the following Figures, in which:

FIG. 18 shows an example set of semantic label definitions describing a collection of circumferential fits and vertical drops.

FIGS. 26A and 26B show example learning algorithms of a predictive logics size advice engine.

FIG. 27 shows example inference procedures of a predictive logics size advice engine.

DETAILED DESCRIPTION

1. Overview

Figure 1:
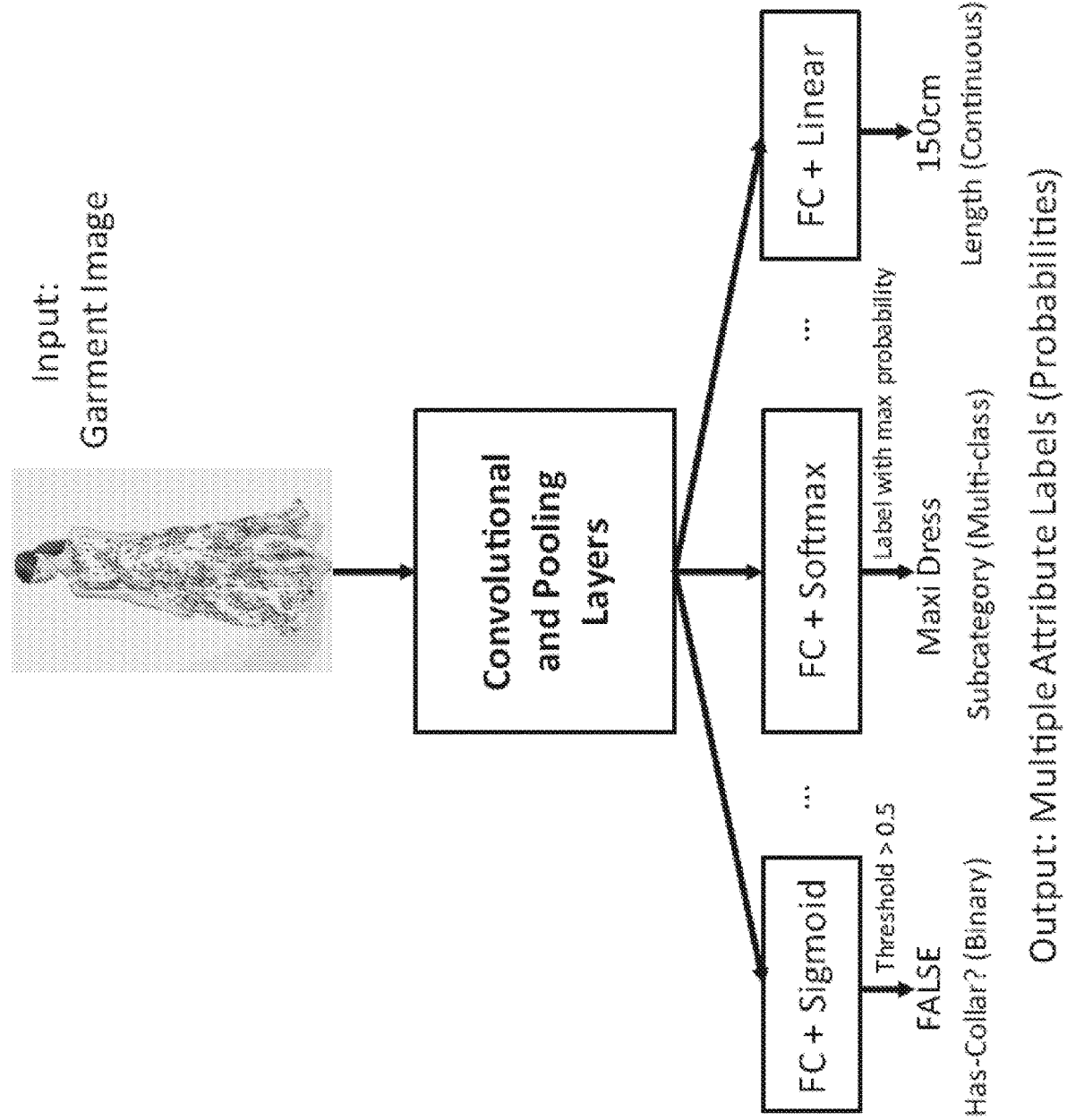
FIG. 1 shows an example of a deep network architecture for predicting multiple attributes of different types simultaneously.

This document describes several novel systems and methods to solve the problems described above, mainly in the context of online fashion.

Using advanced computer vision and deep learning algorithms, one or more photos are analysed and both intrinsic and extrinsic attributes of a garment or other accessories are automatically extracted (e.g. shoes, handbags, glasses), including but not limited to: style, shape, texture, colour, fabric properties. Several different deep neural network models and architectural changes have been applied to model multiple attributes simultaneously from one or more input images, and improve the prediction accuracy, as detailed in Section 2.

Sections 3 to 6 further describe the extension of garment attribute prediction in various other applications in the context of virtual fitting and online fashion, including:

realistic garment physics simulation and rendering for virtual fitting (Section 3);

systems for visual retrieval and search of garments or other accessories (Section 4);

size recommendation and fit advice (Section 5); and other miscellaneous systems and data applications in online fashion, including conversion and return prediction, outfit search and completion, style and trend prediction (Section 6).

Deep learning solutions are provided to solve the aforementioned problems by re-architecting and applying transfer learning on the deep models trained for garment attribute predictions. All the applications and systems above can be easily integrated with a virtual fitting system, e.g. as described in UK Patent GB2488237, and in WO2012110828A1, which are incorporated by reference.

2. Using Deep Neural Networks to Predict Garment Visual Attributes In the subsections below, we will address in greater detail 1) how to arrange training data for learning deep models, and 2) the formulation and the process of model training and prediction.

2.1 Preparing Training Data for Deep Learning In the context of the prediction of garment attributes, the image data used for model training can be in the format of:

unsegmented mannequin photos of the garment, either in a single frontal view, or in multiple distinct camera views;

segmented garment texture sprites from the mannequin photos;

sample photos of the garment on a retailer's website; and synthetic garment images obtained by rendering a simulated garment model using computer graphic techniques.

To train effective deep models for garment attribution prediction, we have collected two distinct structured and labeled image datasets based on internet garment images and mannequin photos, named "Camtail" and "Cantor" respectively. Details of the datasets are presented in the rest of this subsection.

2.1.1 Internet Fashion Images

To address the limitation of garment categorisation, we created a new dataset "Camtail" from public websites (e.g. Google, Bing and Pinterest) for the fashion categories and sub-categories, which contains about 130,000 categorised fashion-related images downloaded from these websites. Camtail includes 127 garment categories in total and around 80 new categories in comparison to any state-of-the-art fashion image dataset. In total (the categories should more appropriately be referred to sub-categories, as a category such as "maxi-dress" is in reality a part of a super-category of "dress"), it covers a diverse range of ethnic cultures for the listing garments or accessories. Almost all the images have one salient label, which is expected to be predicted during the testing phase. The annotations have been obtained through well-engineered Natural Language Processing (NLP) and have been checked, refined, and cleaned through manual efforts.

2.1.2 Mannequin Photos

Those garment mannequin photos captured and processed in the digitisation process for virtual fitting visualisation are the other source of labeled training data. This includes photographs of over 60,000 unique garment stock keeping units (SKUs) digitised and stored in our garment database "Cantor". In the dataset, garment samples are all digitised on the mannequin in a controlled lighting environment. All the photos are taken in a standard camera pose and are well aligned. The Cantor image data include high-resolution unsegmented original photos of the garment samples and segmented garment texture sprites, both in 8 distinct camera views.

Metadata and multiple semantic labels associated with each set of garment photos are available, including: Garment name and description (i.e. the text description of the garment sample on a retailer's website);

Garment category (e.g. dress, trousers) and subcategory (e.g. maxi-dress);
Colour;
Pattern and texture (e.g. stripy, checkered, dotted);
Fit styles (i.e. "tight", "normal", or "loose" fit over certain pre-defined fit points such as bust, waist, hips, shoulder, and thigh);
Vertical drops (e.g. hem-height, leg-hem, sleeve length, waist drop),
Fabric and material composition;
Washing method (e.g. dry-wash, machine-wash, hand-wash);
Price or price range.

They are either automatically scraped from websites of online retailers, or manually annotated using interactive annotation tools e.g. LabelMe (http://labelme.csail.mit.edu), or Mechanical Turk (A. M. Turk. https://www.mturk.com/mturk).

Garment names and descriptions usually contain very rich information about the garment. A module of keyword extraction or natural language processing (NLP) (e g. OpenNLP (https://opennlp.apache.org)) can be used to extract style-related attributes and semantic labels from the garment name and garment description text. Some example labels are: "sleeve", "collar", "party", "dip-hem", "striped". They can be used as the label data for supervised learning and training a machine-learning-based garment attribute predictor.

For better data quality and performance, we can also further structure the semantic labels and keywords e.g. 1) by associating groups of different keywords of similar meanings, and/or 2) assigning continuous label weights with values between 0 to 1. This will convert the attribute prediction problems into regression problems (for continuous attributes) or multi-label classification problems (for multi-class discrete attributes). The deep learning solutions to these two types of problems are detailed in Section 2.2.1.

2.1.3 Data Augmentation

In the model training stage, we can also augment the training image dataset by creating new samples by processing the base images with:

some slight random image transforms (e.g. scaling, translation, 2D/3D rotation, skewing);
random cropping inside the input image; and/or
synthetically encoding lighting variations using image processing approaches (e.g. applying gamma correction or colour balancing).
This helps build a deep network classifier with better adaptation capability to the variation in the input image and hence better performance.

2.2 Deep Learning Formulations for Attribute Predictions 2.2.1 Modelling Discrete and Continuous Attributes Deep neural network models can be configured to predict three different types of attributes, including:

1. multiple-class discrete attributes (e.g. colour, garment type), also known as 'categorical attributes';
2. binary discrete attributes (e.g. whether a garment has a collar), and;
3. continuous attributes (e.g., Young's moduli of fabric, locations of landmarks).

The first two are formulated as classification problems, while the last one is formulated as regression problems.

To predict a multiple-class discrete attribute $A_{md}$ a "Softmax" activation is applied on the last fully-connected (FC) layer as follows:

$$y = [y_1, y_2, \ldots, y_{N_c}], \text{ where} \quad (1)$$

$$y_c = P(A_{md} = c) = \frac{\exp(-x_c)}{\sum_{i=1}^{N_c} \exp(-x_c)}, c = 1, 2, \ldots, N_c, \quad (2)$$

which will convert the multi-dimensional decimal outputs $x=[x_1, x_2, \ldots, x_{N_c}]$ from the FC layer into a sum-to-one probabilistic vector $y = [y_1, y_2, \ldots, y_{N_c}]$ in which each dimension i models the likelihood that the attribute $A_{md}$ is of the i-th class (i=1,2, . . . , N).

The process of deep model training is an optimisation process, in which model parameters of a neural network are optimised to minimise an objective function, called the "loss function". For the multiple-class discrete attribute $A_{md}$, the loss function $\text{Loss}_{md}$ is normally defined based on a cross-entropy metric as follows:

$$\text{Loss}_{md} = \sum_{i=1}^{N} g_i \log(y_i) \quad (3)$$

$$= \sum_{i=1}^{N} \sum_{j=1}^{d} g_{i,j} \log(y_{i,j}),$$

where $y_i$ stands for the final sum-to-one probabilistic vector output of the current neural network, and $g_i$ stands for the "one-hot" encoding of the ground truth label $l_i$ corresponding to the i-th training sample (i=1,2, . . . , N).

If the ground truth label $l_i$=k, its "one-hot" encoding is $g_i = [g_{i,j}]_{j=1}^d$ in which $g_{i,k}$=1 and all the other elements are set to 0.

In contrast, if the discrete attribute $A_{bd}$ is a binary attribute, we use "Sigmoid" activation instead, as follows:

$$y = P(A_{bd} = \text{True}) = \frac{\exp(-x)}{1 + \exp(-x)}. \quad (4)$$

This simply yields a scalar probability output y by discarding the redundant false-label probability, given the relationship $P(A_{bd}=\text{False})=1-P(A_{bd}=\text{True})$. As the consequence, the loss function $\text{Loss}_{bd}$ for the binary discrete attribute is defined based on a symmetric cross-entropy metric, as shown in (5):

$$\text{Loss}_{bd} = \sum_{i=1}^{N} (g_i \log(y_i) + (1 - g_i) \log(1 - y_i)), \quad (5)$$

where $y_i$ stands for the final output of the neural network, and $g_i$ stands for the ground truth binary label corresponding to the i-th training sample (i=1,2, ..., N).

To predict a continuous attribute $A_c$, it requires to re-architect the deep network into a regression model. A linear FC layer (i.e. linear activation) is directly used as the last output layer of the network for regressing over the continuous target values or vectors. The loss function $Loss_c$ is normally defined as a L1 or L2 (i.e. Euclidean) distance metric as follows $$Loss_{c,L2} = \sum_{i=1}^{N} \|g_i - x_i\|^2, \quad (6)$$

$$Loss_{c,L1} = \sum_{i=1}^{N} |g_i - x_i|, \quad (7)$$

where $y_i$ stands for vector output of the neural network and $g_i$ stands for the continuous ground truth label vector corresponding to the i-th training sample (i=1,2, ..., N).

In deep learning, several optimisation methods have been proposed to solve the optimisation problems defined based on the loss functions in Eqs. (3), (5), (6), and (7). Most commonly used solvers include stochastic gradient descents (SGD) (L. Bottou, Stochastic gradient descent tricks, In *Neural Networks: Tricks of the Trade*, pages 421-436, Springer, 2012), Adam (D. Kingma and J. Ba, Adam: A method for stochastic optimization, *ICLR*, 2015), AdaGrad (J. Duchi, E. Hazan, and Y. Singer, Adaptive subgradient methods for online learning and stochastic optimization, *Journal of Machine Learning Research*, (12):2121-2159, 2011).

2.2.2 Modelling Multiple Attributes Simultaneously

We aim to learn the deep network that is capable of modelling a combination of $N_A$ multiple discrete and continuous attributes $A_1, A_2, \ldots, A_{N_A}$ simultaneously.

FIG. 1 shows an illustration of the deep network architecture for predicting multiple attributes of different types simultaneously. The convolutional and pool layers in the diagram can accommodate an arbitrary recent network architecture for image classification, e.g. VGG11/16/19, GoogLeNet. In the network design illustrated in FIG. 1, we adopt a trunk convolutional layer (Conv) at the input side for common image feature extraction for all the attributes, while at the output side we use $N_A$ separate FC layer branches ($FC_1, FC_2, \ldots, FC_{N_A}$) connecting to the common convolutional layer (Conv). Each FC layer branch $FC_i$ models an attribute $A_i$ individually and applies different activation strategies based on the type of the target attribute being modeled (i.e. multi-class, binary, or continuous). The output feature vector y is then the concatenation of the feature vector outputs $y_i$ (i=1,2, ..., $N_A$) from all FC layer branches $FC_1, FC_2, \ldots, FC_{N_A}$, as shown in the following equation (8).

$$y = [y_1, y_2, \ldots, y_{N_A}] \quad (8)$$

To train a deep neural network that can model multiple attributes, the optimisation problem is then to minimize the overall loss Loss, which is defined as a weighted sum of the loss function $Loss_i$ (i=1,2, ..., $N_A$) on each attribute $A_i$ as follows:

$$Loss = \sum_{i=1}^{N_A} w_i Loss_i. \quad (9)$$

The definition of the loss function $Loss_i$ is dependent on the type of attribute $A_i$ (i=1,2, ..., $N_A$) being modeled, as detailed in Section 2.2.1. Different weights $w_i$ (i=1,2, ..., $N_A$) can be applied on each attribute $A_i$ so that the optimisation can be made biased towards certain attributes if needed.

2.2.3 Supporting Multiple Image Input

When multiple photos in distinct camera views are available for a single target garment or fashion item, we can use all of them as the input for attribute prediction; normally achieving a better prediction accuracy thanks to the additional information provided from the additional viewpoints.

Figure 2:
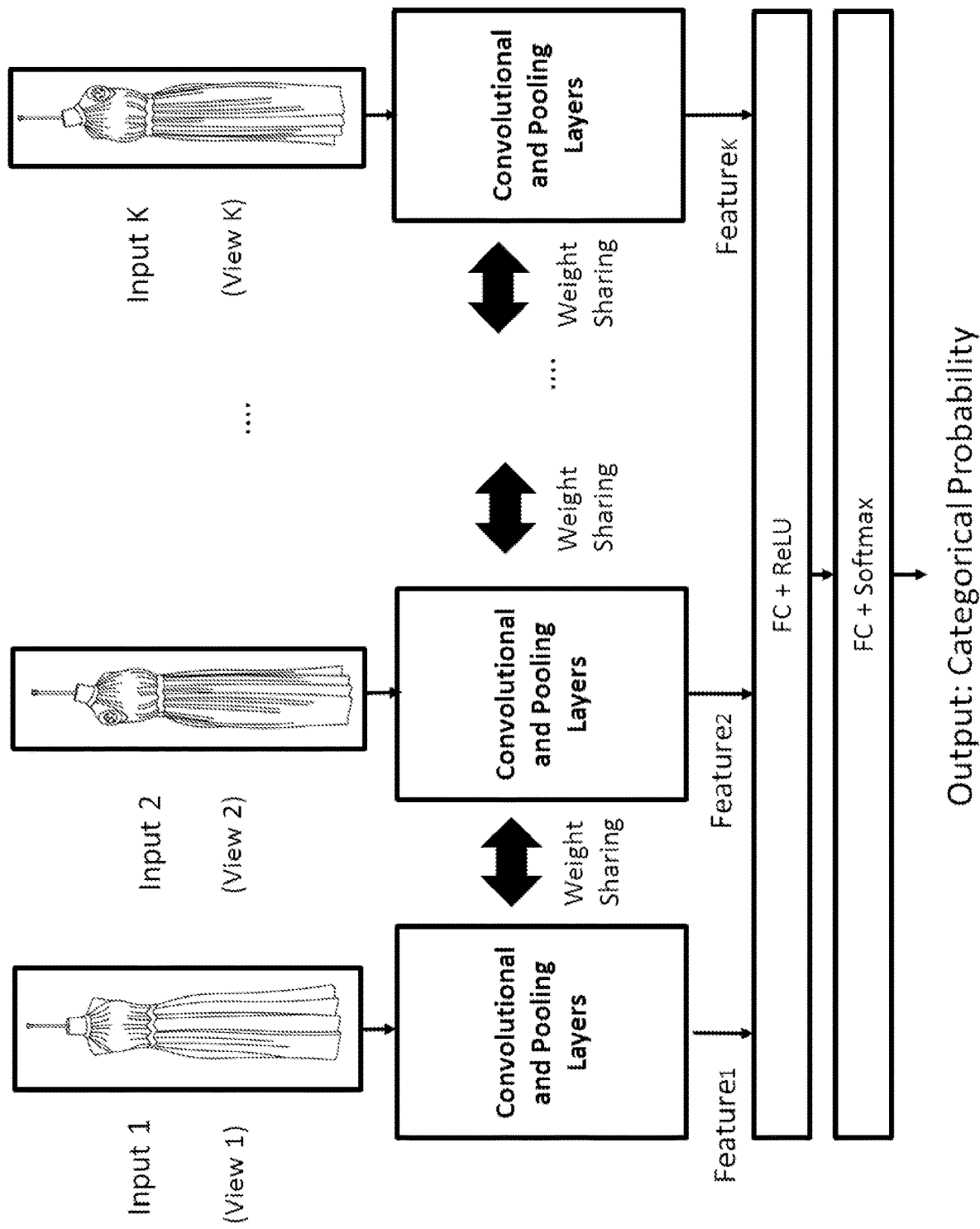
FIG. 2 shows an example of a deep neural network architecture that supports K multiple images of the garment in distinct camera views as the input for attribute prediction.

FIG. 2 shows a deep neural network architecture that supports K multiple images of the garment in distinct camera views as the input for attribute prediction. The convolutional and pool layers in the diagram can accommodate an arbitrary recent architecture for image classification, e.g. VGG11/16/19, GoogLeNet. To support multiple image input in the deep learning framework, we adopt a network architecture illustrated in FIG. 2, in which we apply a weight sharing over all the convolutional and pooling layers to extract visual features from each of the all K input garment photos in different camera views. The visual features extracted from all K input images are vectorized and concatenated, then passed to the subsequent fully-connected (FC) layers for attribute classification or regression.

Figure 3:
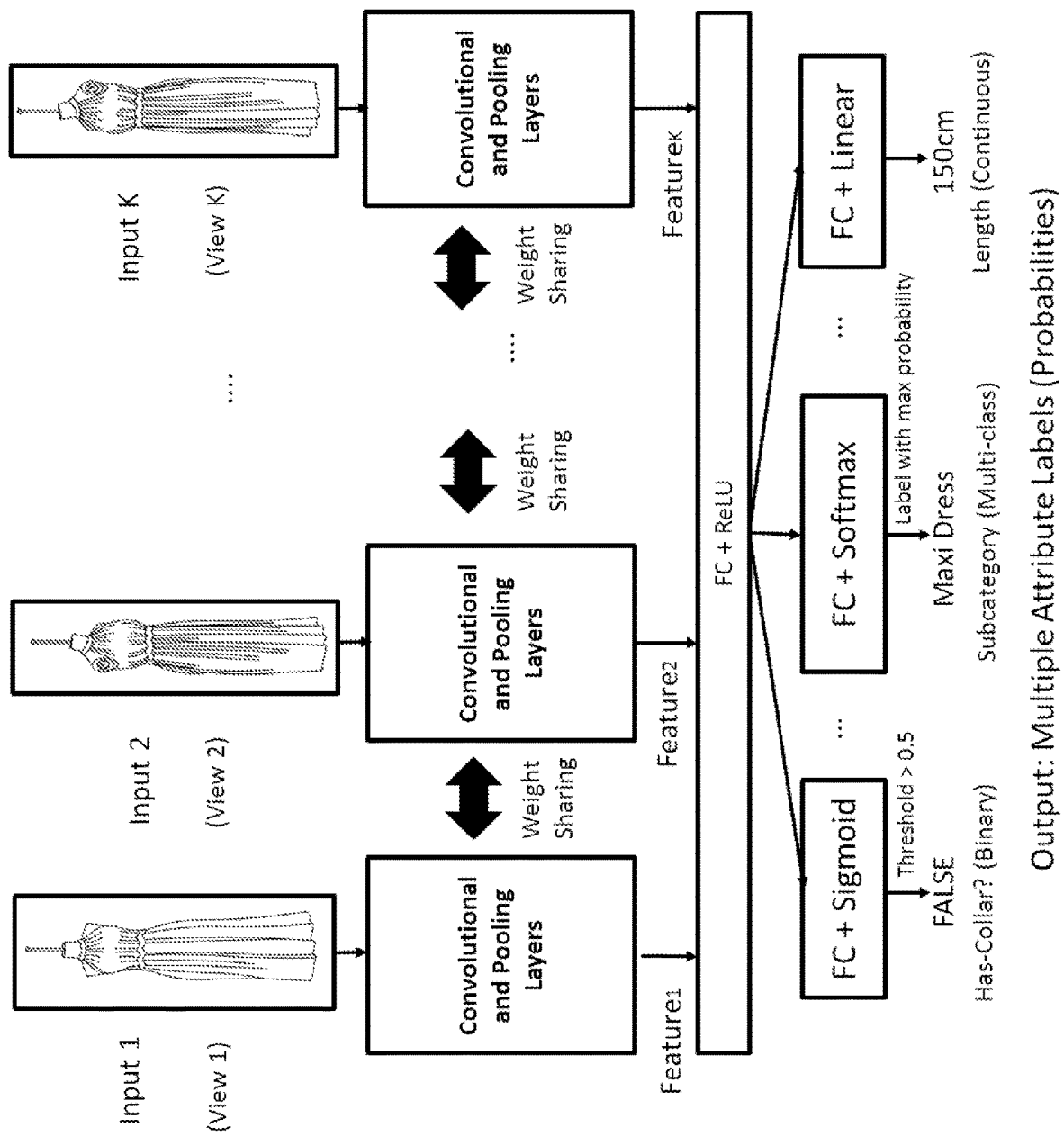
FIG. 3 shows an example of a deep neural network architecture that supports K multiple images of the garment in distinct camera views as the input for multiple attribute prediction.

It is worthwhile to mention that the network architecture for multiple images input can be further combined with that for multiple attribute prediction, as illustrated in FIG. 3, which supports K multiple images of the garment in distinct camera views as the input for multiple attribute prediction, as described in Section 2.2.3. The convolutional and pool layers in the diagram can accommodate an arbitrary recent architecture for image classification, e.g. VGG11/16/19, GoogLeNet. In the diagrams, "ReLU" stands for a rectified linear unit, a nonlinear activation on the output of fully connected layers, i.e., ReLU(x)=max (0, x).

2.2.4 Transfer Learning and Model Re-Training

A common issue with the deep learning approaches described in the previous subsection is that training a working deep CNN model for attribute prediction may require an enormous amount of labeled data. In the case when only a relatively small labeled image dataset is available for attribute model training, a transfer-learning-based approach can be used to improve the learning performance. This includes two stages, as follows.

In the first stage (i.e. the pre-training stage), we use a large public image dataset for object recognition (e.g. ImageNet (A. Krizhevsky, I. Sutskever, and G. E. Hinton, Imagenet classification with deep convolutional neural networks, *NIPS*, 1(2):4, 2012), or the "Camtail" dataset described in Section 2.1.1, which contains a large number of garment images scraped from public websites, to train an initial deep neural network and learn the generic visual features at different levels.

Figure 4A:
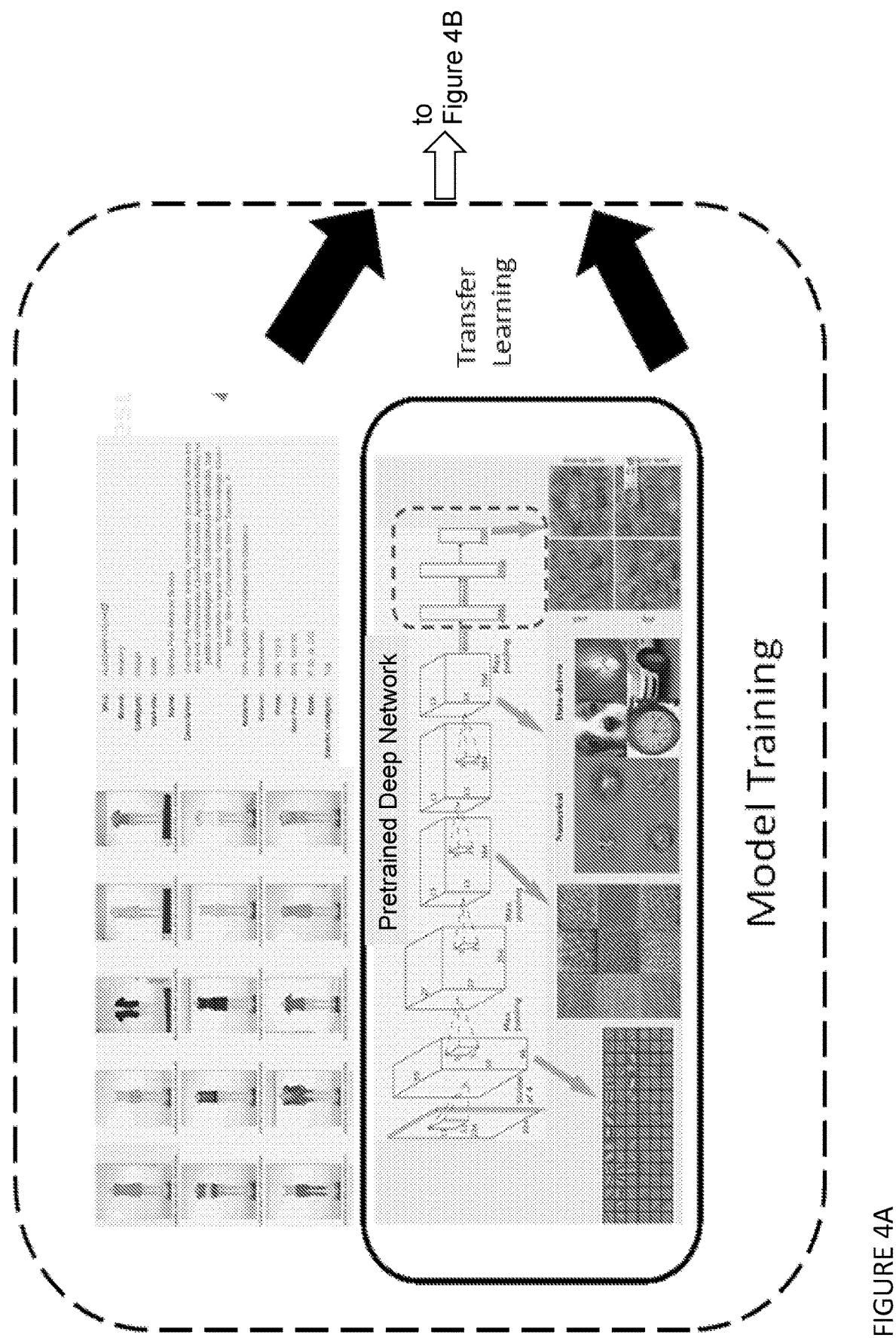
FIGS. 4A and 4B show an example of repurposing a general CNN classifier trained on a general image recognition data set to solve the garment attribute prediction problem by transfer learning.
Figure 4B:
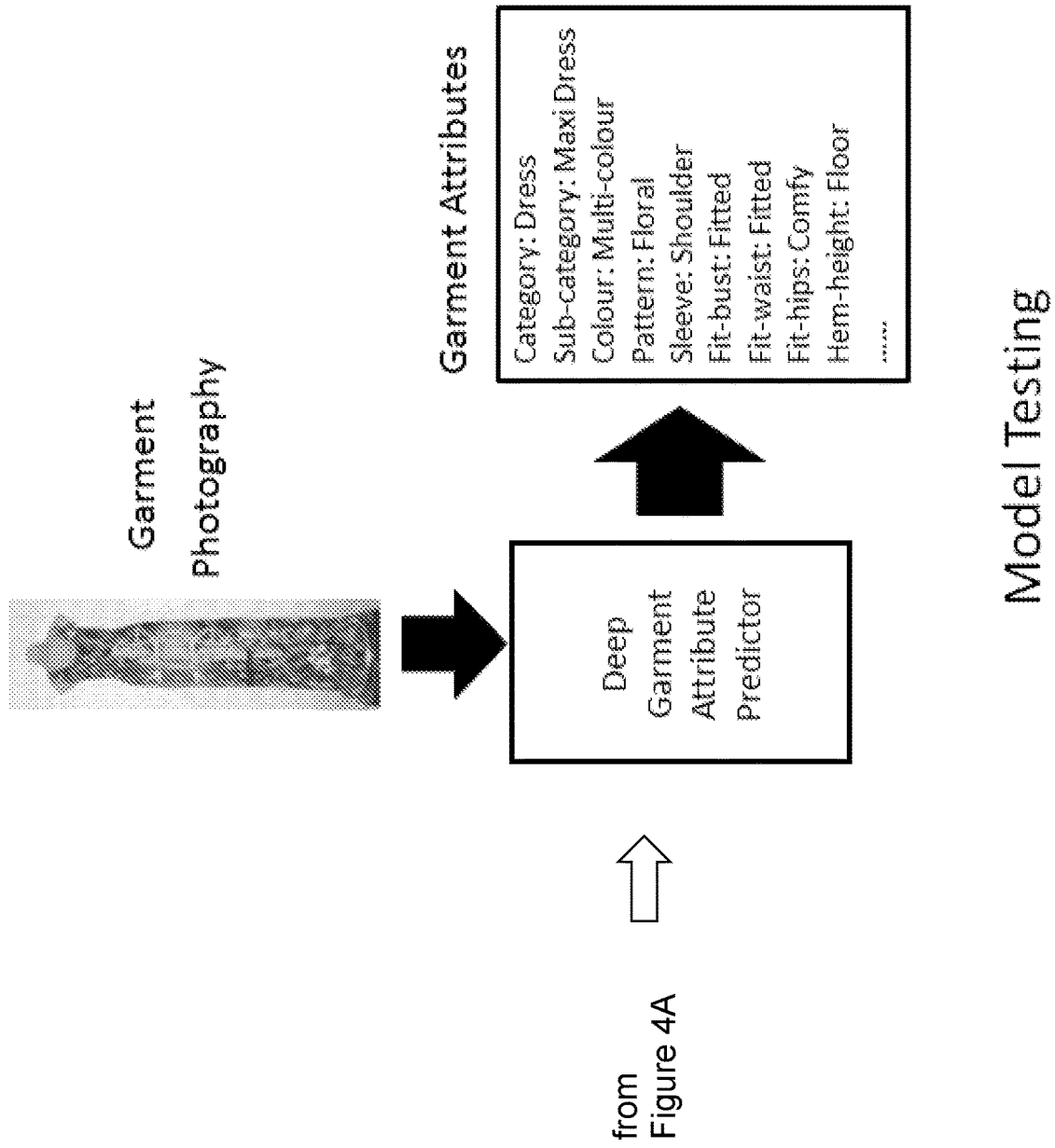

Then, in the second stage (i.e. the transfer learning stage), we re-train the parameters of the last few fully-connected (FC) layers while refining the parameters of the high convolutional layers of the pre-trained deep network at a much lower learning rate (called "fine-tuning"). This process will adjust the network weights of the pretrained neural network and repurpose the network to model the target garment image dataset (e.g. the "Cantor" mannequin photo dataset (see Section 2.1.2), or an arbitrary garment image collection of a specific retailer). See FIGS. 4A and 4B for a high-level illustration of an example process. FIGS. 4A and 4B show an illustration for repurposing a general CNN classifier trained on a general image recognition data set to solve the garment attribute prediction problem by transfer learning.

The transfer learning stage adapts the visual features of the pre-trained network to a new training data and/or a new problem. It normally requires a much smaller amount of new training data compared with what is needed for pre-training.

It is worthwhile to mention that the deep neural network can also be partially re-architected in the transfer learning stage to solve a different problem, e.g. similarity learning (see Section 4.1.1). A typical technique is to maintain all the convolutional-layers of the architecture but completely rebuild the original fully-connected (FC) layer(s) with different output dimensions and a different loss function. This technique of re-architecting and re-training has been applied to solve the derived problems of image-based visual search and size recommendation. More details will be presented in Sections 4 and 5, respectively.

2.3 Improving Prediction Precision using Support Vector Machine (SVM)

To model the multi-class categorical attributes, we trained a deep convolutional neural network (CNN) (e.g. GoogLeNet) using the Softmax Loss which minimizes the negative log likelihood. We wished to test if pre-training a CNN on some large datasets might help, for transfer learning purposes. We thus used the Berg Fashion dataset (M. Hadi Kiapour, X. Han, S. Lazebnik, A. C. Berg, and T. L. Berg, Where to buy it: Matching street clothing photos in online shops, In *Proceedings of the IEEE International Conference on Computer Vision*, pages 3343-3351, 2015) for pretraining the deep model. We then fine-tuned the last fully-connected (FC) layer of the deep network with our dataset. Where we saw an improvement with pre-training, we further used Support Vector Machines (SVMs) over the last convolutional layer features of the deep network to replace the original FC layers in the network architecture, and trained a binary classifier separately for each class of the label. For SVM, in an example we use the implementation of S. Shalev-Shwartz, Y. Singer, N. Srebro, and A. Cotter, Pegasos: Primal estimated sub-gradient solver for svm, *Mathematical programming*, 127(1):3-30, 2011.

SVM works best when the deep features do not present sufficient decorrelation between the classes at hand. For attributes that are subtle to detect (i.e. textures), the deep feature vector does not present enough decorrelation between the classes, and thus SVM improves. For colour categories, the feature vector is quite decorrelated across pairs of classes, thus, max-margin framework does not improve much in comparison to the normal fully connected layer. This has been a consistent observation across the research community, and thus we normally see SVM being applied over deep features for attribute detection, and not for object detection. Till now, there has been no analysis in the literature for such a cause, and clearly no concrete related theory exists. An attempt to embark upon such directions with CNNs has been made in the recent work of S. Shankar, D. Robertson, Y. Ioannou, A. Criminisi, and R. Cipolla, Refining architectures of deep convolutional neural networks, *arXiv preprint arXiv:*1604.06832, 2016.

2.4 Further Ablation Studies of Model Designing

We have carried out several ablation studies to decide what works best for the model design and what does not, as summarised below:

1. The CNN architecture we mostly used was GoogLeNet. Alternatively, we could have used VGG-11 (or its more-layer variants) or ResNet. However since we were training a small number of classes with each CNN, we did not want to overfit the training data, and thus wanted to have an architecture which has a lower number of model parameters, but also has been proven to achieve near state-of-the-art performance. GoogLeNet was thus the preferred choice since it contains almost 4 times fewer parameters than VGG-11 and ResNet. We experimented with VGG-11, VGG-19, ResNet-18 and ResNet-34 for training a CNN on clothing type categories, and found that none exceeds GoogLeNet in performance. VGG-11 gave a slightly improved performance on material labels than GoogLeNet, but the advantage diminished after pre-training and applying SVMs.

2. We experimented with manually cropping salient image portions for training and testing. However, we found no improvement in the accuracy. We shall discuss later that this is because the CNNs are generally very good in predicting the saliency maps over the image when the image has minimal clutter.

3. Since fitting style labels (e.g. over fit-points bust, waist, hips, thigh) can sometimes be related by an ordering (like "baggy">"fit"), we tried Euclidean loss (generally used for regression tasks using CNNs) for classification purposes. However, we could not see any improvement in the classification accuracy. This can be attributed to the reason that Euclidean loss only orders the classes in an implicit manner hence no explicit ranking loss is incorporated. To potentially improve accuracy with such rank-structure between the output labels, one might need to use more sophisticated loss functions, e.g. as disclosed in Y. Gong, Y. Jia, T. Leung, A. Toshev, and S. Ioffe, Deep convolutional ranking for multilabel image annotation, *arXiv preprint arXiv:*1312.4894, 2013.

4. It is also noted that predicting the fit-style label would rely on using mannequin photos as input, as the deep network would be able to visually analyze the relative tightness of the garment with respect to the underlying mannequin.

5. To ameliorate the performance further, one might need to discover more sophisticated methods for training with CNNs. One of the potential solutions is described in Z. Liu, P. Luo, S. Qiu, X. Wang, and X. Tang, Deepfashion: Powering robust clothes recognition and retrieval with rich annotations, In *Proceedings of the IEEE Conference on Computer Vision and Pattern Recognition*, pages 1096-1104, 2016, which uses a CNN trained over clothing landmarks to better infer the attribute labels.

3. Improving Garment Physics Simulation and Rendering

One application of garment attribute prediction is to improve the accuracy of garment physics simulation and rendering quality for virtual fitting.

Figure 5:
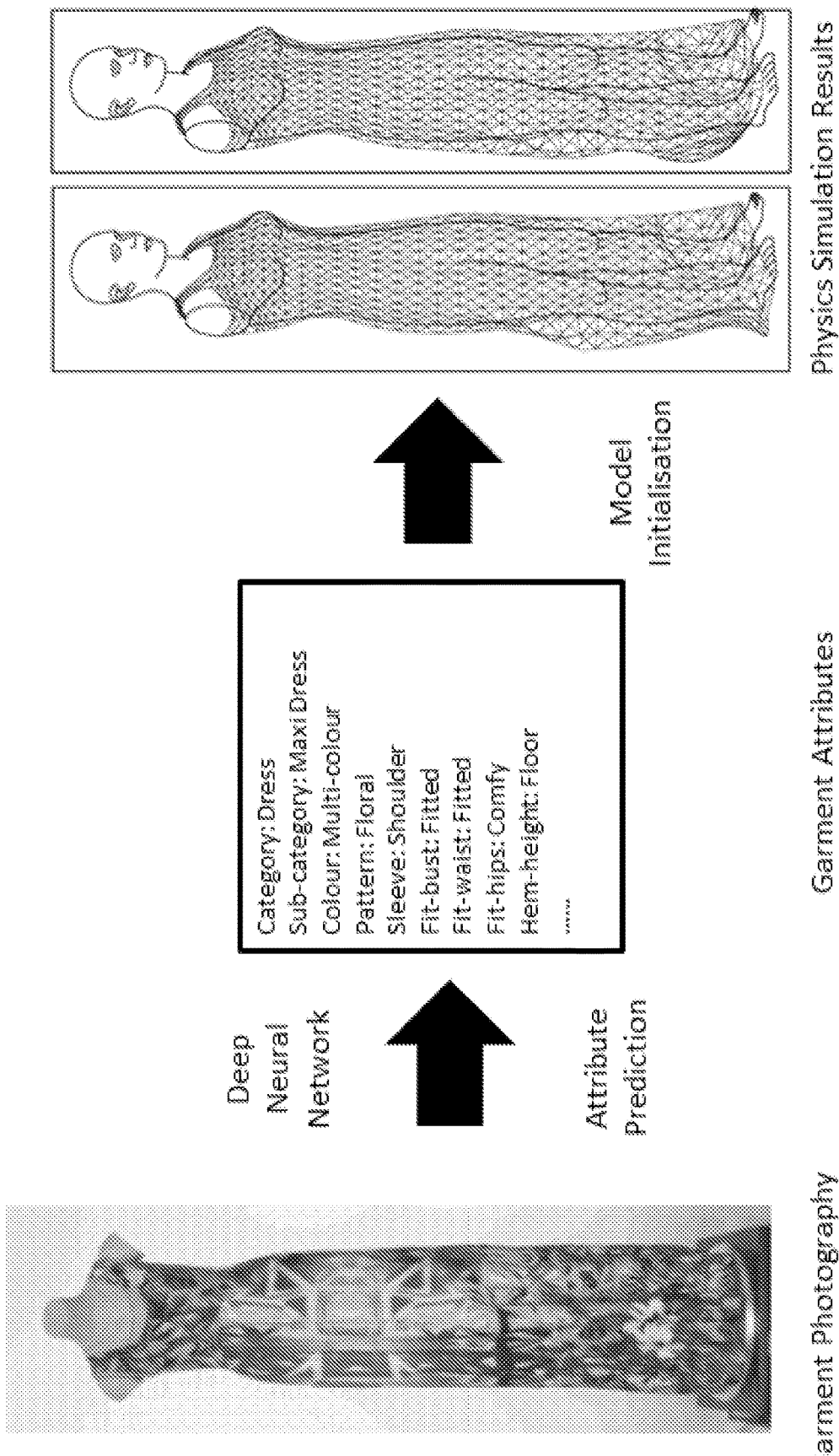
FIG. 5 shows an example of using image-based garment attribute prediction to initialize the model parameters.

Achieving an accurate garment physics simulation is essential for rendering a photo-realistic virtual avatar image. We can first predict garment attributes (e.g. colour, pattern, material type, washing method) using a machine learning model, such as the deep neural network classifiers or regressors described in Section 2, from one or more garment images and/or garment texture samples, and then map them to a number of fabric physical properties (e.g. stiffness, elasticity, friction parameters) and/or model parameters of the 3D physics model. The garment attribute predictor can be used to initialize the model parameters of the garment physics simulator from the predicted physics attributes or material parameters so that a more accurate draping simulation can be achieved. Fig.5 shows an illustration of an example of using image-based garment attribute prediction to initialize the model parameters for precise garment physics simulation.

On the other hand, we can further improve the quality of a virtual avatar image at the output side of the graphics rendering pipeline. This can be achieved by implementing a data-driven rendering quality improvement module that will modify the render output of the virtual avatar visualisation system to enhance its photo-realism. More details will be described in Section 3.4.

3.1 Using a Vibrating or an Impulse Mannequin System

An alternative or additional way of input to predict the physical properties or parameters of garments is to use a sequence of photos of a garment sample which is dressed on a mannequin and under a series of patterned motions controlled by circuits or a computer. The patterned motions include but are not limited to 1) vibrational rotation of turntable/rotational motor mounting the mannequin with a known constant rotational acceleration and speed, and controlled by circuits or a computer, or 2) a linear impulsive displacement at a known constant acceleration and speed using a gantry system.

Figure 6:
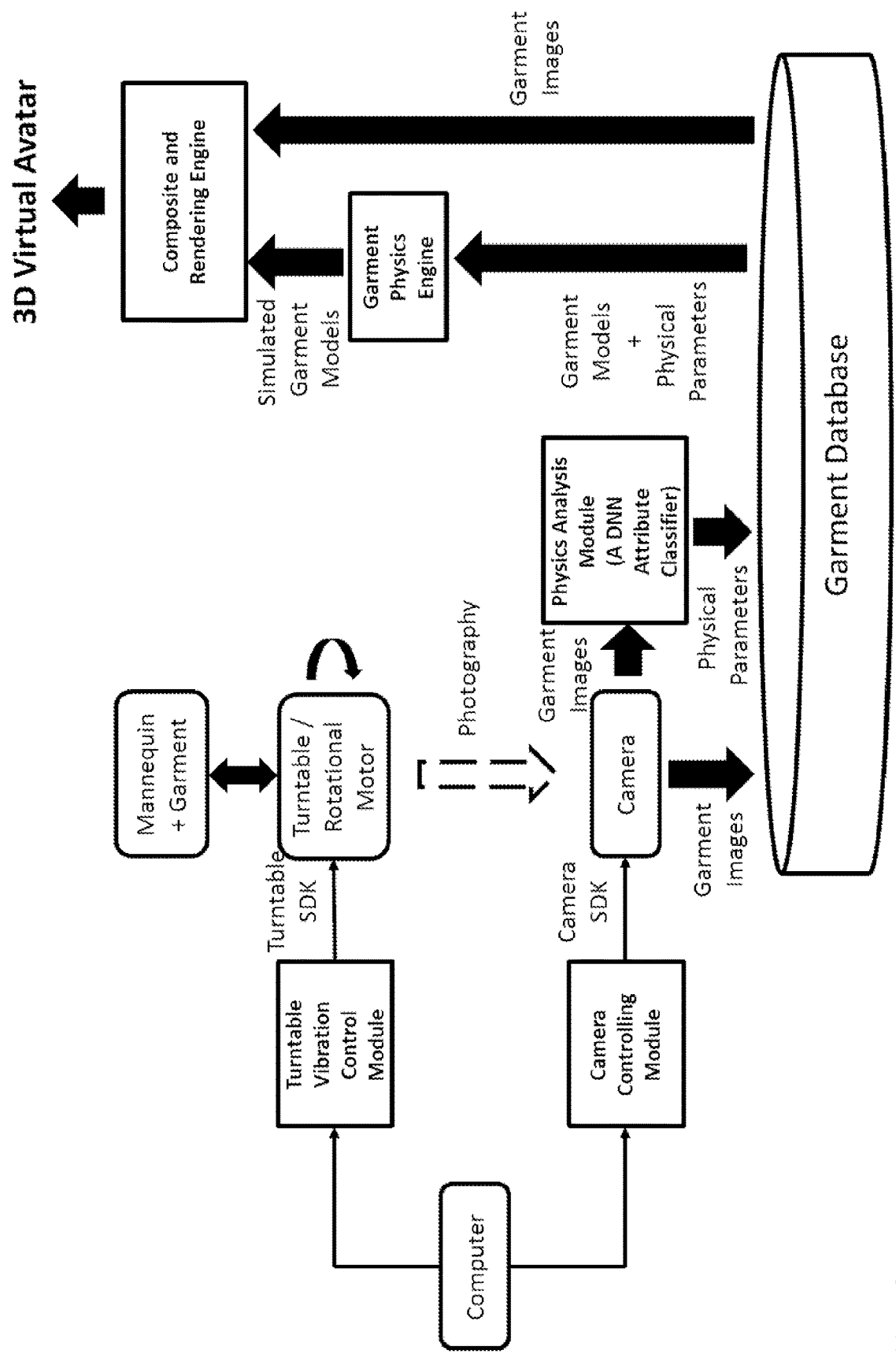
FIG. 6 shows an example of a garment digitisation system using programmed vibrational mannequin rotations.

FIG. 6 shows a garment digitisation system using programmed vibrational mannequin rotations. The system can be used to capture the garment appearance under motion and estimate the physics parameters of the garment fabric material, which can be used for photo-realistic and dynamic garment simulation and rendering in the application of virtual fitting. FIG. 6 gives an example of the system design described above based on a vibrating mannequin-turntable system. The computer first controls a program called "vibrational rotation control module", which is implemented using a software development kit (SDK) for programming against a turntable or a rotational motor. With the program, fast and jerky left-right-left rotations at a series of configured rotational accelerations and velocities are generated to disturb the garment sample on the mannequin with patterned motion.

The computer also controls another program called "Camera Control Module" (see FIG. 6) in parallel, which is implemented using a camera SDK to control the settings and the shutter of the camera. Under the command of the camera control module, multiple images of the target garment are photographed at scheduled times during the course of the vibration sequence to capture the appearance of the garment under different stages of the motion. They should include 1) at least one image capturing the static status of the target garment, and 2) one or more (K) images capturing the target garment under motion.

The "Physics Analysis Module" is a deep neural network (DNN) model for fabric attribute prediction or regression, as described in Section 2, which analyzes the captured garment images in different phases of the motion and predicts the garment fabric properties and/or model parameters for garment physics simulation. Two network architecture options can be adopted to implement the module; in the first the captured images are merged into one single multi-channel image (assuming RGB images are used it will be of 3×(K+1) channels) and fed as the input of the "Physics Analysis Module"; the second is to use an attribute prediction network based on multiple images input, as illustrated in FIGS. 2 and 3 in Section 2.2.3.

The output of the model can be 1) a multi-class label of fabric types of the garment (e.g. "cotton", "silk", "polyester") and/or associated class probabilities, or 2) an array of decimal values of fabric parameters (e.g. Young's modulus, stress and strain, or model parameters of the garment physics engine used in the virtual fitting system). These predicted physics parameters are stored into a garment database together, as shown in FIG. 6, with all the original garment photos digitised from the garment samples.

All the data can be used for later physics simulation, composition and rendering at run-time. See FIG. 6 for illustration. The provided scheme allows the system to predict behaviour of a garment under motion and predict the fabric composition and physics properties of the target garment, hence allowing more photo-realistic simulation and rendering in the virtual fitting applications.

3.2 Using a Mannequin with a Pressure-Sensor Array

Figure 7:
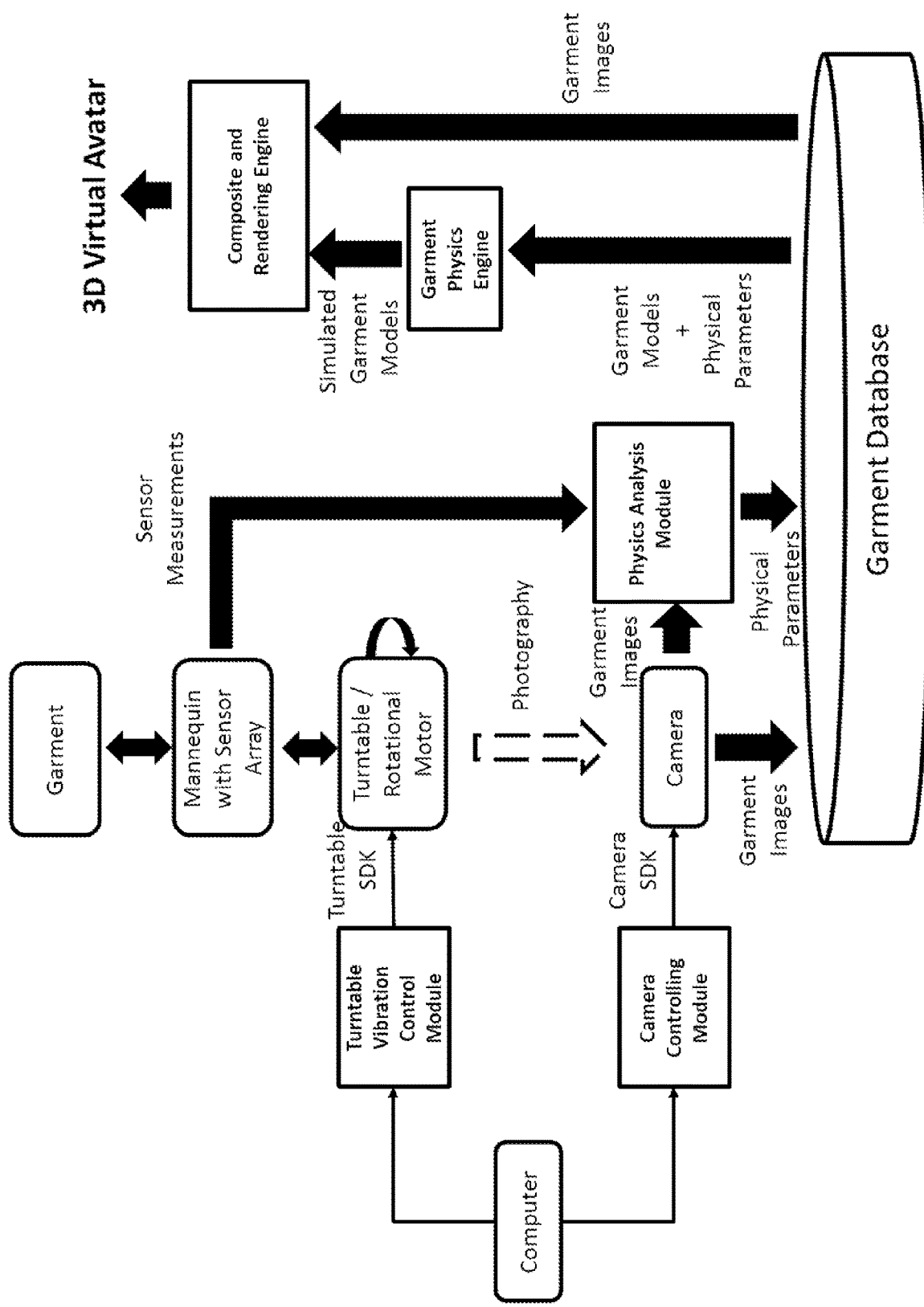
FIG. 7 shows an example garment digitisation system using programmed vibrational mannequin rotations and a mannequin with a pressure-sensor array embedded.

Alternatively or additionally, we can further use a mannequin with a pressure sensor array embedded on or under the surface of the mannequin, which may capture the stress/strain of the garment when the garment is dressed on the mannequin. The output of the sensor array may be a vector of amplitude signals. FIG. 7 shows a sample system diagram of the described system using programmed vibrational mannequin rotations and a mannequin with a pressure-sensor array embedded. The system can be used to capture the garment appearance under motion, measure the strain and stretch of the garment when dressed on the mannequin, and estimate the physical parameters of the garment fabric material, which can be used for photo-realistic and dynamic garment simulation and rendering in the application of virtual fitting.

In the "Physics Analysis Module" of the described system (see FIG. 7), the sensor measurements can be vectorized and used as additional input in combination with the multiple garment images as the input for training the machine-learning-based garment physics attribute predictor. For example, it can be implemented using a deep neural network with a network architecture illustrated in FIG. 8.

Figure 8:
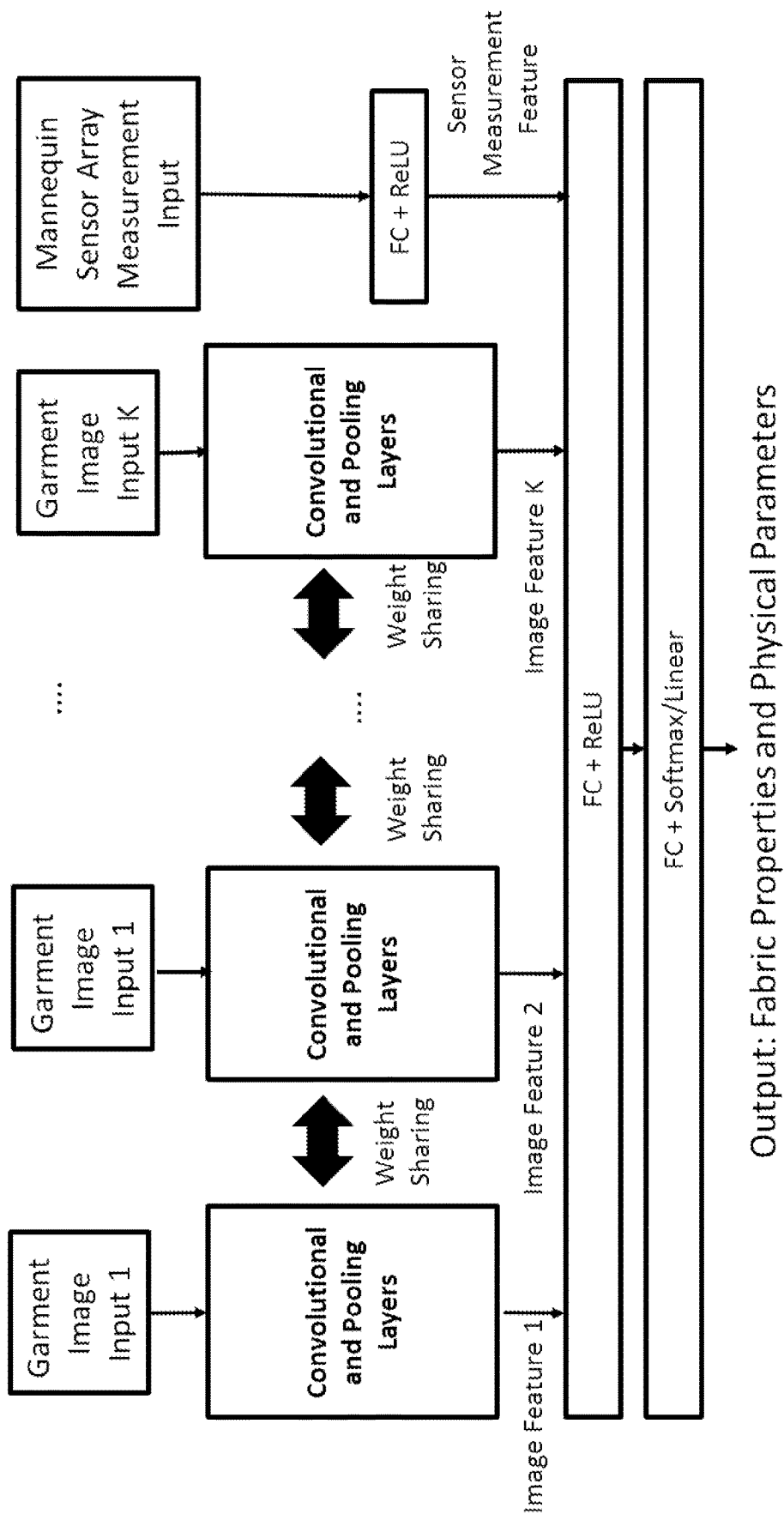
FIG. 8 shows an example of a deep neural network architecture for implementing the "Physics analysis module" of the garment digitisation system.

FIG. 8 shows an example of a deep neural network architecture for implementing the "Physics analysis module" of the garment digitisation system in FIG. 7, as described in Section 3.2. The convolutional and pool layers in the diagram can accommodate an arbitrary recent architecture for image classification, e.g. VGG11/16/19, GoogLeNet. In the architecture, we apply a weight sharing mechanism over all the convolutional and pooling layers to extract visual features from each of the all K garment photos captured under different stages of the motion. The vectorized sensor measurements input first pass through an additional fully-connected layer for dimension reduction and then the output feature is merged with other feature vectors extracted from all K input images by vector concatenation for attribute classification or regression.

3.3 Error Functions and Validation of Physics Simulation

To train the model that captures the actual physics properties and draping of the garment, we can define a cost function based on 1) the difference of hem height of the source and the target garment, and/or 2) silhouette difference in multiple views using features of the source garment and the target garment (e.g. Chamfer distance (H. Barrow, J. Tenenbaum, R. Bolles, and H. Wolf, Parametric correspondence and chamfer matching: Two new techniques for image matching, *Proc. 5th Int. Joint Conf: Artificial Intelligence,* pages 659-663, 1977; A. Thayananthan, B. Stenger, P. Ton, and R. Cipolla, Shape context and chamfer matching in cluttered scenes, In *IEEE Conference on Computer Vision and Pattern Recognition*, volume 1, pages 127-133, 2003) or Hausdorff distance (D. Huttenlocher, R. Lilien, and C. Olson, View-based recognition using an eigenspace approximation to the hausdorff measure, *IEEE Trans. Pattern Analysis and Machine Intelligence (PAMI)*, 21(9):951-955, 1999).

3.4 Improving Rendering Quality

Figure 9:
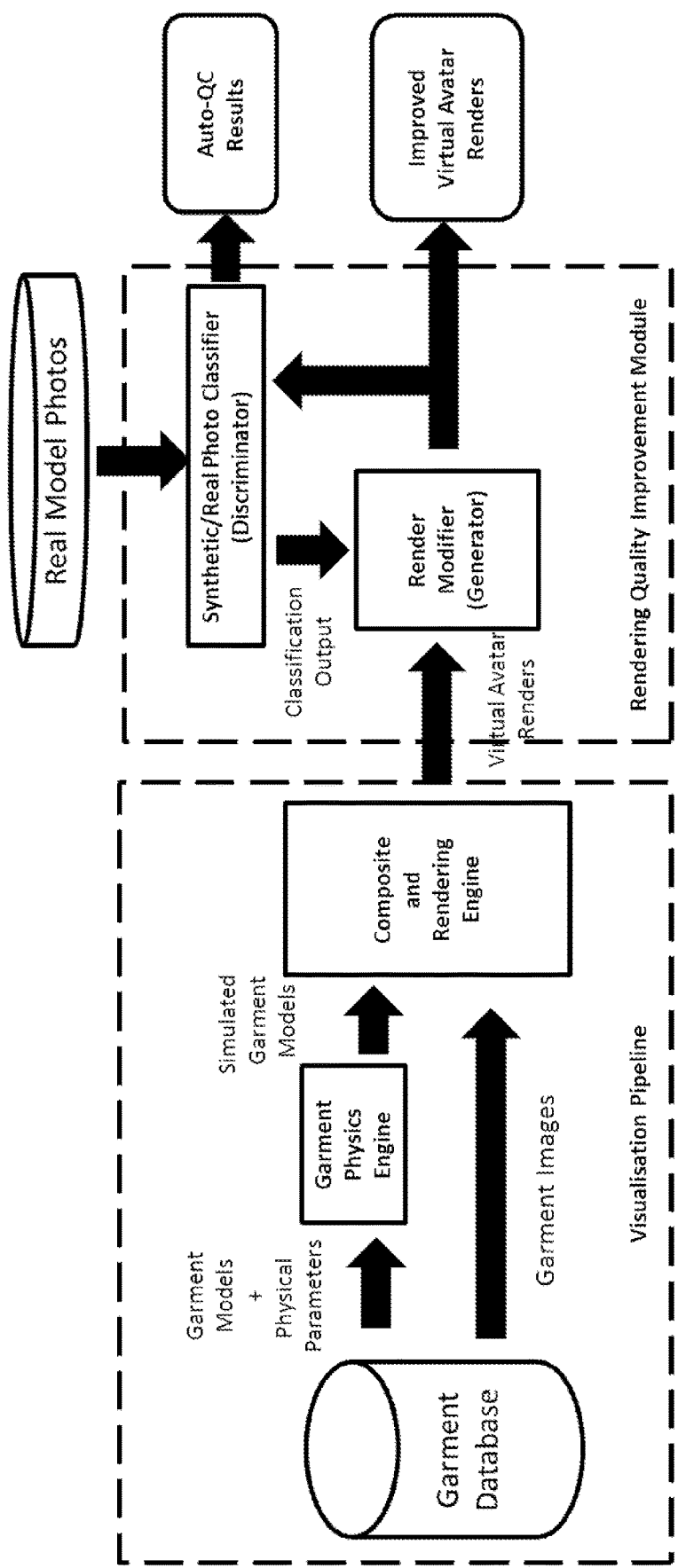
FIG. 9 shows an example of a system for improving image quality and photo-realism of virtual avatar rendering.

In addition to the mechanisms for improving the physics simulation as described in Section 3.1 and 3.2, we can further improve the rendering quality of the virtual-avatar images by introducing an additional "Rendering Quality Improvement Module" to the output side of the conventional visualisation pipeline for a virtual avatar visualisation system. FIG. 9 shows an example of a system for improving image quality and photo-realism of virtual avatar rendering using an adversarial architecture.

To implement such a "Rendering Quality Improvement Module", we can adopt a deep neural network model using an architecture of generative adversarial networks (GAN) (I. Goodfellow, J. Pouget-Abadie, M. Mirza, B. Xu, D. Warde-Farley, S. Ozair, A. Courville, and Y. Bengio, Generative adversarial nets, In Z. Ghahramani, M. Welling, C. Cortes, N. D. Lawrence, and K. Q. Weinberger, editors, *Advances in Neural Information Processing Systems* 27, pages 2672-2680, Curran Associates, Inc., 2014). It includes two adversarial submodules: 1) a "Synthetic/Real Photo Classifier" ("Discriminator"), which aims to distinguish the synthetic virtual avatar renders from real photos of models wearing garments, and 2) a "Render Modifier" ("Generator"), which makes modifications to the initial render output and aims to improve the photo-realism of synthetic renders to fool the "Discriminator", as shown for example in FIG. 9.

The "Synthetic/Real Photo Classifier" submodule (i.e. "Discriminator") adopts a deep network architecture and loss functions for binary attribute classification, as described in Section 2.2.1. It takes the input of an image, and the output of the network is a binary label defining whether the input image is synthetic or not, and its associated label probability ranges between 0 and 1. Various network architectures (e.g. VGG11/16/19, GoogLeNet) can be adopted for convolutional and pooling layers. The training data of the submodule is a balanced mixture of real model photos obtained from retailer websites and the internet and the synthetic renders generated from the rendering pipeline and revised by the "Render Modifier" as detailed in the following.

The "Render Modifier" (i.e. "Generator") submodule adopts an "Auto-encoder" architecture (S. Lange and M. A. Riedmiller, Deep auto-encoder neural networks in reinforcement learning, In *IJCNN*, pages 1-8. IEEE, 2010). It takes the input of an image I and the network generates an output in the form of a difference image $\Delta I$ in the same dimension as the input image I. This difference image can be superposed onto the input image I to obtain a more photo-realistic revised render $I_{revised}$, as the following equation (10) shows.

$$I_{revised} = I_{initial} + \Delta I.$$

The loss function of the "Generator" is the negative of that used for training the "Discriminator" and it is computed based on all the revised renders $I_{revised}$ generated. The optimisation goal of "Generator" is hence opposite to that of the "Discriminator".

In the model training, the optimisation of "Generator" and "Discriminator" are carried out in an alternating manner. In each epoch of training, the new batch of revised synthetic renders obtained from the "Render Modifier" may be mixed with real model photos for training the "Discriminator" in the next epoch of training.

3.4.1 Automated Quality Control and Comparison

The "Synthetic/Real Photo Classifier" (i.e. the "Discriminator" part of the GAN) predicts a probability of how much a rendered avatar image will look like a real photo of a model dressed in garments.

This output (i.e. the probability) from the "Discriminator" can be used as an automated quality control and monitoring engine for the garment digitisation operation process, which can automatically spot those garment models which yield pathological or ill-looking renders.

By looking at the outputs of "Synthetic/Real Photo Classifier" of two or more rendered avatar images and/or a real photo, we can also obtain comparative measurements of image quality or photo-realism. A ranking or statistics based on such measurements can be used as indicators to 1) evaluating the level of photo-realism of synthetic renders against real photos, or 2) evaluating the overall rendering quality of two or more distinct versions of virtual avatar visualisation engines as a replacement or complement to human user testing.

4. Visual Search and Retrieval of Fashion Items

The second derived application of garment attribute prediction is visual search and retrieval of garments or accessories.

The goal of a visual search system is focused on finding "similar" items in the gallery to the given query item, whilst for the retrieval system the goal is to find and match exactly the "same" item from a gallery of items in different photography styles, including but not limited to the changes in lighting variation, camera viewpoint, model pose, image context. The query items in the context of online fashion can be garments, shoes, or accessories, which are

- currently dressed on user's virtual avatar;
- recently browsed by the user;
- in an arbitrary photo on the internet.

The challenge of the visual search or retrieval lies in the variation of photography styles between input query data and target gallery images. Within the context of online fashion, the possible photography styles may include:

- standard mannequin photos captured in the process of garment digitisation, in which the mannequin pose and camera views are well constrained;
- model images or garment sample images on the websites of retailers, including both synthetic and composite model images, in which the subject can be in distinct body poses, but the images have a relatively clean background;
- internet fashion images from e.g. Google, Pinterest, in which the subject can be in different body poses, and the images have a cluttered background;
- selfies, phone photos, and web-cam photos, in which the subject can be in different body poses and different camera poses, and the images not only have a cluttered background but also are more often than not taken in poor lighting conditions.

To address the problem we provided two types of search and retrieval user interfaces: 1) image-based search, in which the input is one or more images of the query item, and 2) attribute-based search, in which the input is a set of keywords describing the query item. In both cases the search and retrieval engines are constructed based on machine learning models such as deep neural networks, as detailed in the following subsections.

4.1 Image-Based Search or Retrieval

Figure 10:
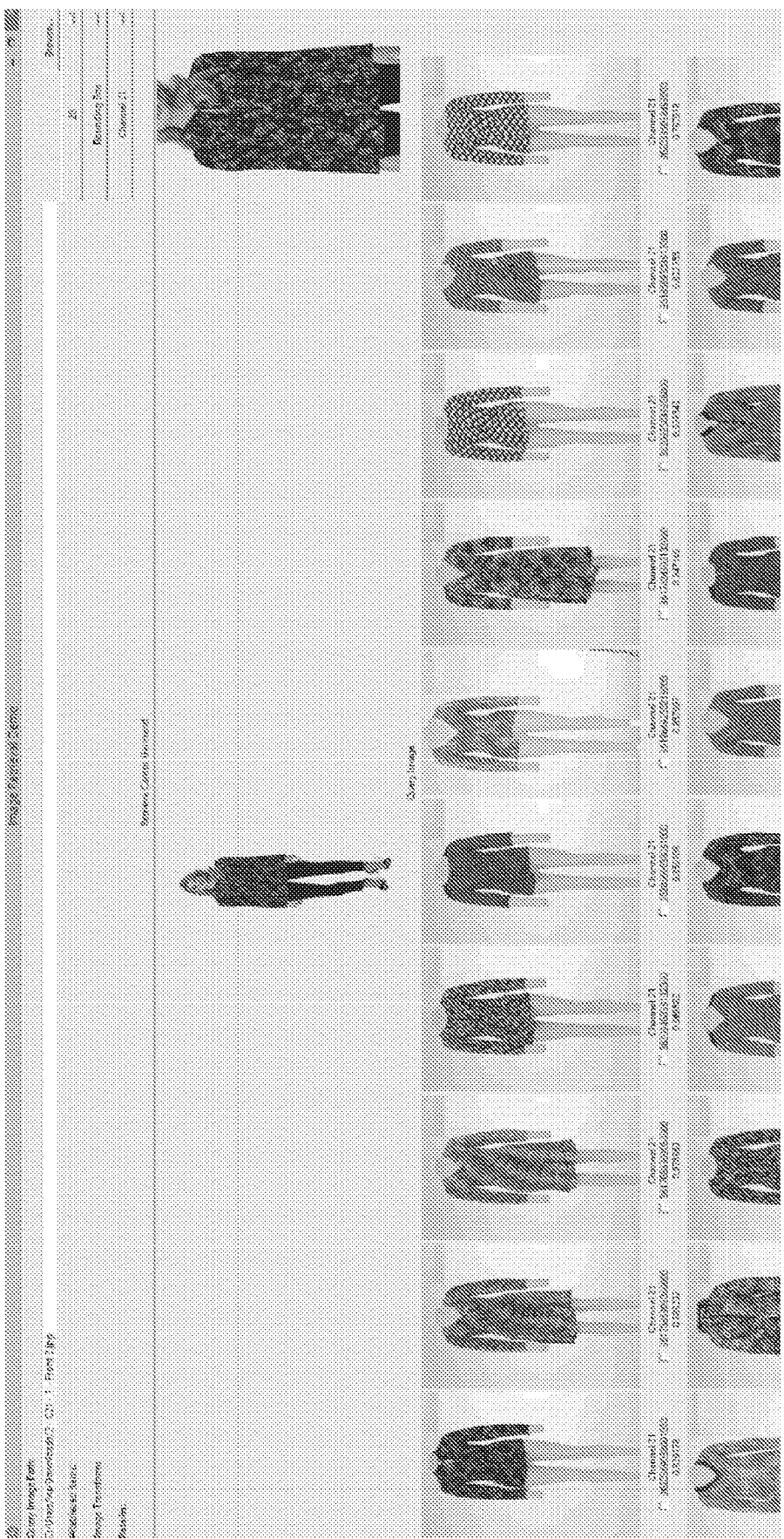
FIG. 10 shows an example user interface of image-based garment or accessory retrieval.
Figure 11:
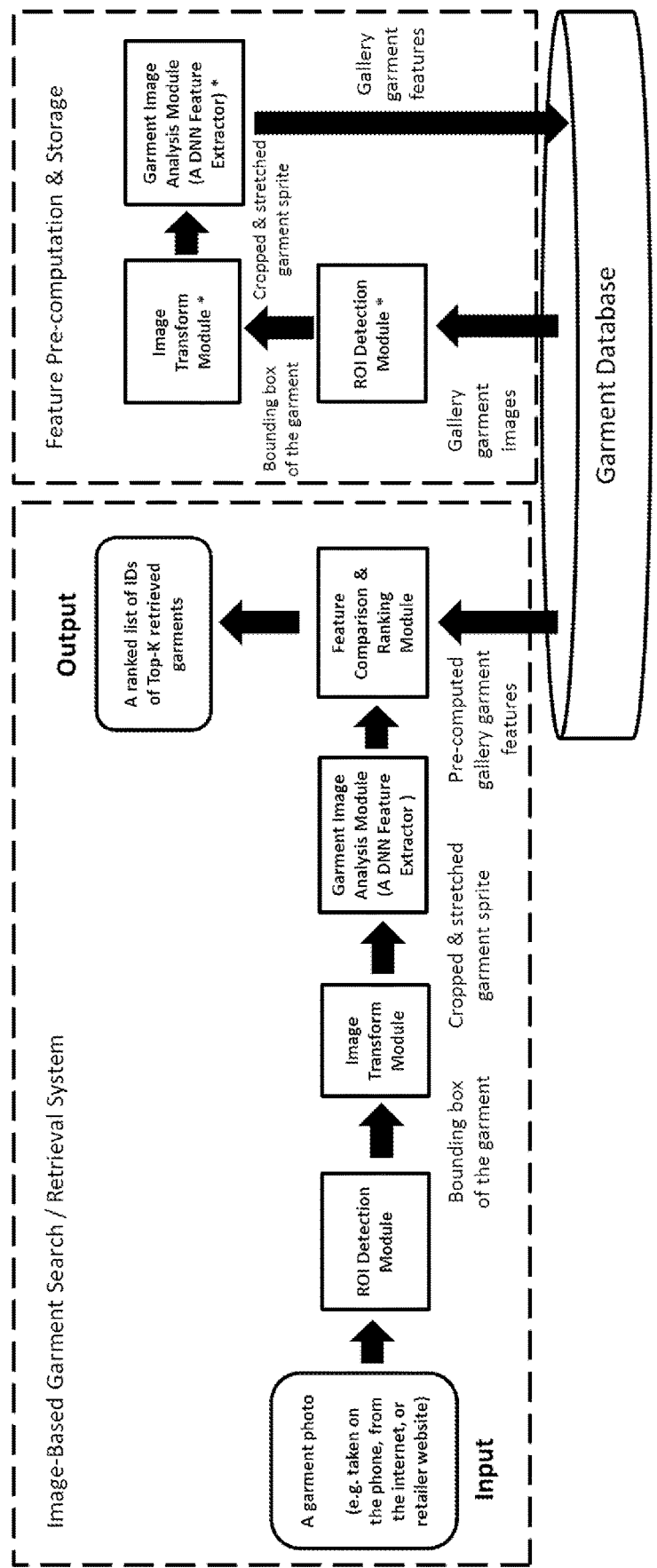
FIG. 11 shows an example end-to-end system diagram of an image-based garment or accessory retrieval system.

The image-based search or retrieval aims to find the same or similar items from the gallery by analyzing a single sample image of the query item. See FIG. 10 for an example user interface of image-based garment or accessory retrieval, and FIG. 11 for an example end-to-end diagram of the system. FIG. 11 shows an example end-to-end system diagram of the image-based garment or accessory retrieval system. In the offline stage of feature pre-computation and storage, those modules marked with "*" symbol are the duplicates of the corresponding modules in the stage of live search and retrieval.

The standard approach for image-based search and image retrieval is: 1) performing feature extraction on both the query and the gallery images, 2) computing the feature distances between the query image and each gallery image using a distance metric (e.g. Euclidean distance or L1 distance); 3) presenting the search or retrieval results by ranking the similarity scores.

To achieve good retrieval and search performance, step 1) is most critical. The goal is to learn an invariant feature transform and similarity embedding such that images of the same item but in different photography styles (e.g. shop images vs. mannequin images), or images of visually similar items should stay together in the feature space whilst those of visually dissimilar items should stay apart. In our system, we solve this problem in a unified framework by adopting a deep learning approach. For feature extraction, instead of using hand-crafted visual features (e.g. histogram of oriented gradient (HoG), SIFT) we take the outputs of the deep neural network model used for attribute classification (described in Section 2) as the visual features. To learn an effective similarity embedding we fine-tune the deep model and retrain the fully connected layers against a triplet-loss objective function as detailed in the following Section 4.1.1.

4.1.1 Learning Similarity Embedding

To learn a similarity embedding with the aforementioned desired behaviour we adopt the triplet loss (J. Huang, R. S. Feris, Q. Chen, and S. Yan, Cross-domain image retrieval with a dual attribute-aware ranking network, In *Proceedings of the IEEE International Conference on Computer Vision*, pages 1062-1070, 2015) as the cost function of the optimisation problem that can enforce distance constraints among positive and negative sample pairs. For a training sample i, we denote its feature (i.e. the output from the convolutional layers) as $x_i$. Then, from the same training set, we select a different image of the same item as the positive sample (here denoting its corresponding feature vector as $x_i^+$), and an image of a randomly-selected different item as a negative sample (denoting its corresponding feature vector as $x_i^-$). This forms a sample triplet $(x_i, x_i^+, x_i^-)$. We define the triplet loss $Loss_{triplet}$ as:

$$Loss_{triplet} = \sum_{i=1}^{N} \max(0, t + d(x_i, x_i^+) - d(x_i, x_i^-)), \quad (11)$$

where $d(\cdot,\cdot)$ can be an arbitrary distance metric, and t is a parameter that enforces the minimum separation between the positive sample pair and the negative sample pair. In the implementation, we define $d(\cdot,\cdot)$ based on the similarity metric as follows:

$$d(x, y) = 1 - \frac{x^T y}{\|x\|\|y\|}. \quad (12)$$

where t is set to 1 in our implementation. The objective of optimisation in the model training is to minimise the overall triplet loss on all N training sample triplets as defined in (11). Common optimisers (e.g stochastic gradient descent (SGD), AdaGrad) can be used for solving the optimisation problem.

Figure 12:
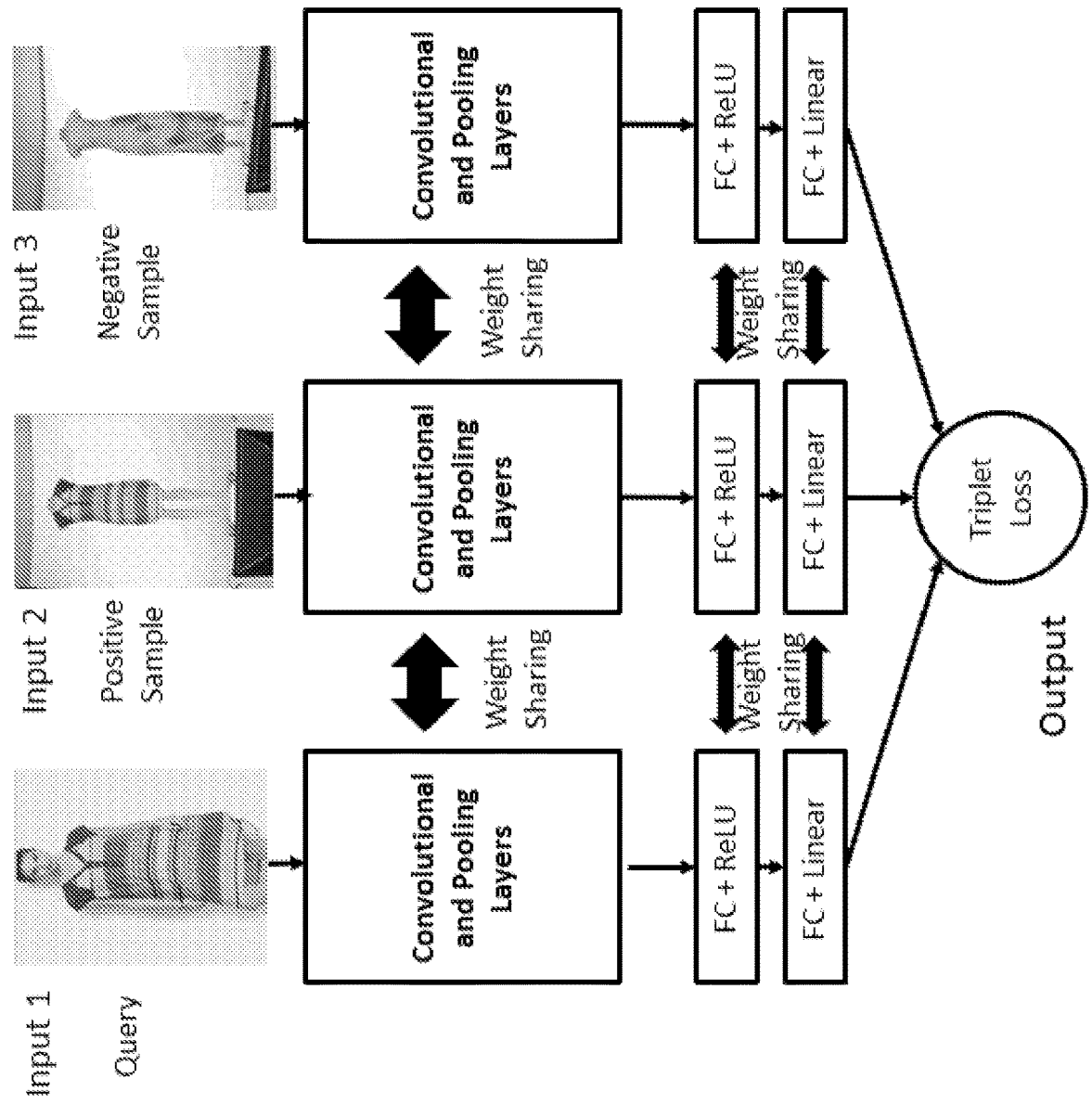
FIG. 12 shows an example deep network architecture usable for triplet similarity learning.

FIG. 12 shows an illustration of an example of a deep network architecture usable for triplet similarity learning. The convolutional and pool layers in the diagram can accommodate an arbitrary recent architecture for image classification, e.g. VGG11/16/19, GoogLeNet.

To train the deep neural network model for learning a triplet similarity metric, we adopt a three-way Siamese architecture to handle the 3-way parallel image inputs, as illustrated in FIG. 12, in which we first initialise the model weights with those of a pre-trained attributed classification model (as described in Section 2) and apply weight sharing for all the convolutional layers, and we then retrain the last fully-connected layer while fine-tuning the earlier convolutional layers at a lower learning rate for the similarity learning. By doing so, the query image, the positive sample image, and the negative sample image in a triplet all pass through the same network for visual feature evaluation. For the training data, we rearrange the training data for attribute classification (as described in Section 2.1) into triplet groups and then perform data augmentation. For each possible pair of positive samples $(x_i, x_i^+)$ of sample i, we generate M=20 randomly selected negative sample pairs $(x_i, x_{i,m}^-)$, m=1,2, . . . , M.

In the prediction stage we simply evaluate the feature vectors of each image, by feeding it through the convolutional and fully-connected layers of the trained network. A "Feature Comparison & Ranking Module" (see FIG. 11) then models the similarity between the query and each gallery item i. The similarity score S of the query image and each gallery image can be defined by e.g. 1) computing the distance of their corresponding feature vectors in the visual feature space; or 2) counting the number of overlapping attributes or keywords predicted from the attribute classifier. In the implementation, we adopt the L2-distance metric (i.e. Euclidean distance) in the visual feature space to evaluate the similarity between samples as follows:

$$S(x_i, q) = \|x_i - q\|^2, \quad (13)$$

where q and $x_i$ stand for the feature vectors of the query item and the gallery item i, respectively. Other similarity metrics (e.g. L1 distance, or cosine-similarity (J. Huang, R. S. Feris, Q. Chen, and S. Yan, Cross-domain image retrieval with a dual attribute-aware ranking network, In *Proceedings of the IEEE International Conference on Computer Vision*, pages 1062-1070, 2015)) are also applicable here. Once the similarity scores are evaluated over all the gallery items, the results of visual search or retrieval can be then presented based on a ranking of similarity scores of the candidate gallery garments to the query garment in a descending order.

For the run-time performance consideration, we always pre-compute and store the categorical probability vector $x_i$ as image features for each gallery sample i (i=1,2, . . . , N) offline using the deep neural network for similarity metric embedding as described above (see "Feature Pre-computation & Storage" module in FIG. 11) so that we can directly use (13) for run-time similarity evaluation.

4.1.2 Detect Region-of-Interests

Figure 13:
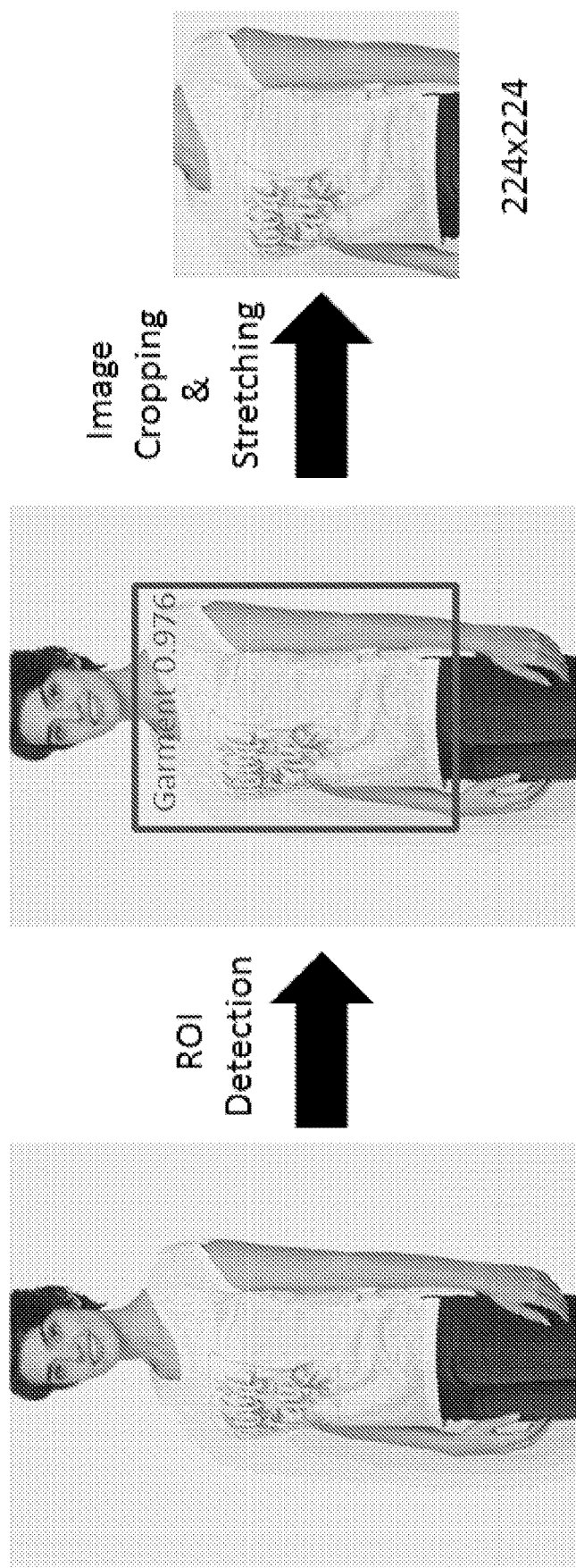
FIG. 13 shows an example process of region-of-interest (ROI) detection and image trans form.

At the input side of our image-based garment search and retrieval system (see FIG. 11 for the system diagram), we also include an "ROI Detection Module", which detects the region-of-interest (ROI) of the garment in the form of bounding boxes on both the input query image and all the gallery images as a pre-processsing step. An "Image Transform Module" follows the "ROI Detection Module" which crops the input image with the bounding box returned from the ROI detection and deform the cropped image to the stardard image dimensions (e.g. 224×224) required by the "Garment Image Analysis Module", i.e. the deep neural network described in Section 4.1.1, for feature extraction. See FIG. 13 for an example illustration of a ROI detection and the image transform process described above. Further data augmentation schemes, e.g. random cropping of a number of slightly different sub-regions based on the ROI detection results, can be implemented in this module at the model training stage to help improve the generalisation power of the model.

In an example system, ROI detection is implemented using the faster R-CNN model (S. Ren, K. He, R. Girshick, and J. Sun, Faster r-cnn: Towards real-time object detection with region proposal networks, In C. Cortes, N. D. Lawrence, D. D. Lee, M. Sugiyama, and R. Garnett, editors, *Advances in Neural Information Processing Systems* 28, pages 91-99, Curran Associates, Inc., 2015)—one of the latest deep-learning-based algorithms for object detection. For the garment detection, in an example, we use a number of garment image data with manually-annotated ROI bounding boxes to fine-tune a standard model for generic object detection and recognition pre-trained on Pascal VOC2007 object recognition dataset (M. Everingham, L. Van Gool, C. K. I. Williams, J. Winn, and A. Zisserman, The pascal visual object classes (voc) challenge, *International Journal of Computer Vision,* 88(2):303-338, June 2010) to obtain a dedicated garment detector. The garment detector gives the corner positions of the bounding box as well as a confidence score of the detection (between 0 and 1), for each item detected. Experiments show that including the step of ROI detection would considerably improve the retrieval accuracy of the model for visual search and retrieval in Section 4.1.1 with the same network architecture.

ROI detection can be used to build a system for retrieving or searching multiple items from an image of a person in an outfit of multiple garments (e.g. a T-shirt with a pair of trousers). It can be implemented by first detecting multiple bounding boxes each surrounding an individual garment or accessory item (e.g. glasses, shoes, handbag) on the person, and then applying the algorithms described in Section 4.1.1 for visual search or retrieval on each individual garment or accessory. This can lead to a system for searching a complete outfit consisting of multiple garments from the image (see Section 6.2.1 for further details).

4.2 Attribute-based Garment Item Retrieval or Look-Up Systems

Figure 14:
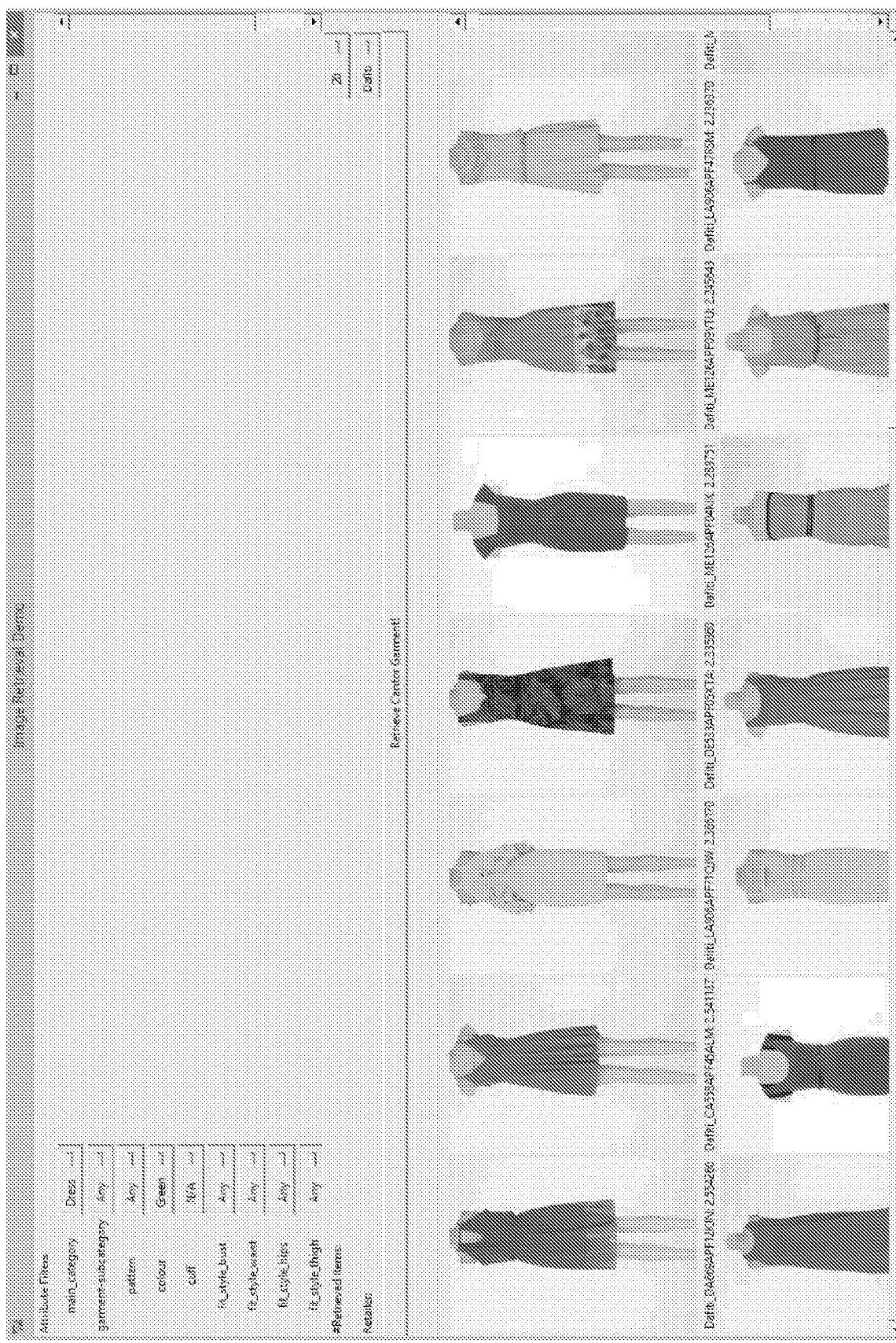
FIG. 14 shows an example user interface to facilitate attribute-based garment or accessory retrieval.
Figure 15:
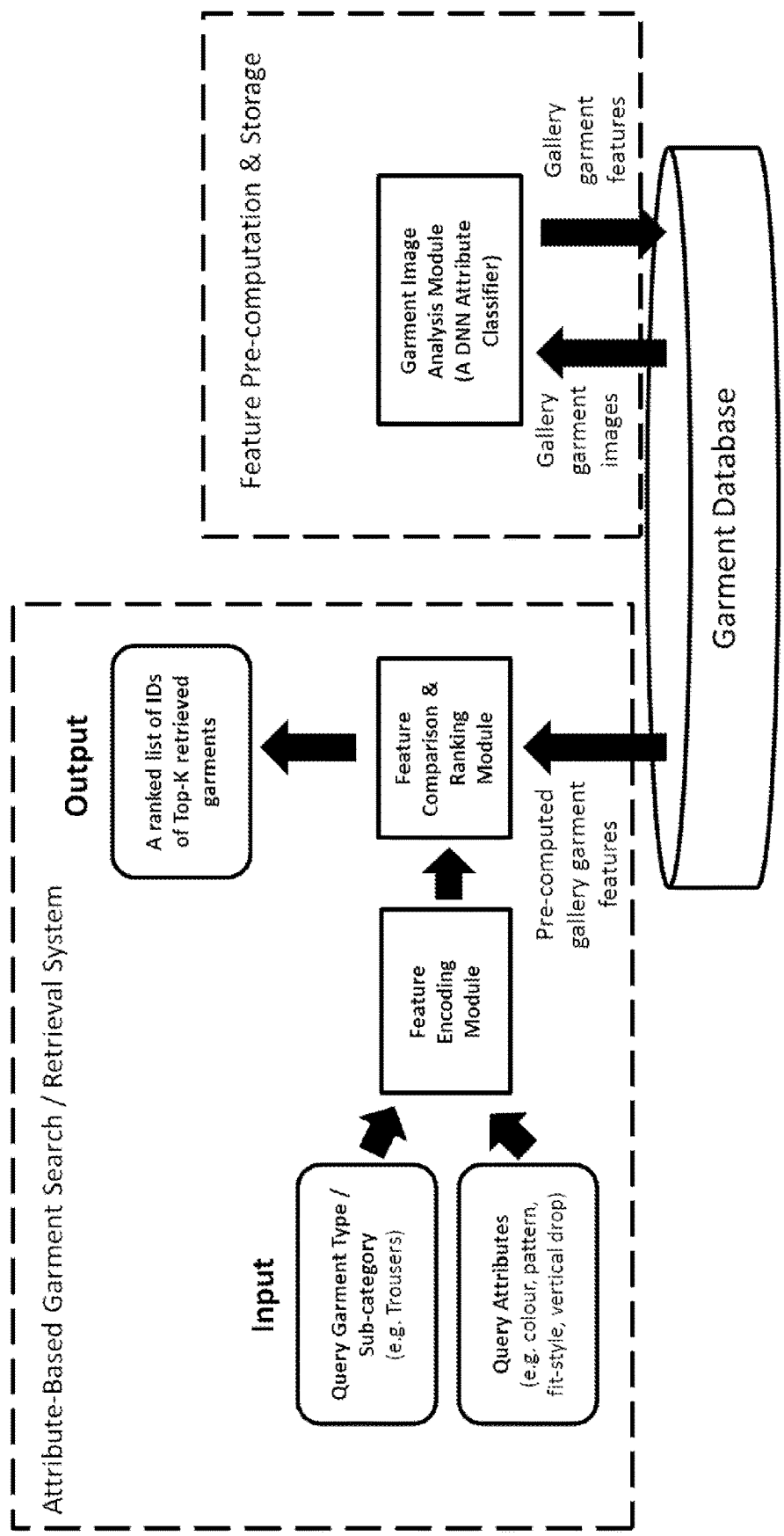
FIG. 15 shows an example end-to-end system diagram of a variant of an attribute-based garment or accessory retrieval system.

An alternative user interface (UI) for garment or accessory retrieval or search is based on direct attribute inputs. In such a UI, users are presented a number of attribute keyword filters or drop-down lists, as exemplified in FIG. 14, so that they can quickly reduce the candidate list and find the desired item by providing a few keywords that best describe the item they are looking for (e.g. "dress", "black", "no pattern", "sleeve to the elbow", "hem to the knee", and "no collar"). An end-to-end system diagram of an example attributed-based garment retrieval or search system is illustrated in FIG. 15.

In the system, a "Feature Encoding Module" translates the input query attributes provided by the user into a vectorized feature format that is suitable for similarity evaluation. Given a collection of query attributes, we first create an attribute vector $q=[a_1, a_2, \ldots, a_D]$ from the list of provided attributes as the query vector. The query vector is constructed as follows.

Assume K multi-class attributes $A_k$ (k=1,2, ..., K) have been defined in the input, the number of classes defined for each attribute are $d_k$ (if attribute $A_k$ is a binary attribute, we set $d_k=1$ and discard the other dimension as it is redundant.). If a user has specified the attribute $A_k$ (k=1,2, ..., K) to its j-th label (j=1,2, ..., $d_k$), a "one-hot" attribute vector $a_k$ is created as:

$$a_k[a_{k,1}, a_{k,2}, \ldots, a_{k,d_k}], \quad (14)$$

where $a_{k,j}=1$ if the user specifies the attribute $A_k$ to the j-th label, otherwise $a_{k,j}=0$. Note that this scheme can be easily generalised to model "OR" relationship by letting multiple dimension of $a_k$ to be 1, if multiple possible class labels are selected by the users for the attribute $A_k$ (k=1,2, ..., K). In the case that the user hasn't specified the attribute $A_k$ (i.e. user selects "Any"), then the attribute vector $a_k$ will be a $d_k$ dimensional zero vector.

All these individual attribute vectors $\{a_k\}_{k=1}^K$ are concatenated together to form a single query vector q as follows:

$$q=[a_1, a_2, \ldots, a_K], \quad (15)$$

and the total dimensionality D of the query vector q is $$D = \sum_{k=1}^{K} d_k. \quad (16)$$

Similar to the image-based search system, to improve run-time performance we pre-compute and store the categorical probability vector $x_i$ as the image feature for each gallery sample i (i=1,2, ..., N) offline. These vectors are predicted by a pre-trained multi-label deep neural network (DNN) attribute classifier (see "Feature Pre-computation & Storage" section in FIG. 14). The model predicts the same set of attributes in the same order as defined in the query input. Details of deep model training for attribute prediction can be found in Section 2.

A "Feature Comparison & Ranking Module" (see FIG. 15) then models the similarity between the query and each gallery item i. In the implementation, we adopt an asymmetric cross entropy metric to measure the likelihood of each candidate sample given the combination of the query attributes q as follows:

$$S(x_i, q) = \sum_{j=1}^{D} q_j \log(x_{i,j}). \quad (17)$$

This works well for feature comparison when "one-hot" encoded query feature vectors in Eq. (14) are used. However, other similarity metrics (e.g. Euclidean distance, L1 distance, or cosine-similarity (J. Huang, R. S. Feris, Q. Chen, and S. Yan, Cross-domain image retrieval with a dual attribute-aware ranking network, In *Proceedings of the IEEE International Conference on Computer Vision,* pages 1062-1070, 2015)) are also applicable here.

Once the similarity scores are evaluated over all the gallery items, we then rank the samples as the retrieval results in a descending order of the similarity scores defined above.

4.2.1 Search Based on Names or Text Descriptions

Figure 16:
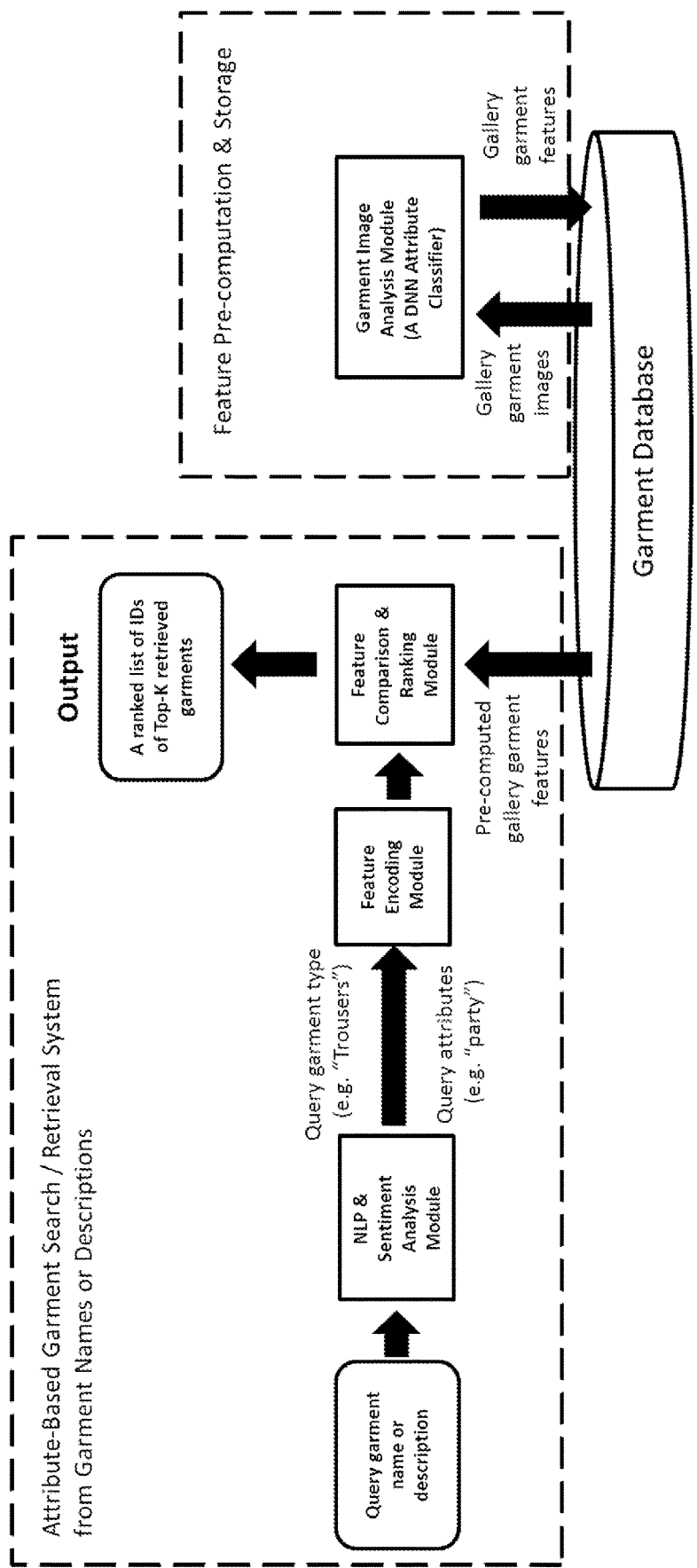
FIG. 16 shows an example end-to-end system diagram of a variant of attribute-based garment or accessory retrieval system with an input of text descriptions.

The attribute-based retrieval approach can be extended to an automated system that performs visual search from text descriptions of a garment or accessories, from the online fashion magazine, fashion-related social network page, or on the retailer website. An illustration of an example of such a derived attribute-based search garment or accessory retrieval system with an input of text descriptions is given in FIG. 16.

For example, for each garment SKU sold on a retailer website, we can normally find a long name containing the key features of the garment, and a paragraph of detailed text description associated with the item. From them we can:
1. extract the relevant garment attributes related to e.g. colour, pattern, shape, style, material, using a keyword extractor or an NLP module (e.g. OpenNLP, see "NLP & Sentiment Analysis Module" in FIG. 16),
2. map them into the list of defined garment attributes, and
3. encode them as a single query vector required as the input of the deep neural network system with the approach described in Section 4.2 (see "Feature Encoding Module" in FIG. 16).

4.2.2 Refining the Retrieval or Search Results

An interactive search result refinement mechanism can be added to either an image-based search system (see Section 4.1) or an attribute-based search system (see Section 4.2). Once the initial retrieval is done, if the desired item is not in the list, the user is then allowed to further refine the search results by clicking and selecting a few items from the initial retrieval results which they think are visually similar to the item they are looking for.

Assume the user has selected J samples with indices {r(j)}, the new similarity metric S* in the refined search may further include the average or the nearest distance to all the selected samples in the feature space, as shown in (18) and (19).

$$S^*_{average}(x_i, q) = S(x_i, q) + \frac{\beta}{J}\sum_{j=1}^{J} \|x_i - x_{r(j)}\|^2, \quad (18)$$

$$S^*_{nearest}(x_i, q) = S(x_i, q) + \beta \min_j \|x_i - x_{r(j)}\|^2, \quad (19)$$

where $\beta$ is a weighting factor balancing the contribution of initial query and selected samples for refinement.

Multiple iterations of this refinement process can be done until the desired item is found.

4.2.3 Multi-Task Learning

To improve the performance of visual search and retrieval we also propose to use multi-task learning schemes for deep model training.

In the multi-tasking architecture, one unified deep network is trained to simultaneously handle a combination of attribute prediction and similarity learning tasks or subproblems.

Figure 17A:
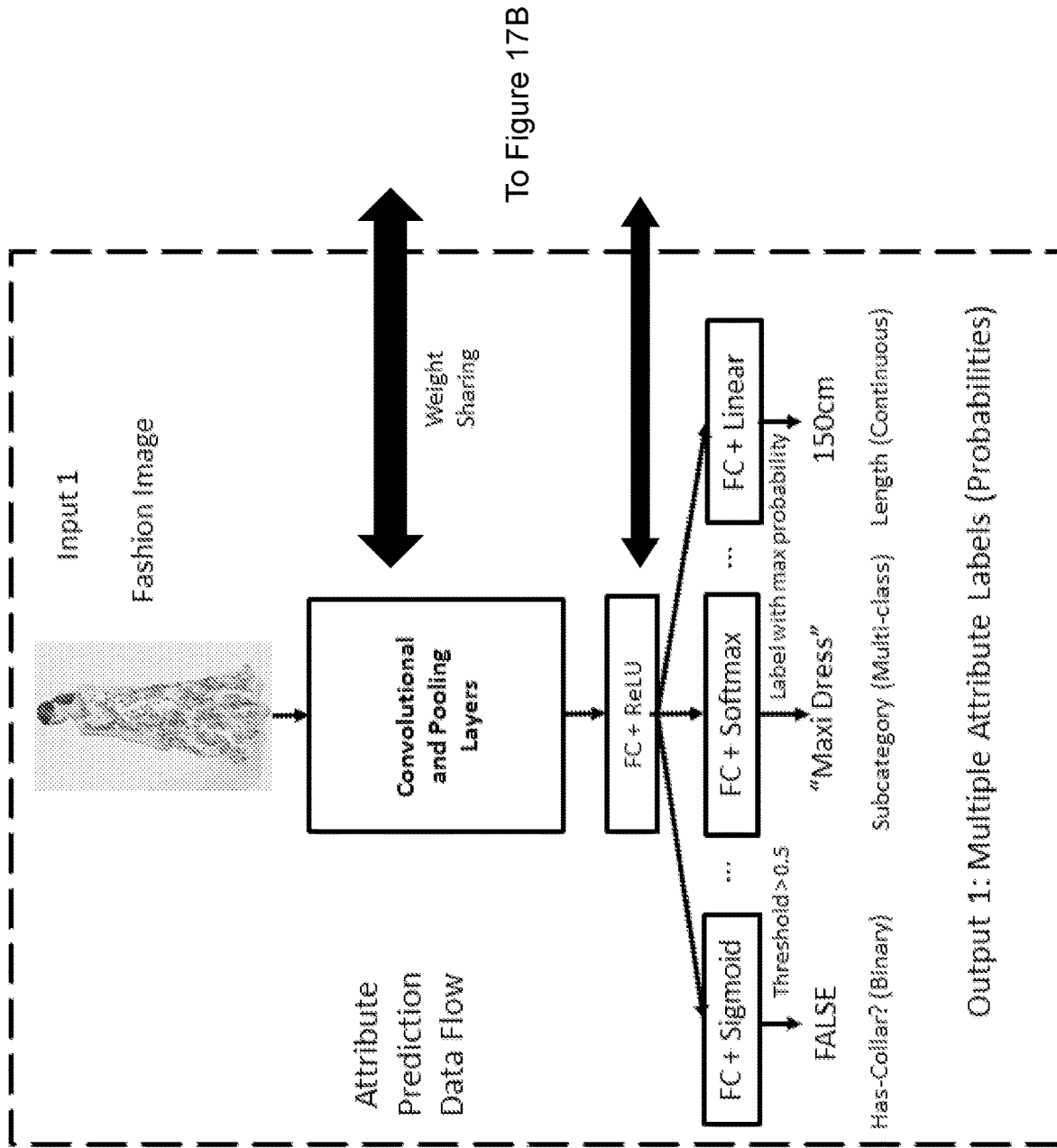
FIGS. 17A and 17B show an example deep network architecture for multi-task learning with weight sharing.
Figure 17B:
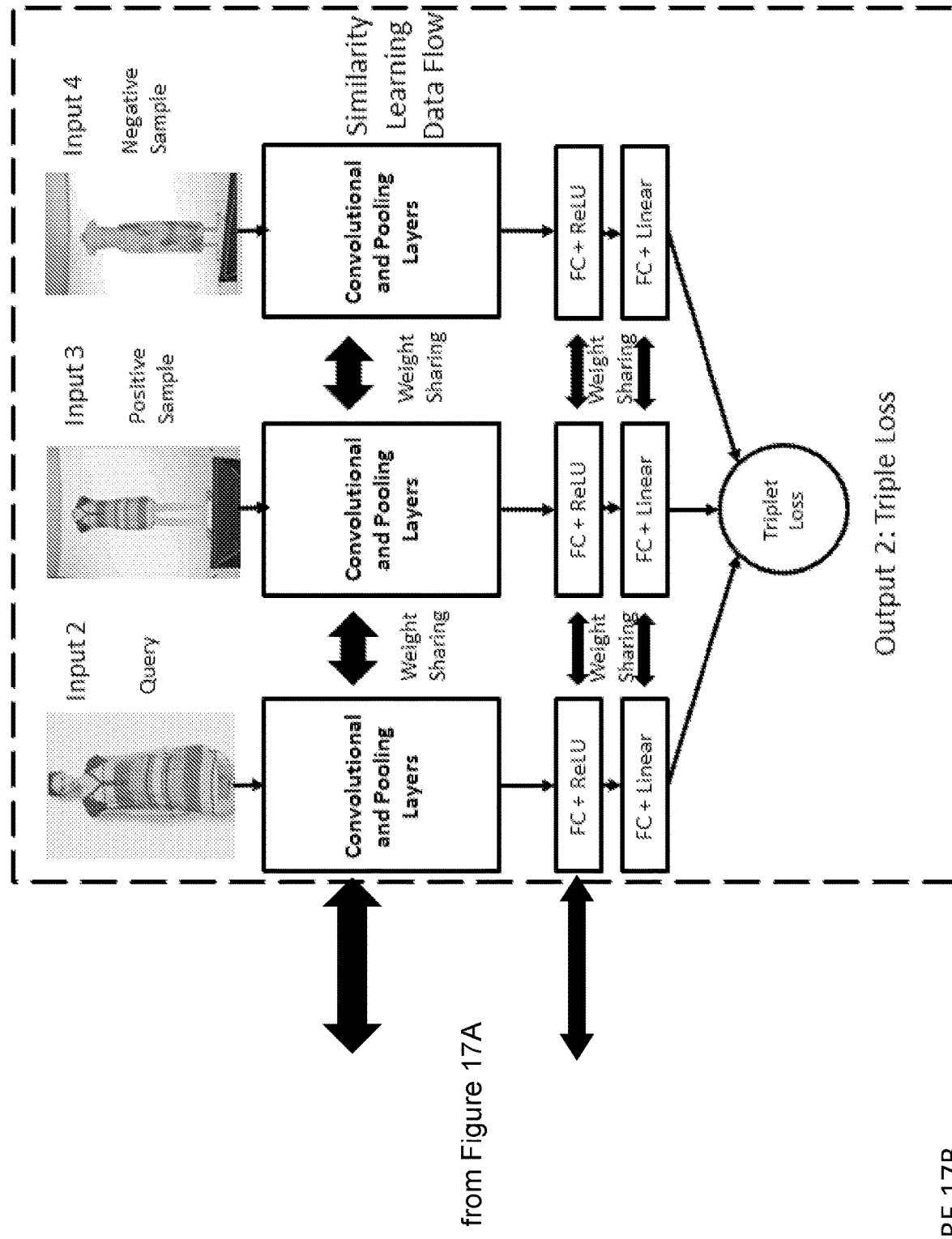

FIGS. 17A and 17B show an illustration of an example of the deep network architecture for multi-task learning with weight sharing, which allows the prediction of multiple attributes of different types, and learning a similarity embedding, simultaneously. The convolutional and pool layers in the diagram can accommodate an arbitrary recent architecture for image classification, e.g. VGG11/16/19, GoogLeNet.

This involves implementing a network weight sharing over all the convolutional layers of multiple input stream for common feature extraction, while branching out with multiple fully-connected (FC) layers with different loss functions to handle each of the sub-problems.

In the process of model training, a unified parameter optimisation is performed against the sum of all the loss functions of the sub-problems. In each iteration, a batch of training data for each subproblem (e.g. attribute prediction and similarity learning) is pushed through the respective data-flow of the network (as shown by dashed bounding boxes in FIGS. 17A and 17B for example) in an alternating manner. It is noted that the training datasets for each individual task can be independent and different. The common visual feature extraction network is optimised for all the training data through the weight sharing mechanism. The prediction stage is a feature extraction process, the query data will again first pass through the common convolution layer for generic visual feature evaluation, and then enter the specific branch of FC layers to obtain the dedicated feature optimised for the target subproblem.

This multi-task learning scheme allows the deep model to capture a very strong and general visual feature representation across different datasets and different problems, accelerating convergence and avoiding over-fitting. In particular, we find that the common visual features obtained from multi-task learning useful for generating sensible results in visual search and retrieval. An intuitive explanation is that since the training objective function is against multiple distinct vision problems, the resulting features and similarity embedding are hence more likely to be consistent with a human's perception.

5. Size Advice and Fit Analysis

As the third major extension to the garment attribute prediction framework as described in Section 2, we can further predict what garment size a user should buy and how well it fits (e.g. tight, normal, loose) around different body areas (e.g. bust, waist, hips, thigh) using a machine learning model. This is based on not only the labeled image data of the garments but also user data and garment sizing data (as detailed in Section 5.1). An example machine model for the prediction task above is to use a deep neural network for attribute classification described in Section 2 as the starting point and further apply transfer learning for the task of size recommendation.

In this section we present two different sets of algorithms for size and fit advice based on the garment attributes predicted from the deep neural network in Section 2. The first set of algorithms is a unified deep learning framework based on re-architecting and fine-tuning the attribute classification deep networks for the purpose of size and fit regression or classification (see Section 5.2 for details). The second set of algorithms is to implement an independent predictive logic module that can estimate the most suitable top-k sizes and associated fit analysis based on the user information, garment sizing information, and fit-style attributes estimated by the deep attribute classification network in Section 2 (see Section 5.3 for details).

5.1 Training Data

To learn a classifier or a regressor for size and fit analysis, the following data need to be collected as training data.
1. User information: including but not limited to, user's body shape parameters (i.e. height, weight, bust, waist, hips, cup size), user's location, age, and ethnicity.
2. Garment sizing and measurement information, including but not limited to: garment sizes (either in alphabetical codes (e.g. "S", "M","L") or in numerical codes (e.g. "40", "42")), size-charts of the garment, garment measurements on the QC sheets.
3. Garment images and fit-style labels, including but not limited to: the circumferential fits over different body parts (e.g. around bust, underbust, waist, hip, thigh, bicep) and vertical drops (i.e. describing by which area of the body of the mannequin or fit reference the edge of garments strikes).

FIG. 18 shows a set of semantic label definitions describing a collection of circumferential fits and vertical drops. These data are used for training a deep model for size and fit analysis.

Any or all of the above labels and metadata can be used for direct supervised learning or as a basis for extended transfer learning.

5.2 Regression and Classification Based Size Recommendation by Transfer Learning We provided above a unified deep-learning-based algorithm for size and fit recommendation using the garment attributes extracted from the mannequin photos of garment samples (see Section 2.1.2). The algorithm is based on fine-tuning a pre-trained attribute classification network using the combination of the image and user features.

We have provided two related models; one for retailers adopting multiple size-charts, and the other for retailers with a single size-chart, respectively. The former is a regression model and involves three stages as detailed in Section 5.2.1, 5.2.1, and 5.2.1. The latter is a multi-class classification model involving two stages as detailed in Section 5.2.1 and 5.2.4. Details of the algorithms are presented in the rest of the subsection.

5.2.1 Pre-Train the Attribute Classifier

The common first step for training both size classifiers and regressors is to pre-train a generic deep garment-attribute classifier on a labeled garment image dataset using the approaches described in Section 2. Fashion image datasets described in Section 2.1 can be used as the training data for such a classifier. For example, in the implementation we use our Camtail dataset which contains public internet fashion images (see Section 2.1.1) as the pre-training dataset.

Figure 19:
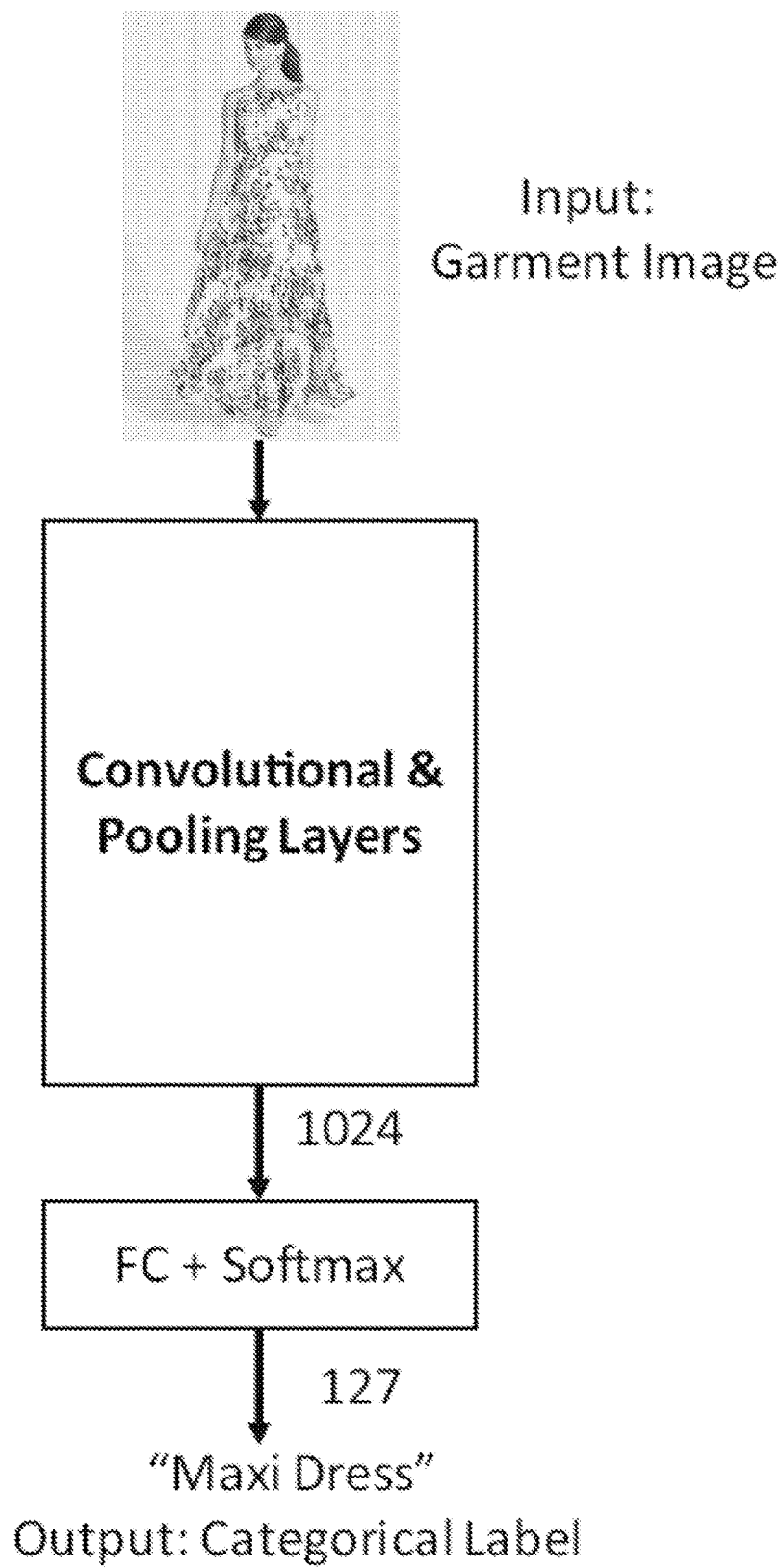
FIG. 19 shows an example deep network architecture for multi-class category prediction.

FIG. 19 shows an illustration of the deep network architecture for multi-class category prediction, which is pre-trained on the Camtail dataset. The convolutional and pool layers in the diagram can accommodate an arbitrary recent architecture for image classification, e.g. VGG11/16/19, GoogLeNet. Typical network architectures of multi-level convolutional neural networks (CNN) (e.g. GoogLeNet , VGG11/16/19, ResNet, Inception-ResNet-V2) can be used to learn visual features representing different fashion categories at different scales. Standard data augmentation and preprocessing schemes (e.g. multi-scale random cropping, left-right mirroring, contrast adjustment) can be applied to achieve better generalisation power for the model. The outputs of the model are multi-class categorical labels.

5.2.2 Model Re-Architecting and Fine-Tuning

Figure 20:
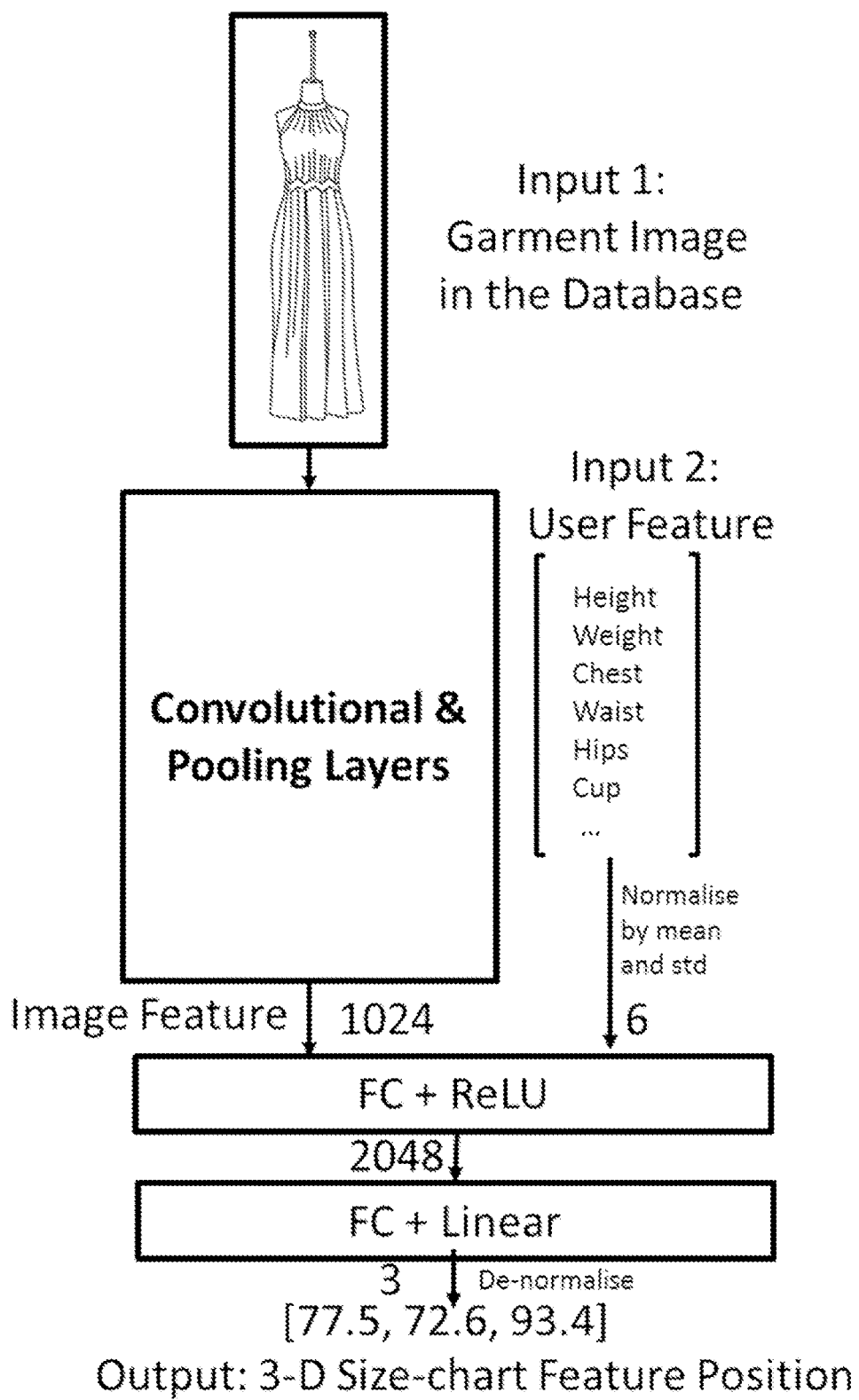
FIG. 20 shows an example re-architected deep network for size regression.

The second step of the size regression algorithm is to re-architect and fine-tune the pre-trained CNN classifier obtained in Section 5.2.1. The re-architected model maintains all the convolutional-layers of the pre-trained model but completely rebuilds the original fully-connected (FC) layers. FIG. 20 illustrates an example re-architected deep network for size regression. The convolutional and pool layers in the diagram can accommodate an arbitrary recent architecture for image classification, e.g. VGG11/16/19, GoogLeNet. The input of the new model includes both the image (i.e. the garment mannequin photo) and the user features (in the form of a vector), and the output of the model are 3D size-chart feature vectors. The new FC layers adopt a concatenate vector Î of image feature I and normalized user feature B as the input:

$$\hat{I} = [I, wB], \quad (20)$$

in which the weighting ratio w is set between 3 to 5 to give the best performance.

In this fine-tuning process, we re-train different layers of the model with different learning rates. In the implementation, the weights of the new FC layers are trained at a learning rate 10-times higher than those applied to the weights of the existing convolutional layers. This fine-tuning scheme adapts the pre-trained features to the new training data for the size recommendation problem.

To prepare the training data for fine tuning, we need a preprocessing step to map all the size labels in the training data into the size-chart feature vectors (e.g. [bust=74 cm, waist=71 cm, hips=90 cm]). Normalization is required to fill-in a regressed/average value when a fit-point dimension is missing, e.g. "bust" is not available for size-charts of trousers.

Figure 21:
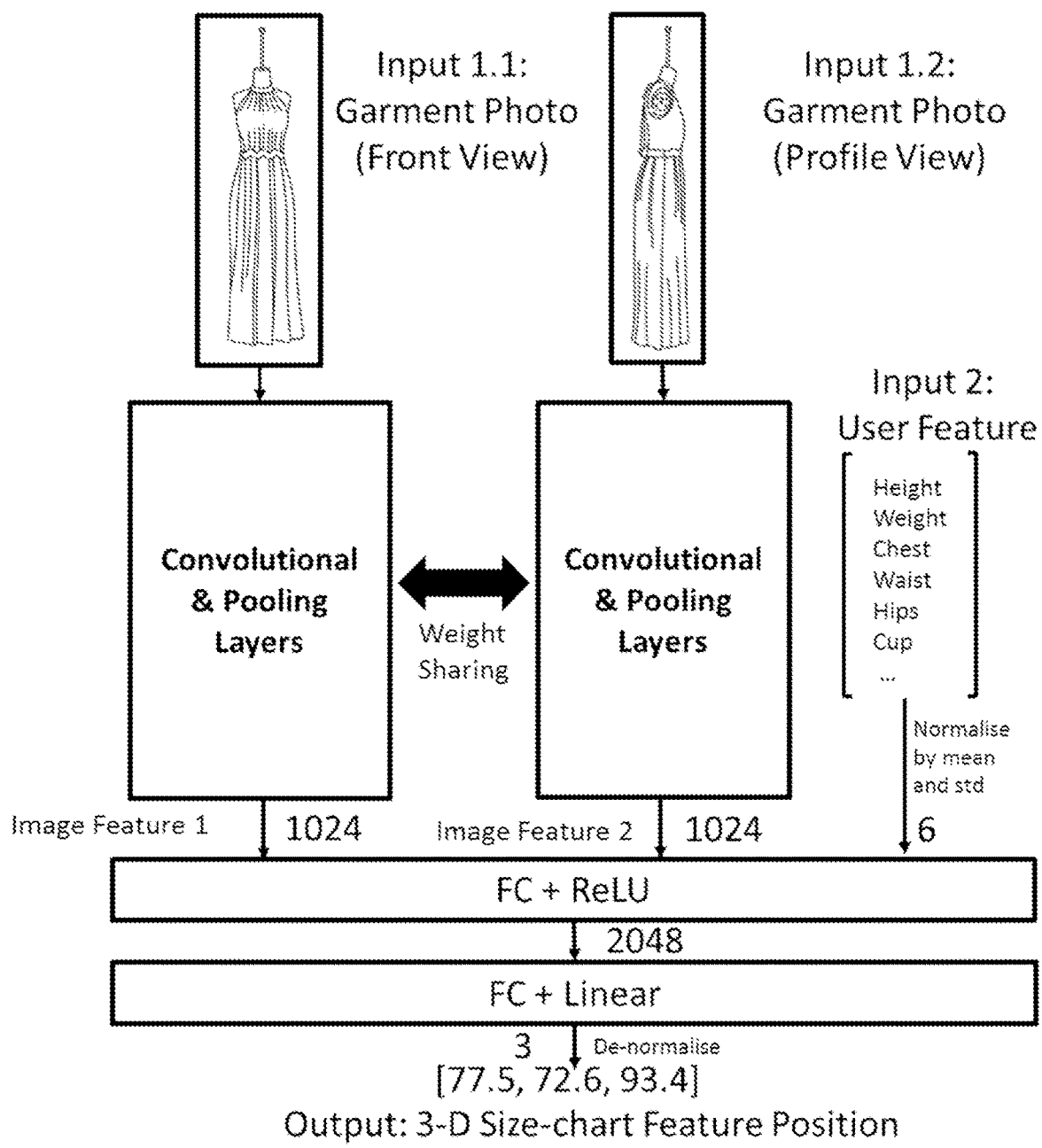
FIG. 21 shows an example re-architected deep network for size regression based on multi-view image input.

The deep neural network for size regression can be generalised to handle the multi-image input scenario as described in Section 2.2.3, in which multiple photos in distinct camera views are available for the target garment. In general, we can adopt a similar network architecture with weight sharing on the convolutional layers, as illustrated in FIG. 2. In particular, we notice that the accuracy of size regression can be improved by the additional profile view of the garment, which provides additional shape and fit style constraints of the garment. The example deep neural network for size regression based on both front view and profile view of the garment is illustrated in FIG. 21.

FIG. 20 shows an example re-architected deep network for size regression based on multi-view image input. Without loss of generality, here we illustrate 2-view cases, in which both the front view and the profile view images of the garment are given as input for size regression. The convolutional and pool layers in the diagram can accommodate an arbitrary recent architecture for image classification, e.g. VGG11/16/19, GoogLeNet.

5.2.3 Size Lookup and Fit Analysis

Figure 22:
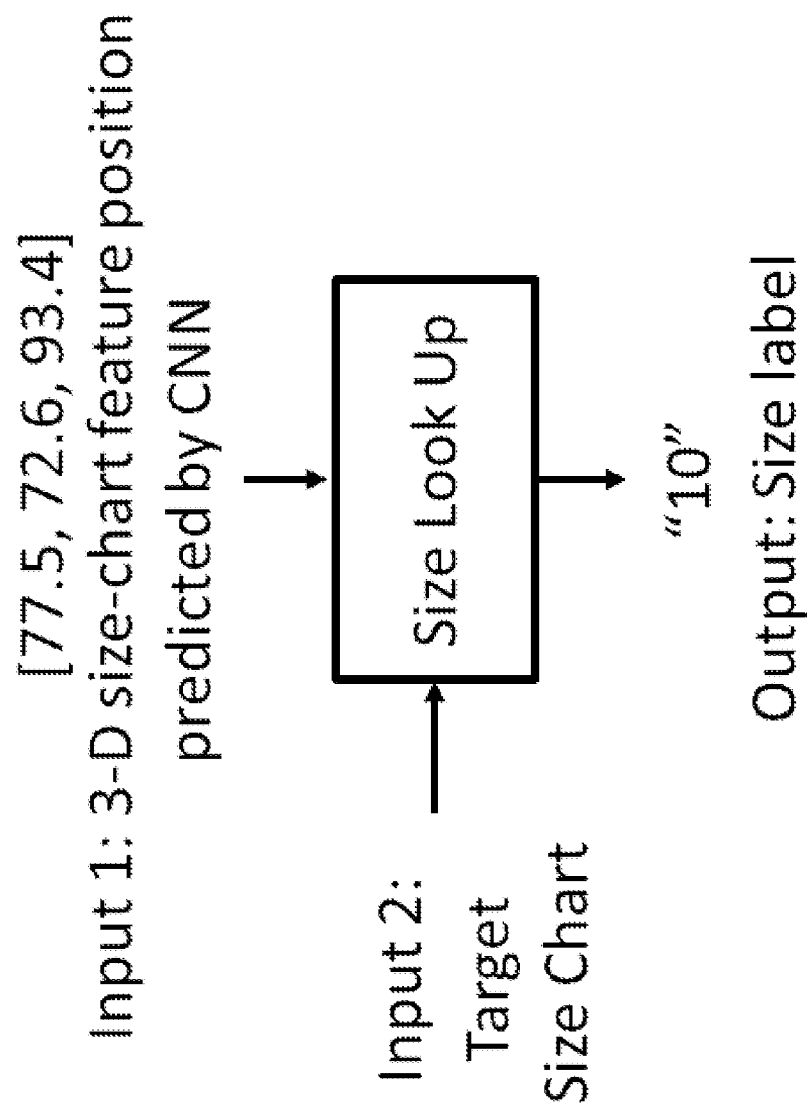
FIG. 22 shows an example look up module based on the output of size regression.
Figure 23:
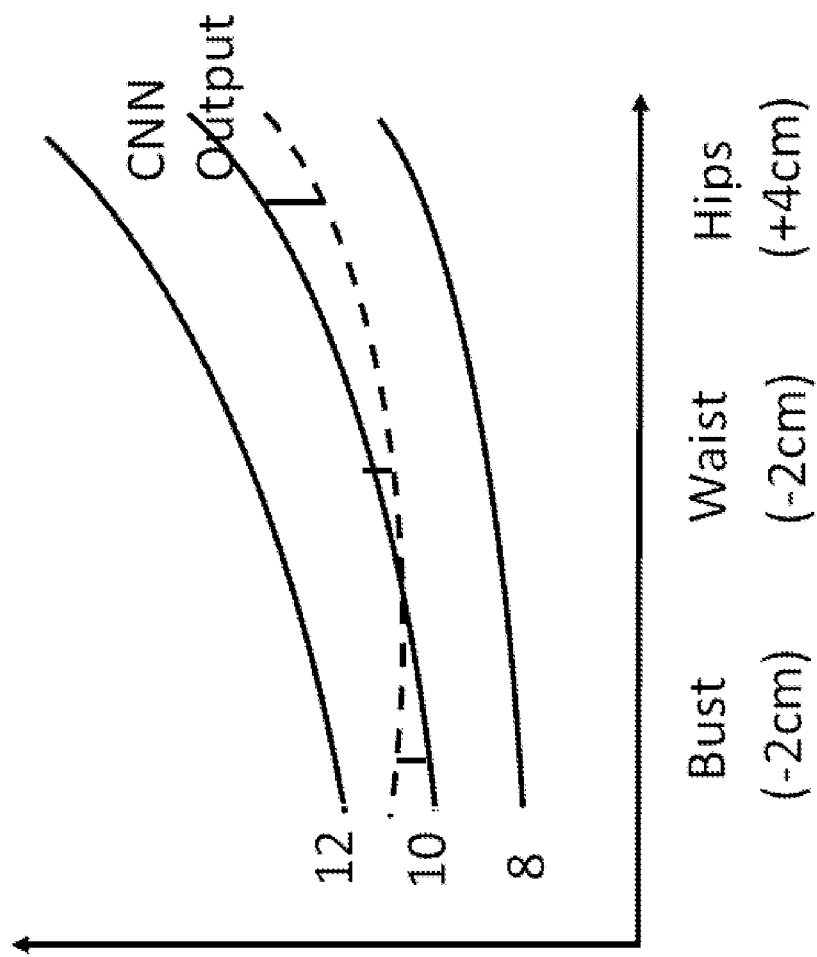
FIG. 23 shows an example of a fit analysis process on a fit-point diagram.

The third and last step of the size regression algorithm is to look up the size feature on the target size-chart and recommend the most similar size as illustrated for example in FIG. 22. Either L2 (Euclidean distance) or L1 distance on specified fit points can be used as the distance metric. This look up approach can be easily adaptable to the scenario when multiple different size-charts are used by a retailer. In addition, it can give intuitive fit analysis on specified fit-points f (e.g. bust, waist, hips), simply by comparing the difference of the predicted user feature $u_f$ with the defined measurement $m_f$ of the given size on each defined fit point f, as follows:

$$\text{fit}(f) = g(u_f - m_f), \quad (21)$$

where $g(\cdot)$ is a thresholding function that maps the decimal input into a set of discrete fit labels e.g. "very tight", "tight", "fitted", "loose", "very loose". See FIG. 23 for an illustration of a fit analysis process on a fit-point diagram.

5.2.4 Classification Models for Single Size-chart Retailers

In the special case when a retailer only adopts a single size-chart for all the garments of its collection, we could adopt a simpler classification-based model instead which will directly make predictions in the form of size labels defined on each size-chart.

Figure 24:
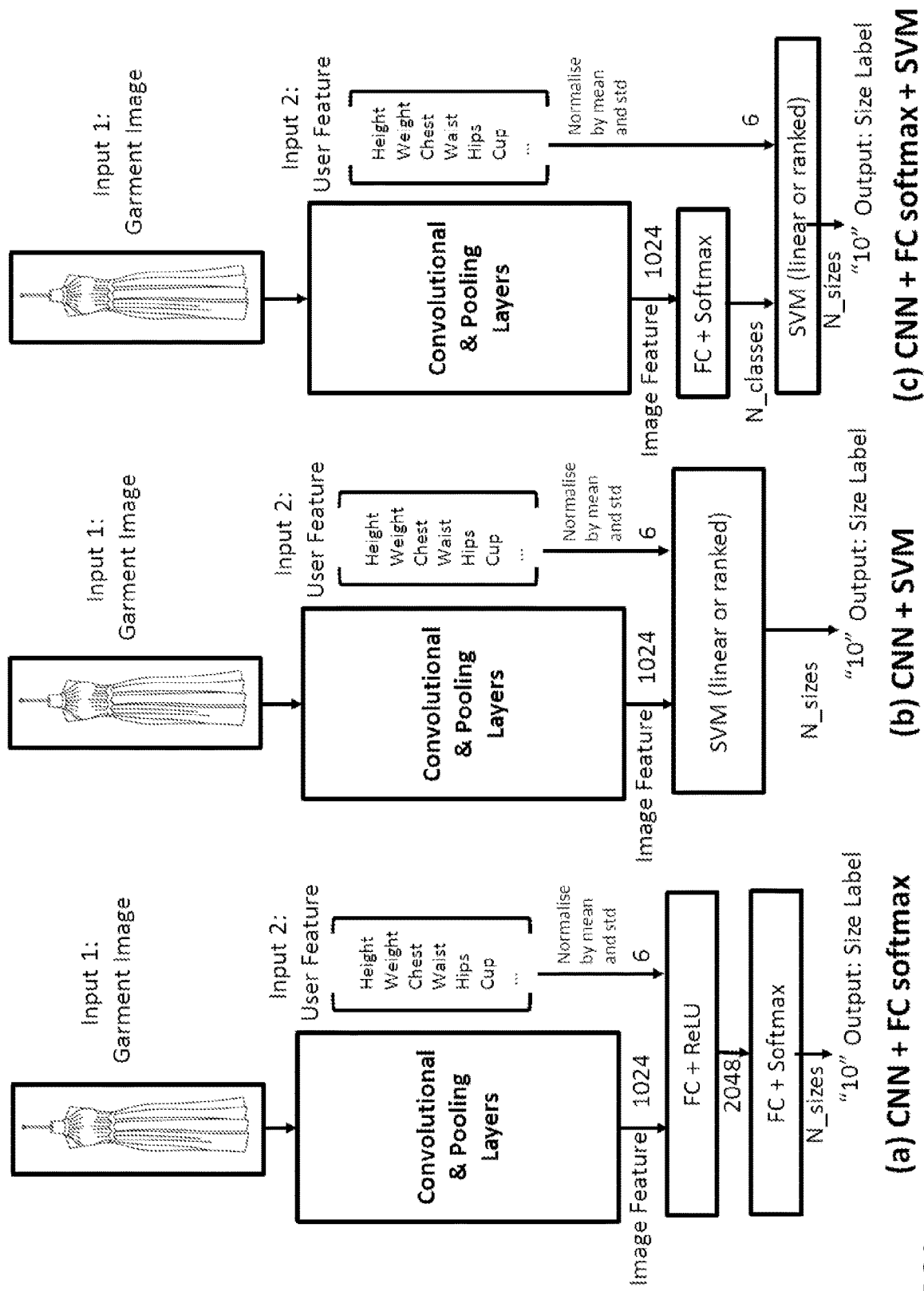
FIG. 24 shows a collection of classification-based deep size models in different network architecture variants examples.

The classification model may be fine-tuned based on the same pre-trained attribute classifier described in Section 5.2.1. The re-architected network used in the second stage is illustrated in FIG. 24(a). The model is slightly different from the regression model in which 1) the output of the deep model is simply the size label, which is a multi-class discrete label instead of a continuous label, 2) a "softmax" activation is applied after the final FC layer to convert the network output into a sum-to-one probability vector. Other implementation details, e.g. the selection of weighting ratio w, are the same as those of the regression model described in Section 5.2.2. It is worth mentioning that we can adopt the strategy in Section 2.3 and use some architecture variants to improve the size prediction accuracy. For example, we may use a SVM instead of, or in addition to the FC layers with "Softmax" activation, as illustrated in FIGS. 24(*b*) and (*c*), respectively. The convolutional and pool layers in the diagram can accommodate an arbitrary recent architecture for image classification, e.g. VGG11/16/19, GoogLeNet.

In the prediction stage, given the new user feature and the image of the garment she tries, the model will yield the probability of each possible size label, from which the optimal size(s) can be recommended based on a ranking of the class probabilities. Since the size labels are directly predicted as the output, no size lookup stage is required in the classification-based model.

Without loss of generality, the deep models illustrated in FIG. 24 are all based on single view input. They can be generalised to handle multi-view input by adopting similar architectural changes to those shown in FIG. 21.

5.2.5 Multi-Task Learning for Size Regression or Classification

It is worthwhile to mention that the multi-task learning framework for simultaneous similarity learning and attribute classification, as described in Section 4.2.3, can also be further extended to include the garment-size regression or classification problems defined in Section 5.2.2 and 5.2.4 as well.

Figure 25A:
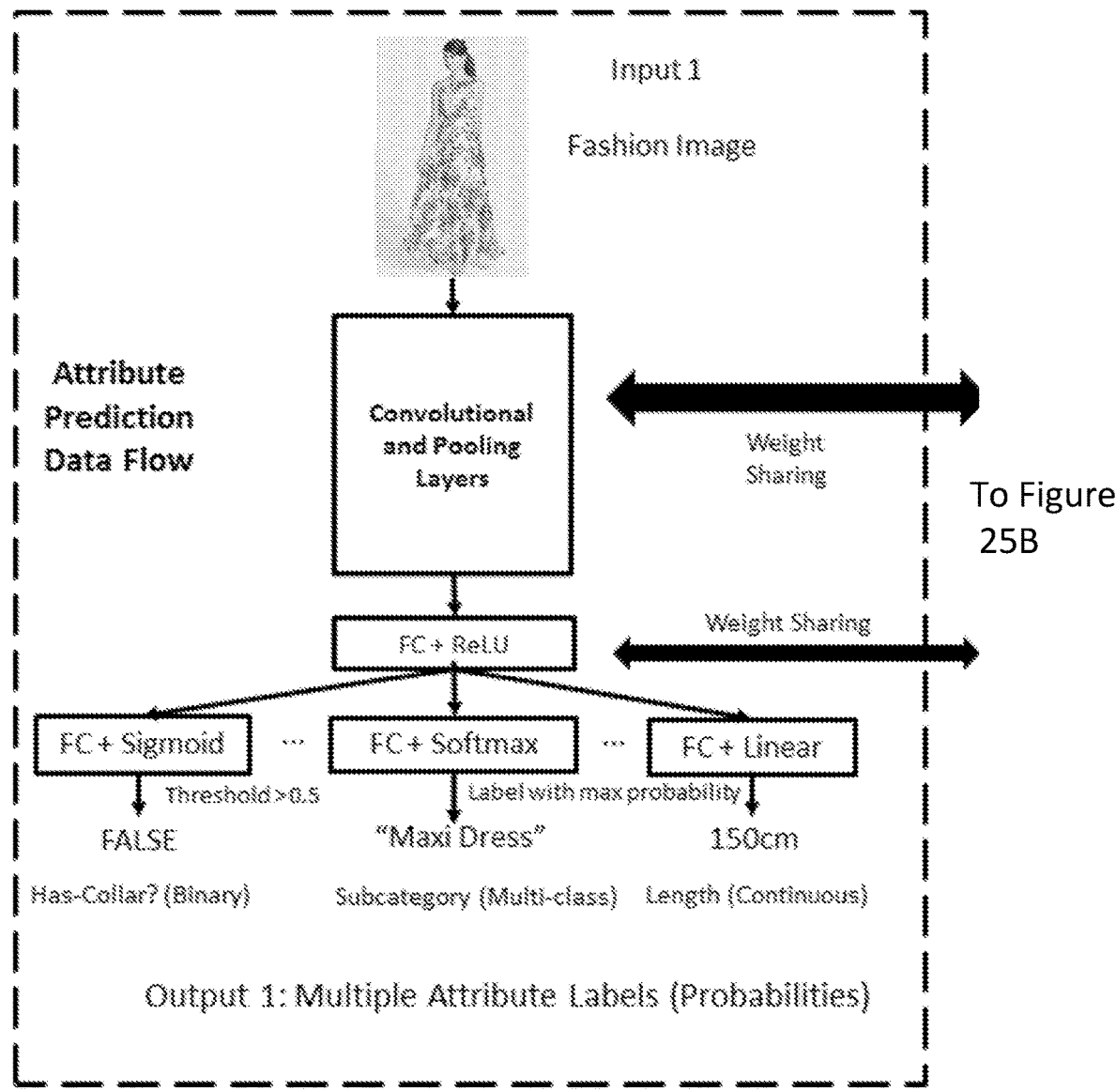
FIGS. 25A, 25B and 25C show an example deep network architecture for multi-task learning.
Figure 25B:
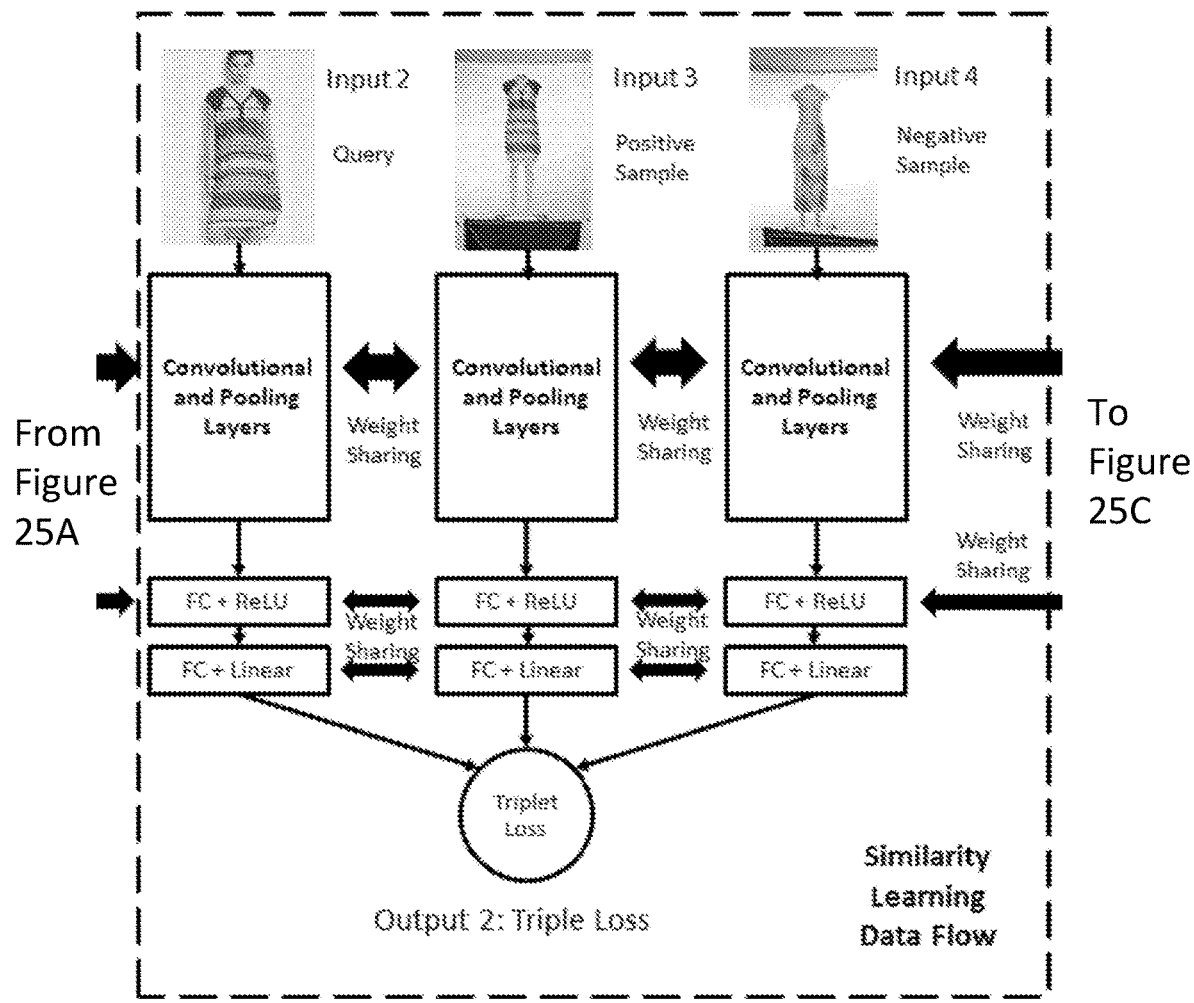
Figure 25C:
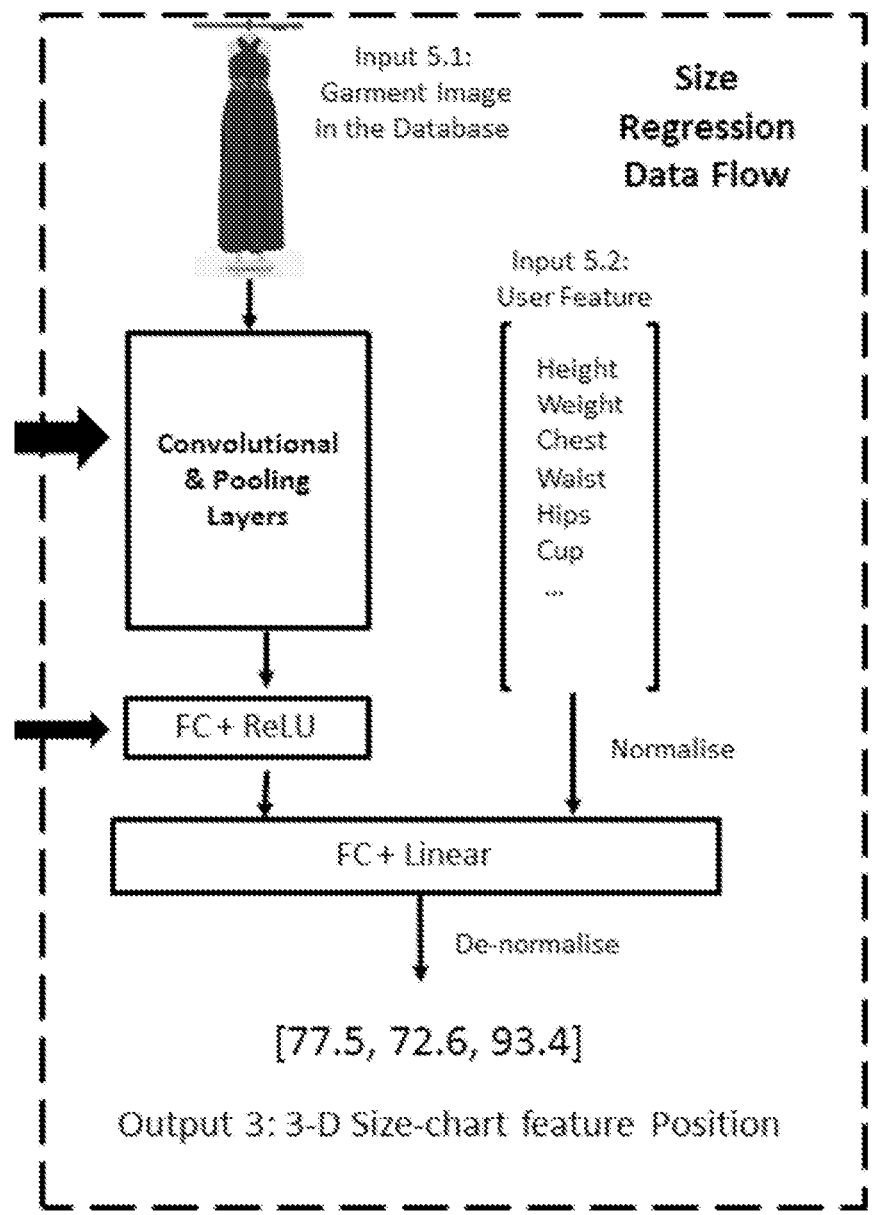

The network architecture to support such multi-task learning involves weight sharing over all the convolutional layers and the first FC layer, and performing re-training over all the branching FC layers for each task, similar to the process described in Section 4.2.3. An example network architecture diagram is given in FIGS. 25A, 25B and 25C in which three distinct data flows are present in the model training: 1) attribute prediction, 2) similarity learning, and 3) size regression or classification. The deep network architecture example for multi-task learning shown in FIGS. 25A, 25B and 25C supports prediction of multiple attributes of different types, learning a similarity embedding with a triplet loss, and performing size regression simultaneously. The convolutional and pool layers in the diagram can accommodate an arbitrary recent architecture for image classification, e.g. VGG11/16/19, GoogLeNet.

5.3 Using Predicate Logics for Size and Fit Advice

This subsection presents an alternative size and fit advice algorithm based on predicate logics on the predicted fit style attributes. Given an RGB image of a garment, and a user with body shape parameters (e.g. measurements of their bust, waist, hips) who might be interested in buying the garment, we estimate the plausible sizes for the user from a pre-specified size dictionary with relevant fitting advice. We suggest that the problem is inherently different from typical machine learning problems, since the input-output mapping is heavily dependent on the user's preferences. Following this postulation, we provide a rather simple approach based on predicate logic for predicting the size of the garment the user will want to buy. The approach involves some heuristics, but generalizes well across various datasets, and we expect that it produces outputs more amenable to the user requirements.

5.3.1 Nature of the Size Advice Problem

We consider the problem of predicting plausible garment sizes for a user, given their body shape parameters, and the image of the garment he/she is interested in buying. The plausible sizes are output with relevant fit advice, thus presenting a virtual fitting room experience, and the aim is to make it as useful as the physical fitting room scenario.

Naively, the above looks like a machine learning problem, where one needs to learn an input-output mapping from the given data; here the inputs are user's body shape parameters and the garment image, and the output is the set of plausible sizes. After carefully analyzing the data, it turns out that the problem of garment size prediction is inherently different from typical machine learning problems.

In a machine learning problem, any two input instances which can be deemed similar by a human, cannot have different sets of categorical ground truth labels (L. G. Valiant, A theory of the learnable, In *Communications of the ACM*, pages 1134-1142. ACM, 1984). However, in the garment size prediction problem, this is not the case, as users with the same or similar body shape parameters can order different sizes of the same garment, based on the fitting style they prefer (loose, tight, or fitted at different parts of the body).

To confirm this further, we collate the order data from retailers to depict the ambiguity in the input-output ground truth mapping. We observe that for a given cluster of body shape measurements, multiple sizes (generally two) are ordered by different users depending upon their fit style preferences. However, in cases, where the users have unique body shape parameters, they can prefer more than two, typically three sizes. In our approach, we tend to learn these types of variations from the data to present the user with more meaningful choices.

The rest of this subsection describes the details of the approach.

5.3.2 Basic Formulations

We are given the RGB image of the garment I as the input. Without loss of generality, we consider three measurements of the user, i.e. bust, waist, and hips, as a user's body shape parameters. Let the user-specified sizes of their bust, waist, and hips be denoted as real numbers by $u_b$, $u_w$, $u_h$ respectively.

Let the garment belong to a size-chart (note that normally a size-chart contains a number of size specifications, each size is defined by ranges of body measurements or the body measurements of a representative body shape) having M number of sizes. Then, the size-chart can be denoted by a poset (note that in our case, the poset S is a totally ordered set; usually, a poset is a partially ordered set) S= $\{s^1, s^2, \ldots, s^M\}$, where each element is a size with bust, waist, hips measurements of the representative body shape fitted to the size, denoted as $s^i = \{s_b^i, s_w^i, s_h^i\}$; $i \in \{1, \ldots, M\}$. The ordering of the elements in poset S is defined as follows:

$$s^i < s^{(i+1)}, \forall i \in \{1, \ldots, M\}. \tag{22}$$

Distance between sizes in a size-chart: For a size-chart S=$\{s^1, s^2, \ldots, s^M\}$, we define the distance d(.) between any two sizes $s^i$ and $s^j$ as follows:

$$d(s^i, s^j) = |i - j|, \tag{23}$$

where i, j$\in\{1, \ldots, M\}$.

5.3.3 Deep Learning Based Estimation of Fit Style

This subsection discusses the details of modern deep learning techniques used in the prediction of fit styles from a garment image, i.e. how a garment fits over the bust, waist, hips of a user.

Given the garment image, we infer how the garment is generally worn over bust, waist and hips. Specifically, for each of bust, waist and hips, we estimate whether the garment covers the body part, and whether it is worn in a comfortable or a fitted manner.

To do this, we use convolutional neural networks (CNN) (A. Krizhevsky, I. Sutskever, and G. E. Hinton, Imagenet classification with deep convolutional neural networks, *NIPS*, 1(2):4, 2012) based deep learning techniques. We obtain a dataset of garments, where for each of bust, waist, and hips, the annotations from the label set L={Comfortable, Fitted, NotApplicable} are provided. Splitting the dataset appropriately into training and validation sets, we fine-tune three deep neural networks implemented using GoogleNet, one each for bust, waist and hips. The deep neural networks were initially trained on the *Cantor Garment Category Dataset* (see Section 2.1.2). The deep neural network fine-tuned for bust gives out a probability vector $p_b=\{p_b^0, p_b^1, p_b^2\}$; $p_b^0, p_b^1, p_b^2 \in [0, 1]$ over L for an input image, where $p_b^0$ denotes the probability that the garment is worn comfortably over the bust, $p_b^1$ denotes the probability that the garment is worn fitted over the bust, while $p_b^2$ denotes the probability that the garment is not worn over the bust. Similar probability vectors $p_w=\{p_w^0, p_w^1, p_w^2\}$; $p_w^0, p_w^1, p_w^2 \in [0, 1]$ and $p_h=\{p_h^0, p_h^1, p_h^2\}$; $p_h^0, p_h^1, p_h^2 \in [0,1]$ are obtained for waist and hips respectively from the corresponding deep neural networks.

Note here that we have trained each deep neural network for the output label set L. This implies that we expect the CNN to infer whether the garment is covering the body part (by giving a probability of the label Not Applicable) or not, and if covering, then whether comfortably or not. This scenario can alternatively be achieved by training a CNN with the label set containing only two labels {Comfortable, Fined}. In such a case, to infer whether a garment is worn over or not, an empirical threshold τ can be utilized, and if the probabilities for both Comfortable and Fitted are less than τ, one can then merely surmise that the garment is not covering the body part. To avoid the requirement for an extra tunable parameters, we employed the former approach.

5.3.4 Model Learning

Inputs and Outputs: With the fit style information inferred from the CNNs, we are now in a position to specify the input and the output sets for learning our predicate logic. Machine learning methods inherently operate on a propositional level (R. de Salvo Braz, E. Amir, and D. Roth, A survey of first-order probabilistic models, In Innovations in Bayesian Networks, pages 289-317, Springer, 2008). For instance, probabilistic graphical models tend to output a look-up table for a partial set (based on dependencies between the random variables) of joint input-output combinations. This scenario can be considered as a special case of outputting facts for input-output mapping (S. Russell, Unifying logic and probability: A new dawn for ai? In International Conference on Information Processing and Management of Uncertainty in Knowledge-Based Systems, pages 10-14, Springer, 2014). In contrast, predicate logic tends to model some generalized underlying theme in the data; however, manual data analysis is required for this.

For N training examples, we have the input training set $X=\{x^1, x^2, \ldots, x^N\}$ where $x^n=\{u_*, p_*^0, p_*^1, p_*^2\}$; $n \in \{1, \ldots, N\}$ and $*=\{b, w, h\}$ for $n^{th}$ garment image (for notational simplicity, we omit n in elements of $x^n$). Here $u_*$ refers to user's body measurements at the fit-point $*$ and $p_*^0$, $p_*^1$, $p_*^2$ are the fit-style probabilities defined in Section 5.3.3. Let the corresponding output size ordered (ground truth) be $s^n$, where $s^n$ belongs to a pre-specified size-chart S.

The training set then can be seen as taking on the mappings from X×S. Extending the same notation, we denote a validation set as having the mappings from $X_v \times S$, and a test set having the mappings from $X_t \times S$ Training Objective: For each input $x^n$, K outputs (sizes) $r^{n,1}, \ldots, r^{n,K}$ from S are predicted. For a parameter set Θ that is to be learnt, we then have the following error to minimize:

$$E(\Theta) = \sum_{n=1}^{N} \sum_{k=1}^{K} d(r^{n,k}, s^n), \quad (24)$$

$$\Theta^* = \underset{\Theta}{\operatorname{argmin}} E(\Theta). \quad (25)$$

For our purposes, we keep K=2, i.e. we wish to optimize the parameters for the top-2 accuracy measure. We see below what exactly the parameter set Θ represents in our system.

The Parameter Set Θ: The parameter set Θ is composed of two entities, a vector θ and a matrix M. Thus, Θ={θ,M}. M and θ are inter-dependent, and thus are jointly learnt under an alternate optimization scheme, which we describe later in this subsection. The vector $\theta=\{\theta_1, \theta_2, \theta_3\}$; $\theta_1 \leq \theta_2 \leq \theta_3$, where $\theta_1, \theta_2, \theta_3$ are the fit-style cut-offs, i.e. they decide what difference between the measurement of a user body parameter and the corresponding size measurement should be termed as fit, tight/loose, very tight/very loose. These parameters thus also help us to obtain fit advice, and also derive our training procedure. We keep θ same for all of bust, waist and hips, meaning that we assume that a garment is deemed tight/loose at the bust in the same way as on the waist or hips. Specifically, for a selected size $s=\{s_b, s_w, s_h\}$: $s \in S$ and user body shape parameters $\{u_b, u_w, u_h\}$, we do the following:

$$\max(p_*^0, p_*^1, p_*^2) \neq p_*^2: \begin{cases} \text{fitting} = 0 \ \forall \ (|s_* - u_*| \leq \theta_1) \\ \text{fitting} = 1 \ \forall \ (|s_* - u_*| \leq \theta_2) \\ \text{fitting} = -1 \ \forall \ (|s_* - u_*| \leq \theta_2) \\ \text{fitting} = 2 \ \forall \ (|s_* - u_*| \leq \theta_3) \\ \text{fitting} = -2 \ \forall \ (|s_* - u_*| \leq \theta_3) \\ \text{fitting} = 3 \ \forall \ (|s_* - u_*| > \theta_3) \\ \text{fitting} = -3 \ \forall \ (|s_* - u_*| > \theta_3) \end{cases}, \quad (26)$$

where $*=\{b, w, h\}$, fitting={0,1,−1,2−2,3,−3,} correspond to the garment being {fit, loose, tight, very loose, very tight, uncomfortably loose, uncomfortably tight} respectively in our implementation. When $\max(p_*^0, p_*^1, p_*^2)=p_*^2$, it implies that the garment is not worn over the body part represented by $*$, and thus, no fitting preference can be measured there.

For a given θ, the matrix M records the fitting preferences for discrete combinations of possible user body shape parameters. We consider the {bust, waist, hips} combinations from the ranges in the sets $M_b^c$, $M_w^c$, $M_h^c$ (specified in Algorithm 1 in FIGS. 26A and 26B)). For each user body shape combination, we want to know (under a normalized sense) how often the user preferred a fitting of {0,1,−1,2,−2,3,−3,} on their bust, waist, and hips. Thus each row of M contains 7 entries for each of bust, waist and hips, making 21 entries in all.

Learning M and θ: M and θ are jointly learnt to minimize the error in Eq. (24). The procedure is completely described in Algorithm 1 (see FIGS. 26A and 26B). A precise description of Algorithm 1 is as follows: we sweep through the set of possible choices $\theta_1^c$, $\theta_2^c$ and $\theta_3^c$ of the parameters θ, and for each value (vector), we learn M using the mappings in $X \times S$ (training set), and record the error of Eq. (24) using the mappings in $X_v \times S$ (validation set). Note that it is strongly preferred to learn $\theta$ from the validation set since such values when learnt through sweeping mechanisms heavily overfit if estimated through the training set (S. Kong, X. Shen, Z. Lin, R. Mech, and C. Fowlkes, Photo aesthetics ranking network with attributes and content adaptation. In *European Conference on Computer Vision,* pages 662-679, Springer, 2016). The value vector for $\theta$ that satisfies Eq. (25) (minimizes the error of Eq. (24)), and the corresponding M are contained in $\Theta^*$.

Inference Procedure: Note that in order to calculate the error in Eq. (24), we need to infer $r^{n,k}$; k=1, ..., K using a learnt M and $\theta$. Our inference procedure is described in Algorithm 2 (see FIG. 27). Intuitively, we do the following: for a given vector containing the measurements of a user's bust, waist and hips, we find the row $m_r$ in M that best describes this combination. We then record the fit style preferences of these users' body shape parameters with all the available sizes in size dictionary S using Eq. (26). The calculated fit style preference vectors are then compared with the fit style preferences recorded at $m_r$ in $M(M(M_r))$ using the dot product. The top-K sizes from S are then selected by sorting the dot product values in a descending order. We ensure that the dot product comparison is only done over relevant fit-points i.e. those over which the garment is worn. Please refer to Algorithm 2 (see FIG. 27) for a mathematical delineation of this inference procedure.

5.3.5 Model Testing

Predicting Initial Sizes For the given bust, waist, and hips measurements, one can predict three sizes (from the sizechart), one of which will fit the user best on the bust, the other of which will fit best on the waist, and the last of which will fit best on the hips, using a nearest neighbour search. We call sizes predicted by such a procedure as initially predicted sizes. We will use these for making an important choice during inference.

To carry out a nearest neighbour search between the bust, waist and hips measurements of the sizes in the size-chart S and the given user's bust, waist and hips parameters, we do the following for a garment image:

$$s^{bust} = \underset{s^i \in s}{\arg\min} |u_b - s_b^i| 1_{max(p_b^0, p_b^1, p_b^2) \neq p_b^2}, \quad (27)$$

$$s^{waist} = \underset{s^i \in s}{\arg\min} |u_w - s_w^i| 1_{max(p_w^0, p_w^1, p_w^2) \neq p_w^2}, \quad (28)$$

$$s^{hips} = \underset{s^i \in s}{\arg\min} |u_h - s_h^i| 1_{max(p_h^0, p_h^1, p_h^2) \neq p_h^2}, \quad (29)$$

$$s^{max} = \max(s^{bust}, s^{waist}, s^{hips}), \quad (30)$$

$$s^{min} = \min(s^{bust}, s^{waist}, s^{hips}), \quad (31)$$

where $s^{bust}$ indicates the size that would fit the user's bust in the best way, irrespective of how this size might fit over the waist and the hips. Similar connotations hold for $s^{waist}$ and $s^{hips}$. Further, if $s^{max}$ and $s^{min}$ are the same or near to each other, it implies the existence of a single size where the garment will fit reasonably well over all of bust, waist and hips of the user. However, if the difference between $s^{max}$ and $s^{min}$ is large (typically greater than 2), this indicates that perhaps no single size may be suitable for the user at all of bust, waist, and hips. In such cases, we observe that the diversity of the user's preferences increases. The notation $1_{cond}$ in equations (27), (28), and (29) refers to checking the validity of the measurement under the condition cond (i.e. the most likely predicted fit style at the specified fit point is not "Not Applicable"). If the condition cond is not met for the fit point $f \in \{bust, waist, hip\}$, then the corresponding size candidate $s^f$ will be removed from the calculation in Eqs. (30) and (31).

Estimating the Top-K Sizes: The estimation of the top-K sizes is done on the test set $X_t$ with mappings in $X_t \times S$, by using the inference procedure as described in Algorithm 2 in FIG. 27. Note that this is the same inference mechanism as used for the validation set in Algorithm 1 in FIGS. 26A and 26B. However, in order to give users more useful choices and let them know that our system is intelligent enough to surmise about the user preferences, we output top three sizes (K=3) whenever $d(s^{max}, s^{min}) \geq 2$, else we keep K=2. This is learnt from the data, wherein we have observed that if the variation in the user body shape parameters is large, the users tend to prefer a larger number of sizes.

Fit Advice: For each of the K predicted sizes $r^{n,1}, \ldots, r^{n,K}$ for the $n^{th}$ test image, the fit-advice is calculated according to Eq. (26), with the calculations being made between $\{r_b^{n,k}, r_w^{n,k}, r_h^{n,k}\}$; k=1, ..., K and the user body shape parameters $\{u_b, u_w, u_h\}$.

6. Other Applications of Attribute Predictions

This section presents several other online-fashion related applications derived from garment attribute prediction problems, and their deep learning solutions. This includes:

1) conversion and return prediction (Section 6.1), 2) outfit recommendation (Section 6.2) and 3) learning the trend of fashion and style (Section 6.3). Details are presented in the rest of this section.

6.1 Conversion and Return Prediction

As an extension of the garment attribute prediction frameworks as described in Section 2 and size and fit prediction framework as described in Section 5, we can further predict:

1. when/whether a conversion will happen (i.e. when a particular user will buy a particular kind of garment), and
2. when/whether a return or an exchange will happen.

using a machine learning model e.g. a deep neural network for binary attribute classification as described in Section 2.2.

6.1.1 Training Data Preparation

To train such a model it requires training data based on the images and metadata used for attribute prediction (see Section 2.1) in combination with the following additional data:

user features (i.e. body shape measurements, age, ethnicity, location);

user journey, browsing history, order, and other traffic data from the virtual fitting room application (including but not limited to order time, order location, order volume, engagement level, and user browsing history), and derived data (e.g. a binary label indicating whether a conversion happens, which can be inferred based on the engagement level;

historical sales data from the retailer, including whether and when the garment was returned or exchanged, and the reason for the return/exchange, and derived label data (e.g. a binary label indicating whether the garment has been exchanged or returned).

A keyword extractor or an NLP module (e.g. OpenNLP) can be used to extract additional semantic labels for classifier training from the return and exchange reasons.

6.1.2 Formulation

An example of deep model classifiers suitable for the prediction task above is to use a similar classificationversion network architecture provided for size and fit advice as described in Section 5.2.4, in which the input is a combination of an image and additional features described in Section 6.1.1 and the output of the model are now binary labels indicating i.e. 1) whether a return will happen, and/or 2) whether a conversion will happen. To train the model, we can again apply the transfer learning scheme based on a pre-trained deep attribute predictor (see Section 2.2).

The system may also provide an uncertainty estimate of the prediction results. For a deep learning framework, this can be implemented using the technique of test-time dropout (N. Srivastava, G. Hinton, A. Krizhevsky, I. Sutskever, and R. Salakhutdinov, Dropout: A simple way to prevent neural networks from overfitting, *The Journal of Machine Learning Research*, 15(1):1929-1958, 2014), which provides an uncertainty measurement to the prediction label. The system is meant to represent all the important things a human could say about fit from just looking at a garment.

6.2 Outfit Recommendation and Completion

As an extension of garment visual search and retrieval (see Section 4), the machine learning models for garment attribute prediction can also be extended to build an outfit recommendation and search system. The system can search and recommend an outfit of multiple garments, either with or without the history data of outfitting. See Section 6.2.1 for details.

A different problem for outfitting is outfit completion, in which we aim to find one or more garments from a garment database that best matches the garment(s) that is (are) currently browsed, purchased, or worn on the user's virtual avatar to make a complete outfit. Another example is to predict the best complementary garment to fill in the gap(s) and complete the outfit for the user, for example, when the user is looking for a pair of trousers to pair with their shirt and coat, and making a perfect combination. Systems provided to solve such a problem are detailed in Section 6.2.2 and 6.2.3.

6.2.1 Outfit Search and Recommendation

Recommending a complete outfit or searching multiple garments from the image input are natural extensions of the garment search or retrieval problem described in Section 4. Approaches for image-based garment search or retrieval described in Section 4.1 can be modified to handle the outfit search problems.

For image-based outfit search, a divide-and-conquer approach can be applied. Firstly, given a query image of a person in an outfit O of $N_O$ garments or accessories, we use the object detection algorithm to detect the region-of-interest (ROI) $ROI_i$ of each garment or accessory $g_i \in O (i=1,2,\ldots, N_O)$ in the image. Then, we retrieve the similar item $g_i^*$ in the garment database from each region-of-interest $ROI_i$ to form an outfit $O^*$, as described in Section 4.1.2.

As for each item $g_i \in O$, multiple (assume M) similar candidate items $g_{i,j}^*$ can be retrieved by the garment search engine. This can form $M^{N_O}$ candidate outfit combinations in total. For each candidate outfit $O^*$ in the pool, we evaluate its overall similarity score S with respect to the query outfit O in the input image which can be computed as the product of the individual similarity score s of each corresponding item pairs $(g_i, g_i^*)$, as the following equation shows:

$$S(O, O^*) = \prod_{i=1}^{N_O} s(g_i, g_i^*). \quad (32)$$

Finally, we can rank all the proposal outfits by their overall similarity scores and choose top-K combinations for recommendation.

Commercially, this outfit search approach can be extended into an intelligent fashion-recommendation application that combines the steps of 1) applying an outfit search from an image on the internet or online fashion magazine to find all the similar garments or accessories provided by the target retailer/brand and/or are available on a specified website, and 2) display the "similar" outfit comprising of those garments or accessories and the source item on the 3D virtual avatar, and 3) recommend the items by providing the links for item shopping.

6.2.2 Recommending Complementary Items

Systems to recommend complementary garments or accessories to those which have been viewed or tried-on by a user based on the outfitting history have been introduced in Section 1.10 of Patent Application Number WO2016097732A1, which is incorporated by reference. Such systems can be directly integrated with the deep neural networks trained for image-based garment-attribute predictors (presented in Section 2) and/or for image-based garment search (presented in Section 4.1.1) at the input side for visual feature extraction and similarity embedding learning. Similarity scores used for ranking and recommendation are then computed based on these deep features extracted and the similarity metric learned.

6.2.3 Voice Chat Systems for Outfit Completion

Figure 28:
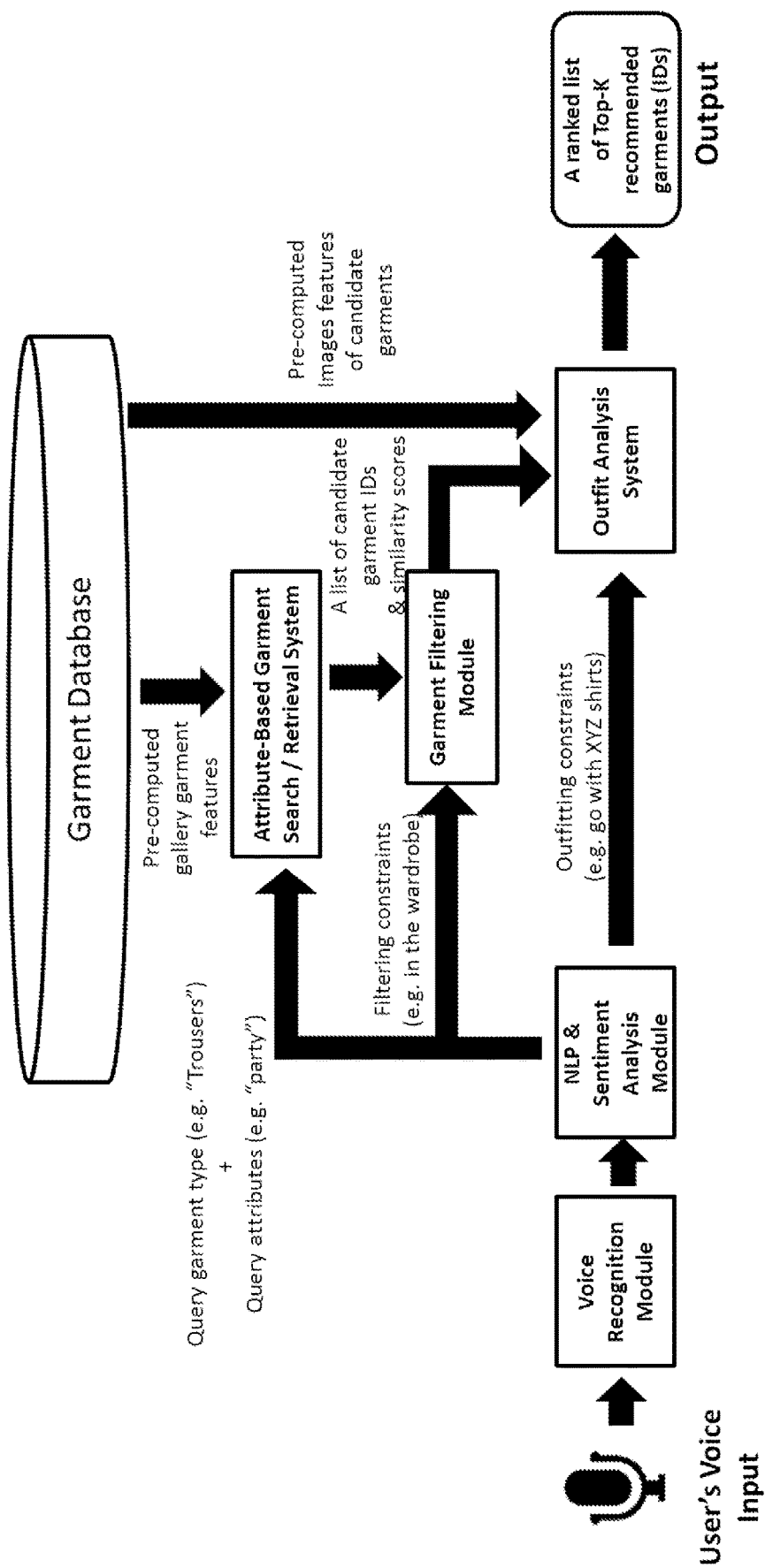
FIG. 28 shows an example end-to-end system diagram of a voice-chat based outfit completion system.

On top of the systems for recommending items which complement those already owned by the user, we can further build a voice chat system for outfit completion. It will respond to a user's speech request (e.g. "I'm going to a party. I want a pair of trousers to go with my XYZ shirt in my wardrobe."). An end-to-end diagram of an example of this system is illustrated in FIG. 28.

The system may first use a "Voice Recognition Module" (e.g. CMU Sphinx library (P. Lamere, P. Kwok, W. Walker, E. Gouvea, R. Singh, B. Raj, and P. Wolf. Design of the cmu sphinx-4 decoder, In *IN 8TH EUROPEAN CONF. ON SPEECH COMMUNICATION AND TECHNOLOGY (EUROSPEECH, 2003)*)) to convert the user's voice message into a sequence of text messages.

Then, a module of NLP (e.g. OpenNLP or sentiment analysis algorithms (e.g. P. Liang, M. I. Jordan, and D. Klein, Learning semantic correspondences with less supervision. In *Proceedings of the Joint Conference of the 47th Annual Meeting of the ACL and the 4th International Joint Conference on Natural Language Processing of the AFNLP: Volume 1-Volume* 1, pages 91-99, Association for Computational Linguistics, 2009)) is used to parse the keywords and semantic terms (e.g. "party", "trousers", "shirt"), and analyze the underlying grammar and word composition. The output of the module includes:

1. the type of garment being queried (e.g. "trousers" in the previous example);
2. desired attributes of the query garment (e g. "party" in the previous example), and
3. outfitting constraints(e.g. "go with XYZ shirt" in the previous example); and
4. filtering constraints (e g. "in the wardrobe" in the previous example).

Output 1 and 2 of the NLP module are fed into an "Attribute-Based Garment Search System" as detailed in Section 4.2. The module will convert the query type and attributes into a vectorized query feature, compare with gallery image features pre-computed and stored in the garment database, and return a ranked list of retrieval items in the form of garment IDs. All the gallery image features were pre-computed using a multiple-label deep neural network classifier (see Section 2.2.2) from images to multiple binary attribute labels of given keywords representing various trends and styles (e g. "dip-hem", "party", "collar").

This list may be refined and filtered by a "Garment Filter Module" based on any additional filtering constraints detected (i.e. Output 4 of the NLP module).

The last module of the system is the "Outfit Analysis System" as described in Section 6.2.2, which takes a combined input of 1) the similarity scores of all the candidate garments returned by the "Attributed-Based Garment Search / Retrieval System" and filtered by a "Garment Filter Module", 2) the pre-computed image features of the candidate garments fetched from the garment database based on the garment IDs, and 3) outfitting constraints (i.e. Output 3 of the NLP module). The module predicts a recommendation score between 0 and 1 for each input candidate garment, indicating whether or not it is a good match. The final recommendation results can be presented by ranking the items based on their predicted recommendation scores.

6.3 Learning the Trend of Fashion and Style

We can also extend the machine learning method for garment-attribute prediction to predict 1) whether a garment is or may be "in fashion" or "out of fashion", or 2) whether a garment is in a certain style, from one or more garment images along with the metadata. For example, we can use deep convolutional neural networks to solve the problem, as described in Section 2.

To learn a predictive deep model of reliable performance, we need to prepare a large amount of labeled data. The following options can be used to populate labeled training data in an automated way. We first implement web crawlers to retrieved the images from multiple fashion websites, and also the keywords or the associated texts (e.g. item description) on the webpage. We can then use some keyword extractors or natural language processing (NLP) libraries (e.g. OpenNLP), to find the histogram of the text section and extract the keywords automatically. This scheme allows us to quickly gather a large amount of image data with weak semantic labels (i.e. the labels are somewhat noisy), and build up a structured and labeled dataset suitable for deep learning.

The model training process is a two-stage approach as described in Section 2.2.4, in which we first pre-train the model based on the large scale image dataset with weak semantic labels as described above, and then apply transfer learning to fine-tune and improve the model performance using a relatively small but high-quality labeled dataset. By training and validation on distinct time windows of the historical data, we can extend this framework to predict whether a certain style will be in fashion in the future, e.g. in the next 6 months, 1 year, or 2 years periods.

Note

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred example(s) of the invention, it will be apparent to those of ordinary skill in the art that numerous modifications can be made without departing from the principles and concepts of the invention as set forth herein.

The invention claimed is:

1. Computer implemented method for predicting garment attributes using deep learning techniques, comprising the steps of:
   (i) receiving and storing one or more digital image datasets including images of training garments;
   (ii) training a deep model for garment attribute identification, using the stored one or more digital image datasets, by configuring a deep neural network model to predict
      (a) multiple-class discrete attributes;
      (b) binary discrete attributes, and
      (c) continuous attributes,
   (iii) receiving one or more digital images of a garment, wherein the one or more digital images of the garment are not present in the one or more digital image datasets, and
   (iv) extracting attributes of the garment from the one or more received digital images of the garment using the trained deep model for garment attribute identification, wherein the extracted attributes include one or more of: multiple-class discrete attributes, binary discrete attributes, continuous attributes;
   wherein the method includes, in a size advice and fit analysis, receiving user information, including one or more of: user's body shape parameters, user's location, age, and ethnicity;
   receiving garment sizing and measurement information, including one or more of: garment sizes, size-charts of the garment, garment measurements;
   receiving fit-style labels relating to the training garment images in the one or more digital image datasets, including one or more of: the circumferential fits over different body parts and vertical drops, and
   including a step of re-architecting and fine-tuning the trained deep model.

2. The method of claim 1, wherein the extracted attributes include one or more of: style, shape, texture, colour, fabric properties, which are multiple-class discrete attributes, binary discrete attributes, or continuous attributes.

3. Method of claim 1, the method including the step of: generating annotations for the one or more digital image datasets including the training garment images using natural language processing, and storing the generated annotations in the one or more digital image datasets including the training garment images.

4. Method of claim 1, wherein the one or more digital image datasets including the training garment images include a digital image dataset including internet training garment images.

5. The method of claim 1, wherein the one or more digital image datasets includes a digital image dataset based on sets of garment mannequin photos which includes metadata and multiple semantic labels associated with the sets of garment mannequin photos.

6. Method of claim 5, wherein the digital image dataset based on the sets of garment mannequin photos includes digital images of training garments taken on the mannequin in a controlled lighting environment, in a standard camera pose.

7. Method of claim 5, wherein the digital image dataset based on the sets of garment mannequin photos includes high-resolution unsegmented original photos of training garment samples and segmented garment texture sprites, both in eight distinct camera views.

8. The method of claim 5, wherein the metadata and multiple semantic labels associated with the sets of garment mannequin photos include one or more of:
Garment name and description; Garment category and subcategory; Colour; Pattern and texture;
Fit styles; Vertical drops; Fabric and material composition; Washing method; Price or price range.

9. Method of claim 7, wherein regarding the digital image dataset based on the sets of garment mannequin photos, keyword extraction or natural language processing (NLP) is used to extract style-related attributes and semantic labels from training garment name and training garment description text, wherein the style-related attributes are multiple-class discrete attributes, binary discrete attributes, or continuous attributes.

10. The method of claim 5, wherein regarding the digital image dataset based on the sets of garment mannequin photos, the metadata and/or the semantic labels are structured 1) by associating groups of different keywords of similar meanings, and/or 2) assigning label weights with values in a range.

11. Method of claim 1, wherein the digital image datasets include one or more of: unsegmented mannequin photos of a training garment, either in a single frontal view, or in multiple distinct camera views; segmented training garment texture sprites from mannequin photos; sample photos of a training garment on a retailer's website; and synthetic training garment images obtained by rendering a simulated garment model using computer graphic techniques.

12. The method of claim 1, wherein the step of training the deep model for garment attribute identification is such that a combination of the multiple class discrete attributes and the continuous attributes are modelled simultaneously.

13. The method of claim 1, the method including of digitising a garment, and estimating physics parameters of garment fabric material, using a garment digitization apparatus, the apparatus including a mannequin, a mannequin rotation system, a computer system and a camera system, including the steps of:
(i) imaging a mannequin wearing the garment using the camera system;
(ii) rotating the mannequin wearing the garment through at least 360° using the mannequin rotation system;
(iii) capturing at least three images of the garment using the camera system during the mannequin rotation,
(iv) generating fast and jerky left-right-left rotations at a series of configured rotational accelerations and velocities to disturb the garment on the mannequin with patterned motion, and
(v) capturing garment appearance under the motion and estimating the physics parameters of the garment fabric material.

14. The method of claim 13, wherein multiple images of the garment are photographed at scheduled times during a course of a vibration sequence to capture the appearance of the garment under different stages of the motion, wherein the images include (a) at least one image capturing a static status of the garment, and (b) one or more images capturing the garment under the motion.

15. The method of claim 13, including analyzing captured garment images in different phases of garment motion and predicting garment fabric properties and/or model parameters for garment physics simulation.

16. The method of claim 15, including the step of storing the physics parameters into a garment database.

17. The method of claim 13, including the step of using a pressure sensor array embedded on or under a surface of the mannequin, which captures a stress/strain of the garment when the garment is dressed on the mannequin.

18. The method of claim 13, including the steps of measuring a strain and stretch of the garment when dressed on the mannequin, and estimating the physics parameters of the garment fabric material, and using the estimated physics parameters of the garment fabric material for photo-realistic and dynamic garment simulation and rendering in an application of virtual fitting.

19. The method of claim 1, which includes the steps of:
i) collecting one or more real photos and one or more synthetic rendered images,
ii) training the deep model to generate a difference image,
iii) using the deep model to generate a difference image,
iv) superposing the difference image onto an input synthetic rendered image to generate a photo-realistic synthetic image.

20. The method of claim 19, wherein training and using the deep model includes the step of using two adversarial submodules comprising a first submodule and a second submodule: the first submodule distinguishes synthetic virtual avatar renders from real photos of models wearing garments, and the second submodule makes modifications to an initial render output and provides the photo-realism of synthetic renders of body image.

21. The method of claim 1, in which the one or more digital images of a garment are received in a query, to find similar items to a queried item.

22. The method of claim 21, wherein the one or more digital images are of items which are one or more of: currently dressed on user's virtual avatar;
recently browsed by the user; in an arbitrary photo on internet.

23. The method of claim 1, in which the one or more digital images of a garment are received in a query, to identify an item provided in the query.

24. The method of claim 1, in which an attribute-based search for a query item is provided, in which an input is a set of keywords describing the query item.

25. The method of claim 1, in which an approach for image-based search and image retrieval is: (a) obtaining the extracted attributes of the garment, (b) computing feature distances between a received digital image of the garment and each image in the digital image datasets using a distance metric based on the extracted attributes of the garment; (c) presenting the search or retrieval results by ranking, using computed distance metrics.

26. The method of claim 1, in which at an input side of an image-based garment search and retrieval system an ROI Detection Module is included, which detects the region-of-interest (ROI) of the garment in the form of bounding boxes on both a received digital image of the garment and all the images of the one or more digital image datasets as a pre-processing step.

27. The method of claim 26, in which multiple bounding boxes each surrounding an individual garment item are provided as a pre-processing step.

28. The method of claim 1, in which the re-architected model maintains all convolutional-layers of the pre-trained model but completely rebuilds original fully-connected (FC) layers.

29. The method of claim 28, in which an input to the re-architected model includes both a garment mannequin photo and user features, and an output of the re-architected model are 3D size-chart feature vectors.

30. The method of claim 1, wherein in a fine-tuning process, different layers of the model are re-trained with different learning rates; the weights of the new FC layers are trained at a learning rate 10-times higher than those applied to weights of existing convolutional layers, in which the fine-tuning scheme process adapts pre-trained features to new training data for size recommendation.

31. The method of claim 1, including a preprocessing step to map all size labels in the training data into size-chart feature vectors.

32. The method of claim 1, wherein multi-image input is provided, in which multiple photos in distinct camera views are available for the garment.

33. The method of claim 1, including a size regression algorithm step which is to look up a size feature on a target size-chart and recommend a most similar size.

34. The method of claim 1, wherein an output of the deep model is a size label, which is a multi-class discrete label instead of a continuous label, and a softmax activation is applied after a final FC layer to convert a network output into a sum-to-one probability vector.

35. The method of claim 1, further comprising a method of garment size and fit recommendation, which includes the steps of
   i) predicting multiple fit-style labels and associated probabilities of a garment from the one or more digital images of the garment, including one or more of circumferential fits over different body parts and vertical drops;
   ii) selecting a subset of most relevant fit points by thresholding the associated probabilities obtained in i);
   iii) predicting a garment size and performing a fit analysis by analysing user measurements and garment measurements over the selected fit points obtained in ii);
   iv) providing a fit recommendation.

36. System for predicting garment attributes using deep learning techniques, the system including a processor configured to:
   (i) receive and store one or more digital image datasets including images of training garments;
   (ii) train a deep model for garment attribute identification, using the stored one or more digital image datasets, by configuring a deep neural network model to predict
      (a) multiple-class discrete attributes;
      (b) binary discrete attributes, and
      (c) continuous attributes,
   (iii) receive one or more digital images of a garment, wherein the one or more digital images of the garment are not present in the one or more digital image datasets, and
   (iv) extract attributes of the garment from the one or more received digital images of the garment using the trained deep model for garment attribute identification, wherein the extracted attributes include one or more of: multiple-class discrete attributes, binary discrete attributes, continuous attributes;
   wherein the processor is configured to: receive user information, including one or more of: user's body shape parameters, user's location, age, and ethnicity;
   receive garment sizing and measurement information, including one or more of: garment sizes, size-charts of the garment, garment measurements;
   receive fit-style labels relating to the training garment images in the one or more digital image datasets, including one or more of: the circumferential fits over different body parts and vertical drops, and
   re-architect and fine-tune the trained deep model.

37. A computer-implemented method of digitising a garment, and estimating the physics parameters of fabric material of the garment, the method using a garment digitization apparatus, the apparatus including a mannequin, a mannequin rotation system, a computer system and a camera system, the method including the steps of:
   (i) imaging the mannequin wearing the garment using the camera system;
   (ii) rotating the mannequin wearing the garment through at least 360° using the mannequin rotation system;
   (iii) capturing at least three images of the garment using the camera system during the mannequin rotation,
   (iv) generating fast and jerky left-right-left rotations at a series of configured rotational accelerations and velocities to disturb the garment on the mannequin with patterned motion, and
   (v) capturing garment appearance under the motion and estimating the physics parameters of the garment fabric material.

38. The method of claim 37, wherein multiple images of the garment are photographed at scheduled times during course of a vibration sequence to capture an appearance of the garment under different stages of motion, wherein the images include
   (a) at least one image capturing a static status of the garment, and
   (b) one or more images capturing the garment under the motion.

39. The method of claim 37, including analyzing captured in step (v) capturing garment images in different phases of garment motion.

40. The method of claim 39, including the step of storing the physics parameters into a garment database.

41. The method of claim 37, including the steps of measuring strain and stretch of the garment when dressed on the mannequin, and using the estimated physics parameters of the garment fabric material for photo-realistic and dynamic garment simulation and rendering in an application of virtual fitting.

42. The method of claim 37, the method further including predicting garment attributes using deep learning techniques, comprising the steps of:
   (I) receiving and storing one or more digital image datasets including images of training garments;
   (II) training a deep model for garment attribute identification, using the stored one or more digital image datasets, by configuring a deep neural network model to predict
      (a) multiple-class discrete attributes;
      (b) binary discrete attributes, and
      (c) continuous attributes,
   (III) receiving the at least three digital images of the garment, wherein the at least three digital images of the garment are not present in the one or more digital image datasets, and
   (IV) extracting attributes of the garment from the at least three digital images of the garment using the trained deep model for garment attribute identification, wherein the extracted attributes include one or more of: multiple-class discrete attributes, binary discrete attributes, continuous attributes.

43. A system for digitising a garment, and estimating physics parameters of fabric material of the garment, the system including a garment digitization apparatus, the apparatus including a mannequin, a mannequin rotation system, a computer system and a camera system, the system arranged to:
   (i) image the mannequin wearing the garment using the camera system;

(ii) rotate the mannequin wearing the garment through at least 360° using the mannequin rotation system;

(iii) capture at least three images of the garment using the camera system during the mannequin rotation, (iv) generate fast and jerky left-right-left rotations at a series of configured rotational accelerations and velocities to disturb the garment on the mannequin with patterned motion, and (v) capture a garment appearance under the motion and estimate the physics parameters of the garment fabric material.

44. Computer implemented method for predicting garment attributes using deep learning techniques, comprising the steps of:

(i) receiving and storing one or more digital image datasets including images of training garments;

(ii) training a deep model for garment attribute identification, using the stored one or more digital image datasets, by configuring a deep neural network model to predict (a) multiple-class discrete attributes;
(b) binary discrete attributes, and
(c) continuous attributes, (iii) receiving one or more digital images of a garment, wherein the one or more digital images of the garment are not present in the one or more digital image datasets, and (iv) extracting attributes of the garment from the one or more received digital images of the garment using the trained deep model for garment attribute identification, wherein the extracted attributes include one or more of: multiple-class discrete attributes, binary discrete attributes, continuous attributes;

and further including the steps of:

(I) collecting one or more real photos and one or more synthetic rendered images, (II) training the deep model to generate a difference image, (III) using the deep model to generate a difference image, and (IV) superposing the difference image onto an input synthetic rendered image to generate a photo-realistic synthetic image.

\* \* \* \* \*